(12) United States Patent
Awadin et al.

(10) Patent No.: US 12,543,218 B2
(45) Date of Patent: Feb. 3, 2026

(54) FRAME BASED EQUIPMENT (FBE) IN NR-U

(71) Applicant: InterDigital Patent Holdings, Inc., Wilmington, DE (US)

(72) Inventors: Mohamed Awadin, Plymouth Meeting, PA (US); Qing Li, Conshohocken, PA (US); Lakshmi R. Iyer, King of Prussia, PA (US); Pascal M. Adjakple, Great Neck, NY (US); Yifan Li, Conshohocken, PA (US); Zhuo Chen, Claymont, DE (US); Allan Y. Tsai, Boonton, NJ (US); Joseph M. Murray, Schwenksville, PA (US); Rocco Di Girolamo, Laval (CA); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 451 days.

(21) Appl. No.: 17/763,754

(22) PCT Filed: Sep. 25, 2020

(86) PCT No.: PCT/US2020/052670
§ 371 (c)(1),
(2) Date: Mar. 25, 2022

(87) PCT Pub. No.: WO2021/062118
PCT Pub. Date: Apr. 1, 2021

(65) Prior Publication Data
US 2023/0035989 A1    Feb. 2, 2023

Related U.S. Application Data

(60) Provisional application No. 62/905,712, filed on Sep. 25, 2019.

(51) Int. Cl.
*H04W 74/0808* (2024.01)
*H04W 72/566* (2023.01)

(52) U.S. Cl.
CPC ..... *H04W 74/0808* (2013.01); *H04W 72/569* (2023.01)

(58) Field of Classification Search
CPC ......... H04W 74/0808; H04W 74/0816; H04W 74/08; H04W 74/085; H04W 74/002; H04L 5/1469
See application file for complete search history.

(56) References Cited

U.S. PATENT DOCUMENTS 9,860,776 B2    1/2018  Yerramalli et al.
11,140,708 B2 *  10/2021  Li ........................ H04L 5/0051
(Continued)

FOREIGN PATENT DOCUMENTS

| CN | 106465431 A | 2/2017 |
| CN | 107431591 A | 12/2017 |

(Continued)

OTHER PUBLICATIONS

Huawei et al., "Coexistence and channel access for NR unlicensed band operations", 3GPP Draft; R1-1903928, vol. RAN WG1, No. Xi'an, Apr. 7, 2019, Apr. 8, 2019-Apr. 12, 2019.

(Continued)

*Primary Examiner* — Yee F Lam
(74) *Attorney, Agent, or Firm* — Flaster Greenberg P.C.

(57) ABSTRACT

Methods and apparatuses are described herein for transmission priority, collisions, and sharing in the COT by frame based equipment (FBE). In accordance with one embodiment, a wireless communications device such as an FBE, may conduct two stage channel sensing to avoid collision between other FBEs nodes. The wireless communications device may adjust the energy threshold to reflect a channel (Continued)

access priority. The FBE may conducting continuous and non-continuous second stage channel sensing. The FBE may perform enhanced two stage channel sensing to exploit the remaining portion of the COT. The FBE may store a configuration for the second stage of channel sensing for both the downlink (DL) and uplink (UL).

17 Claims, 42 Drawing Sheets

(56) References Cited

U.S. PATENT DOCUMENTS

| | | | |
|---|---|---|---|
| 2017/0230986 A1 | 8/2017 | Moon et al. | |
| 2018/0048498 A1 | 2/2018 | Stern-Berkowitz et al. | |
| 2018/0049221 A1 | 2/2018 | Park et al. | |
| 2018/0288805 A1* | 10/2018 | Bhorkar | H04W 74/0816 |
| 2019/0261398 A1 | 8/2019 | Elbwart | |
| 2019/0268883 A1* | 8/2019 | Zhang | H04L 5/0094 |
| 2020/0275484 A1* | 8/2020 | Xu | H04W 72/1268 |
| 2020/0314887 A1* | 10/2020 | Vaidya | H04W 72/0446 |
| 2021/0084683 A1* | 3/2021 | Li | H04W 74/0808 |
| 2022/0110152 A1* | 4/2022 | Lim | H04W 74/006 |

FOREIGN PATENT DOCUMENTS

| | | |
|---|---|---|
| WO | WO 2016/122274 A1 | 8/2016 |
| WO | WO 2016/144050 A1 | 9/2016 |

OTHER PUBLICATIONS

Nokia et al., "Feature Lead's Summary on Channel Access Procedures", 3GPP Draft; RI-1909710 NR-U Channel Access FL Summary Wed, 3rd Generation Partnership Project (3GPP), Mobile Competence Centre; vol. RAN WG1, No. Prague, Czech Republic; Aug. 26, 2019-Aug. 30, 2019, Sep. 3, 2019, XP051766304.

$3^{rd}$ Generation Partnership Project (3GPP), Technical Specification Group Radio Access Network; "Evolved Universal Terrestrial Radio Access (E-UTRA), Physical Layer Procedures"; (Release 13), 3GPP TS 36.213 V13.9.0, Mar. 2018, 395 pages.

3rd Generation Partnership Project (3GPP), Technical Specification Group Radio Access Network; "Evolved Universal Terrestrial Radio Access (E-UTRA), Physical Layer Procedures"; (Release 14), 3GPP TS 36.213 V14.6.0, Mar. 2018, 466 pages.

3rd Generation Partnership Project (3GPP), Technical Specification Group Radio Access Network; "Evolved Universal Terrestrial Radio Access (E-UTRA), Physical Layer Procedures"; (Release 15), 3GPP TS 36.213 V15.1.0, Mar. 2018, 499 pages.

3rd Generation Partnership Project (3GPP), Technical Specification Group Radio Access Network; "Study on NR-based Access to Unlicensed Spectrum"; (Release 16), 3GPP TR 38.889 V16.0.0, Dec. 2018, 119 pages.

3rd Generation Partnership Project (3GPP), Technical Specification Group Radio Access Network; NR; "Physical Channels and Modulation"; (Release 15), 3GPP TS 38.211 V15.1.0, Mar. 2018, 90 pages.

ETSI EN 301 893 V2.1.1 5 GHz RLAN; "Harmonised Standard Covering the Essential Requirements of Article 3.2 of Directive 2014/53/EU" May 2017, 122 pages.

* cited by examiner

FRAME BASED EQUIPMENT (FBE) IN NR-U

CROSS-REFERENCE TO RELATED APPLICATIONS

This application is the National Stage Application of International Patent Application No. PCT/US2020/052670, filed Sep. 25, 2020, which claims the benefit of U.S. Provisional Patent Application No. 62/905,712, filed Sep. 25, 2019, which is hereby incorporated by reference in its entirety.

BACKGROUND

Base stations such as 5G base stations (e.g., gNBs) may initiate a Channel Occupancy Time (COT). In several occasions, UEs may initiate their own uplink COTs for random access channel (RACH) transmissions.

Accordingly, there is a need for channel access procedures for handling transmission priority, collisions, and sharing in the COT.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for transmission priority, collisions, and sharing in the COT by frame based equipment (FBE). In accordance with one embodiment, a wireless communications device such as an FBE, may conduct two stage channel sensing to avoid collision between other FBEs nodes. The wireless communications device may adjust the energy threshold to reflect a channel access priority. The FBE may conducting continuous and non-continuous second stage channel sensing. The FBE may perform enhanced two stage channel sensing to exploit the remaining portion of the COT. The FBE may store a configuration for the second stage of channel sensing for both the downlink (DL) and uplink (UL).

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Figure 1:
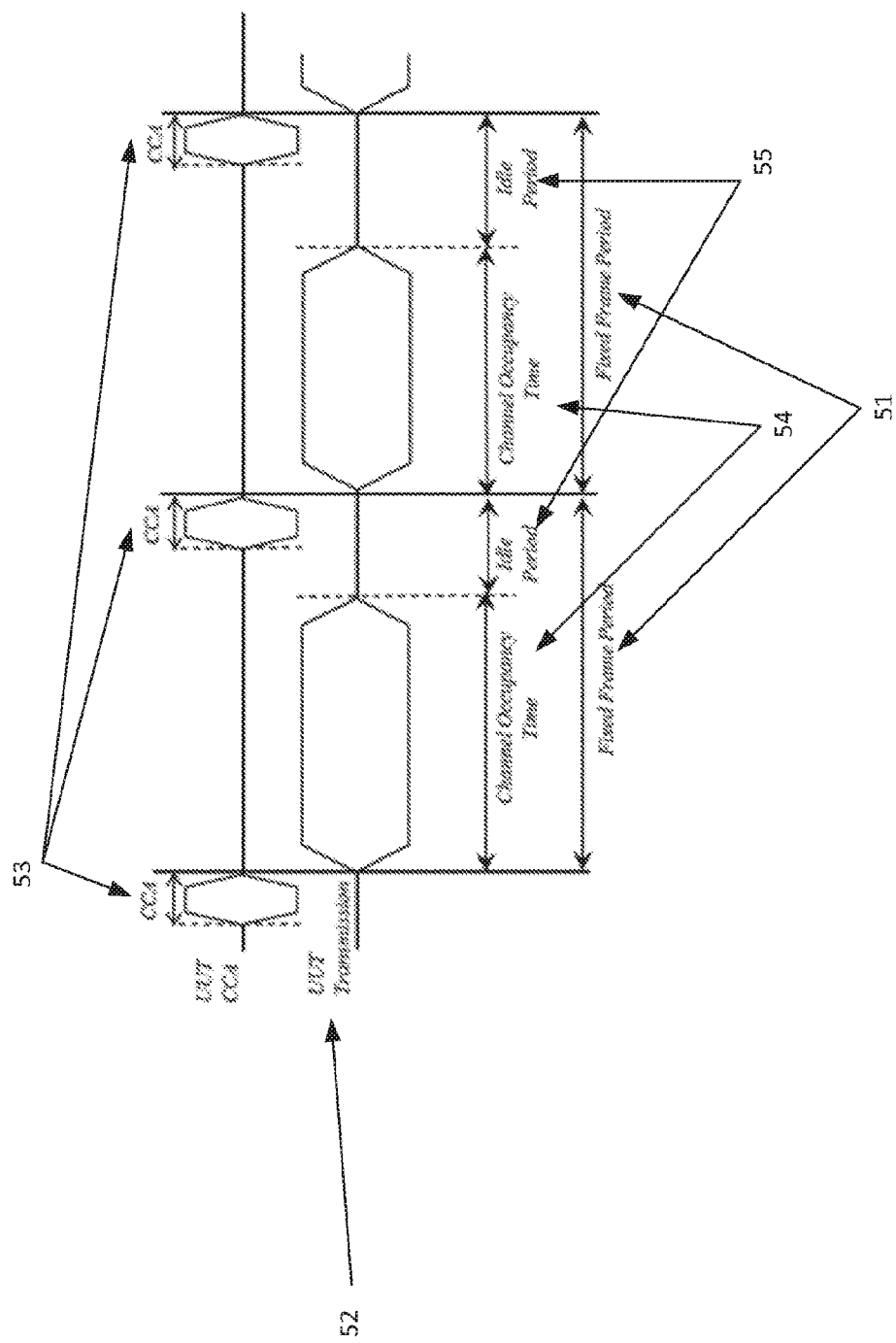
FIG. 1 shows an example of timing for FBE.

Methods and apparatuses are described herein transmission priority, collisions, and sharing in the COT by FBEs. As used herein, unless otherwise stated, a transmission may comprise an uplink (UL) transmission or a downlink (DL) transmission.

The following abbreviations and definitions may be used herein:
- CCA Clear channel assessment
- CORESET Control resource set
- COT Channel Occupancy Time
- C-RNTI Cell Radio-Network Temporary Identifier
- CSI-RS Channel state information reference signal
- DCI DL Control Information
- DL Downlink
- DL-RS Downlink reference signal
- DMRS Demodulation reference signal
- FBE Frame based equipment
- FBE-RNTI Frame based equipment-Network Temporary Identifier
- FFP Fixed frame period
- LAA Licensed-assisted access
- LBE Load based equipment
- LBT Listen Before Talk
- LTE Long Term Evolution
- MAC Medium Access Control
- NR New Radio
- NR-U New radio unlicensed
- OFDM Orthogonal Frequency Division Multiplexing
- PDCCH Physical Downlink Control Channel
- PDSCH Physical Downlink Shared Channel
- P-RNTI Paging-Network Temporary Identifier
- PSS Primary synchronization signal
- PUCCH Physical uplink control channel
- PUSCH Physical uplink shared channel
- RACH Random access channel
- RAN Radio Access Network
- RAR Random access response
- RA-RNTI Random access-Network Temporary Identifier
- RLAN Radio local area network
- RRC Radio Resource Control
- SI-RNTI System information-Network Temporary Identifier
- SRS Sounding reference signal
- SSB Synchronization signal block
- SSS Secondary synchronization signal
- UE User Equipment
- UL Uplink
- WUS Wake-up signal As specified in 3GPP TS 36.213, Physical Layer Procedures, for Release13 and Release 14, Licensed-assisted access (LAA) targets the carrier aggregation (CA) operation in which one or more low power secondary cells (SCells) operate in unlicensed spectrum in sub 6 GHz.

In Release 14, several channel access procedures are introduced to be performed by eNB and UE for both downlink (DL) and UL transmissions, respectively. The main channel access procedure is described in Section 15 of TS 36.213 Release 14.

In mmWave, there is wide range of unlicensed spectrum that can be further utilized to attain higher data rate than attained by operating in sub 6 GHz frequency band. The study item (SI) on NR-based access to unlicensed spectrum studied the different physical channels and procedures in NR-U and how they have to be modified or even introduce new physical channels or procedures to cope with NR-U challenges and take into account the main feature of operating in mmWave which is deploying narrow beams for transmission and reception above 6 GHZ up to 52.6 GHz or even above 52.6 GHz bands. Procedures to enhance the co-existence between NR-U and other technologies operating in the unlicensed, e.g., WiFi devices, LTE-based LAA devices, other NR-U devices, etc., and meet the regulatory requirements were extensively studied.

An FBE may comprise equipment where the transmit/receive structure has a periodic timing with a periodicity equal to the Fixed Frame Period (FFP). Initiating device comprises a device that initiates a sequence of one or more transmissions. Otherwise, the device is called Responding device.

FIG. 1 shows an example of timing for FBE 50. The initiating device may implement channel access mechanism as follows:

Fixed frame periods 51 may be within 1 ms to 10 ms, and a transmission 52 can only start at the beginning fixed frame period. Devices cannot change the fixed frame period 51 more than one every 200 ms. A device may perform a Clear Channel Assessment (CCA) 53 check during a single observation slot. If the initiating device finds the operating channel(s) to be clear, it may transmit immediately.

The observation slot may comprise a period during which the operating channel is checked for the presence of other radio local area network (RLAN) transmissions and it may have duration greater than 9 us. If the Operating Channel occupied, then there may be no transmissions on that channel during the next Fixed Frame Period 51. The initiating device may have multiple transmissions within a COT 54 without performing an additional CCA on this channel providing the gap between such transmissions does not exceed 16 μs. If the gap >16 μs, the initiating device may continue transmissions provided that an additional CCA detects no transmissions. All gaps are counted as part of the COT 54. The COT 54 may not be greater than 95% of the Fixed Frame Period 51 and may be followed by an Idle Period 55 until the start of the next Fixed Frame Period 51 such that the Idle Period 55 is at least 5% of the COT 54, with a minimum of 100 μs. An initiating device is allowed to grant an authorization to one or more associated responding devices to transmit on the current operating channel within the current COT 54. If the gap between the responding device transmission and the last transmission by the initiating device that issued the grant is less than 16 us, the responding device transmit without performing a CCA 53. If the gap between the responding device transmission and the last transmission by the initiating device that issued the grant is greater than 16 us, then the responding device has to perform CCA 53 on the operating channel during a single observation slot within a 25 μs period ending, i.e., CAT2 Listen Before Talk (LBT), immediately before the granted transmission time. The Responding Device may perform transmissions on the current operating channel for the remaining COT 54 of the current Fixed Frame Period 51.

The embodiments described herein address several issues with initiating a COT. In NR-U study item TR 38.889, it was agreed that gNBs may initiate the COT with Cat2 LBT immediately prior to the fixed frame period. In contrast to several channel access procedures agreed for load based equipment (LBE) in NR-U such as CAT2 LBE and CAT4 LBT with multiple configurations depending on the channel access priority, there is only a single channel access procedure for FBE, i.e., CAT2 LBT, without distinguishing between the priorities of different downlink signals/channels. Therefore, channel access procedures reflecting the priority of different transmissions in the COT to address this issue are described herein.

Figure 2:
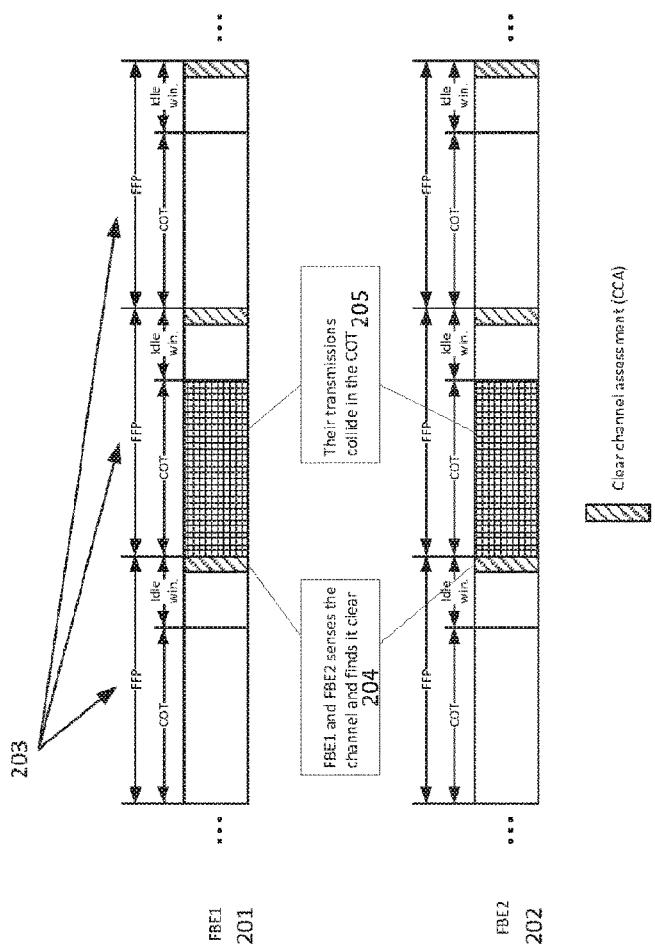
FIG. 2 shows that synchronized nodes may collide in the whole or portion of the acquired COT.

FIG. 2 shows that synchronized nodes may collide in the whole or portion of the acquired COT 200. In this example, FBE1 201 and FBE2 202 may comprise synchronized nodes with aligned FFPs 201 and may sense the channel to be clear 204. As a result, FBE1 201 and FBE2 202 may simultaneously occupy the channel and collide in portion or whole of the COT 205. This might be the situation, for example, in the case of multiple unplanned base station deployments. Therefore, procedures are described herein to resolve this collision.

In several occasions, UEs (e.g., FBEs) may have to initiate its own UL COT for random access channel (RACH) transmissions (Tx), Uplink (UL) Tx on configured grant, and so on. Each of these transmissions may have different priorities depending on the purpose of the transmission in the case of a RACH and different types of data in the case of an UL transmission on configured grant. Therefore, UL channel access procedures are needed to reflect such priorities. Also, it is not expected that the UE may occupy the whole COT. Therefore, procedures to enable the UE initiated COT to be shared with its gNB and possibly other UEs served by the same gNB are described herein to allow better utilization of the unused parts of the COT.

The embodiments described herein provide the following solutions:

Procedures to adapt the energy thresholds based on the channel access priority class.

Procedures to conduct two stage channel sensing to avoid collisions between different FBEs nodes, which includes:

Adjusting the energy threshold to reflect the channel access priority;

Conducting continuous and non-continuous second stage channel sensing;

Enhanced two stage channel sensing to exploit the remaining portion of the COT; and Configurations for the second stage channel sensing for both DL and UL.

Procedures to resolve starvation issue for nodes with low priority transmission and cope with imperfect synchronization issue between different FBE nodes.

Procedures to access the channel if transmissions can occur in the idle window.

Procedures to conduct LBE channel access procedures during the COT.

Introducing the notion of equivalent channel access priority class.

Procedures to indicate the priority of the channel access in the channel acquisition indicator (CAI).

Procedures for COT sharing which include the following:

Procedures to carry the priority of channel access when DL reference signals are used as CAI;

Procedures to carry the priority of channel access when PDCCH is used as CAI;

Procedures to carry the priority of channel access when SSB, PSS and/or SSS are used as CAI;

Procedures for FBE operation mode indication other than CAI;

Procedures for DL transmission burst and enhancement for DRX;

Procedures to carry the priority of channel access when RACH is used as CAI; and Procedures to share the UE acquired COT.

Typically, transmissions during the idle window of the FFP are prohibited. An initiating device may sense the channel in the idle window immediately before the next FFP. If the channel is sensed to be clear, the device can start transmitting in this FFP. Procedures are described herein to distinguish among different priorities for these transmissions. Moreover, some of the developed solutions may overcome other challenges, including but not limited to collisions between different nodes if they sensed the channel to be clear at the same time, and issues when if FBE are slightly asynchronous, i.e., the frame boundaries of FBE for different nodes are not aligned.

Energy detection threshold adaptation for sensing is described herein. LBE in LTE LAA (e.g. eNB for DL and UE for UL) and in NR-U (e.g. gNB for DL and UE for UL) may consider the channel to be idle if the detected energy is less than energy detection threshold denoted by X_("thres", "LBE") (dBm). A LBE may set X_("thres","LBE") to be less than or equal to a maximum energy threshold X_("thres_max","LBE") (dBm), which is independent of the priority of an intended transmission during the COT.

In the embodiments described herein, the maximum energy threshold may depend on a priority of the transmission that the FBE intends to perform during the COT. The maximum energy threshold may be denoted as X_("thres_max",i) (dBm), where i is priority class of the transmission. For example, it may be determined as follows:

If the FBE is a gNB/TRP and attempts to access the channel for DL transmission:

If the absence of any other technology sharing the carrier can be guaranteed on a long term basis (e.g. by level of regulation):

X_("thres_max",i)=min{T_"max"+T_i+10 "dB",X_r}, where T_i (dB) is an offset that depends on the priority class of the intended transmission, and X_r is the maximum energy detection threshold defined by regulatory requirements in dBm when such requirements are defined.

Otherwise, $$X_{thres\_max,i} = T_i + \max\left\{\begin{array}{l}-72 + 10\log_{10}\frac{BWMHz}{20\,MHz}, \\ \min\left\{T_{max}, T_{max} - T_A + \left(P_H + 10\log_{10}\frac{BWMHz}{20\,MHz}\right) - P_{TX}\right\}\end{array}\right\}$$

Where:

$T_i$ (dB) an offset depends on priority class of the intended transmission $T_{max}$ (dBm)=10 $\log_{10}$ (3.16228*10$^{-8}$ mW/MHz*BWMHz)

$T_A$=10 dB for transmission(s) including Physical Downlink Shared Channel (PDSCH);

$T_A$=5 dB for transmissions including discovery signal transmission(s) and not including PDSCH;

$P_H$=23 dBm $P_{TX}$ is the set maximum output power in dBm for the carrier

If the FBE comprises a UE and attempts to access the channel for UL transmission, the aforementioned $X_{thres\_max,i}$ can be used with $T_A$=10 dB. Scaling $X_{thres\_max,i}$ to depends on the priority of transmission and is not limited to the aforementioned equations. Other ways to scale $X_{thres\_max,i}$ are not precluded.

In another example, $X_{thres\_max,i}$ may be a function of the maximum energy threshold used for LBE, denoted by $X_{thres\_max,LBE}$ (dBm). Given that $X_{thres\_max,LBE}$ (dBm) is independent of priority class of the intended transmission, the maximum energy threshold for FBE may be determined as follows:

$$X_{thres\_max,i} = \min\{X_{thres\_max,LBE} + T_i, X_r\}$$

where $T_i$ (dB) an offset depends on priority class of the intended transmission and $X_r$ is a maximum energy detection threshold defined by regulatory requirements in dBm when such requirements are defined.

For any of the developed solutions to derive $X_{thres\_max,i}$, for example, $T_i$ may be predefined in Table 1. Assuming a highest priority transmission corresponds to P=1, then $T_i$ may be set to the minimum value, $T_i$=3 dB, in this example, such that FBE becomes more aggressive and increases its chance of accessing the channel as long as $X_{thres\_max,i}$ meets the regulation requirements.

TABLE 1

Energy detection threshold offset for different transmission priority classes

| Transmission priority class (P) | $T_i$ (dB) |
|---|---|
| 1 (highest priority) | 3 |
| 2 | 2.5 |
| . | . |
| . | . |
| Number of priority classes | 0 |

An example of the highest channel access priority class may be for the DL burst that contains a synchronization signal block (SSB) and/or remaining system information (RMSI). In this case, the gNB/TRP may apply the highest energy detection offset such that it becomes more aggressive in acquiring the channel. Also, if the DL transmission burst contains the other system information (OSI) and/or Physical Downlink Control Channel (PDCCH) and/or PDSCH and/or channel state information reference signal (CSI-RS), the gNB/TRP may attempt to access the channel using lower channel access priority class than the DL burst containing SSB and/or RMSI, for example. GC-PDCCH and/or RACH msg2 and/or RACH msg4 and/or paging PDCCH and/or paging message may have a higher channel access priority class than unicast PDSCH.

Similarly, for UL transmission bursts, the channel access priority class for RACH may depend on the purpose of the RACH. For example, the RACH used for initial access may have the highest channel access priority class. Also, the channel access priority class of Physical Uplink control Channel (PUCCH) or UCI piggybacked on the Physical Uplink Shared Channel (PUSCH) may depend on the content of the UCI. For example, UCI carrying ACK/NACK and/or CSI report part 1 and/or scheduling request may have a higher channel access priority class than UCI carrying CSI report part 2. Also, for only sounding reference signal (SRS) transmission, it may have the lowest channel access priority class. DL/UL transmission bursts may contain different signal(s)/channel(s) with different channel access priority classes, and the notion of equivalent channel access priority classes is also described herein.

Contention avoidance sensing during the COT is described herein. To comply with regulation requirements, the device may conduct clear channel assessment (CCA) just before the beginning of a FFP, e.g. CAT2 LBT, which may be referred to herein as first stage channel sensing. By doing this, NR-U devices, either gNBs or UEs, may follow the regulations and fairly co-exist with other technologies such as WiFi.

Figure 3:
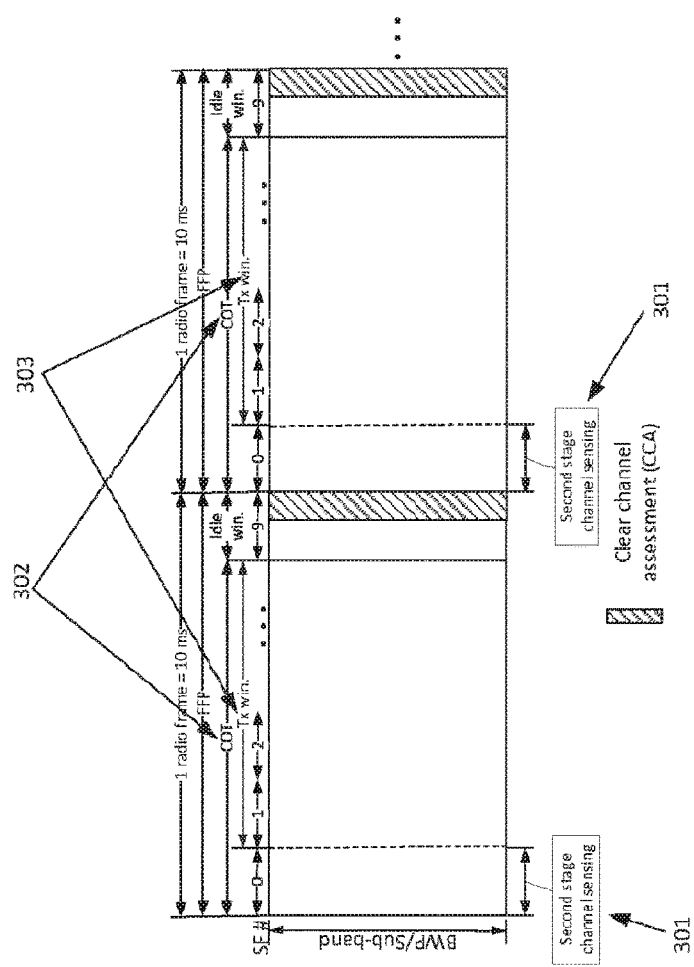
FIG. 3 shows contention on accessing the channel during the first portion of the COT.

FIG. 3 shows an example of contention on accessing the channel during the first portion of the COT 300. NR-U nodes, belonging to the same operator or different operators, may do a second stage channel sensing 301 in the first portion of COT 302 as shown in the example of FIG. 3. The second stage channel sensing 301 and the idle window occupy sub-frame 0 and 9, respectively. This may be acceptable for 15 KHz sub-carrier spacing because each sub-frame comprises a single slot. However, for higher numerology, few slots from the first and last sub-frame may be reserved for the second stage channel sensing 301 and the idle window, respectively, as long as they meet the regulation requirements. Moreover, single or multiple BWP(s)/sub-band(s) may be occupied during the Tx win. if FBE finds them available. A device that senses the channel to be clear during the second stage channel sensing 301 may access the channel transmit for the remaining portion of the COT 302, shown as the Tx. window 303. Other devices may not transmit though they sensed the channel to be clear before the FFP in the first stage channel sensing because they detected a transmission from other nodes in the beginning portion of the COT 302 for second stage sensing 301.

Figure 4:
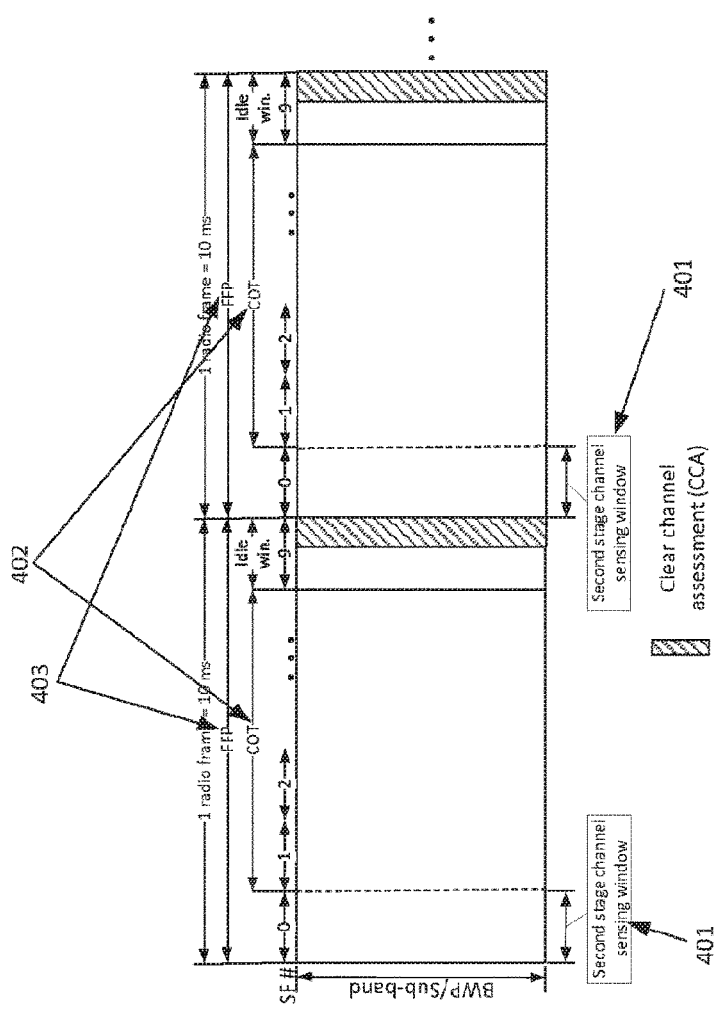
FIG. 4 shows shifting the beginning of the COT after the second stage channel sensing.

FIG. 4 shows shifting the beginning of the COT after the second stage channel sensing 400. Alternatively, the COT 402 may start after successfully conducting the second stage sensing 401, not only after successful first stage channel sensing. In other words, the beginning of the COT 402 is not necessary to be aligned with the beginning of FFP 403, and it starts after the second stage channel sensing 401. This is equivalent to the Tx window defined above with respect to the example of FIG. 3.

In the embodiments described herein, the notion of a Tx window may be used, and it may be assumed that a COT's beginning is always aligned with the beginning of the FFP after the first stage channel sensing. Shifting the start of the COT after the second stage channel sensing is the equivalent of having Tx window starts after the second stage channel sensing within a COT whose beginning is always aligned with the beginning of FFP.

The embodiments described herein address how the two stage channel sensing can be performed and what the behavior of the devices based on different outcomes in the second stage channel sensing.

Figure 5:
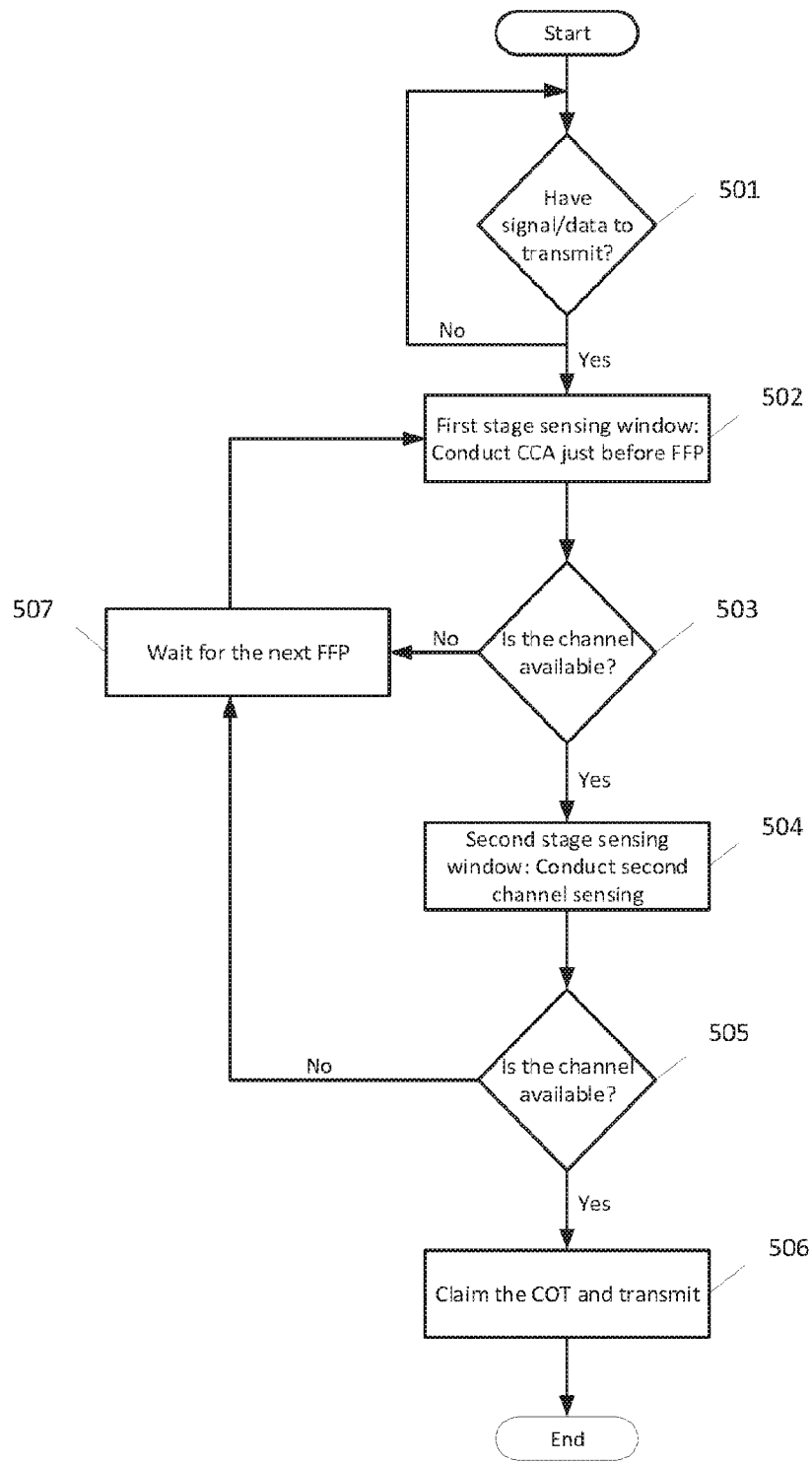
FIG. 5 shows a flowchart illustrating channel access procedure based on two stage channel sensing.

FIG. 5 shows an example flowchart for a FBE's behavior when it attempts to access the channel by applying two stages channel sensing 500. An FBE, e.g., gNB or UE, may check whether transmission needs to occur or not. If no transmission required, then no action should be taken by FBE's physical layer (no in step 501). On the other hand, if the FBE has transmission (yes in step 501), then the FBE does first stage channel sensing, which may occur just before the FFP intended to carry the transmission (step 502). In the first stage channel sensing, the FBE may sense the channel for a fixed time period, e.g., 25 us in CAT2 LBT, immediately before FFP. The channel may be declared idle if the sensed energy is less than or equal certain energy threshold. An FBE may set the maximum energy detection threshold as described herein.

If the channel is declared to be idle after the first stage channel sensing (yes in step 503), then the FBE may proceed to conduct the second stage channel sensing (step 504). If the channel is sensed to be idle (yes in step 505), then the FBE may occupy the channel for the remaining duration of the COT, i.e., Tx win, as illustrated in the example of FIG. 3, and transmit the intended transmission (step 506).

If the channel is sensed to be busy (no in step 503 or no in step 505), the FBE waits until the next FFP (step 507) and may attempt to access the channel applying the first stage channel sensing again (step 502). If a FBE received an indication enabling COT sharing in the current FFP (step 505), then the FBE may cease sensing (unless required by regulations), and the channel may be accessed based on the information provided in this indication.

As another alternative of the aforementioned procedure, the FBE's behavior may be modified if the channel sensed to be busy in the second stage channel sensing (no in step 505). Specifically, instead of waiting to the next FFP (step 507), the FBE node may wait/back-off multiple FFPs depending on the priority class of the intended transmission. For example, the waiting/backing-off time N, e.g. in units of FFP, may be fixed or be predefined. Also, as illustrated in Table 2 below, for example, multiple priority classes may have the same number of back-off FFPs.

TABLE 2

Fixed back-off time for different transmission priority classes

| Transmission priority class (P) | N (FFP) |
|---|---|
| 1 (highest priority) | 1 |
| 2 | 1 |
| . | . |
| . | . |
| . | . |
| Number of priority classes | 5 |

Moreover, instead of fixed values for each priority class, the FBE may randomly pick a back-off time that is uniformly distributed between $N_{min}$ and $N_{max}$ (in units of FFP for example). Table 3 below illustrates an example of the candidate window sizes for different transmission priority classes. For example, for P=1, i.e., the highest transmission priority class, the FBE may choose random back-off value from the window [1, 3], if the channel is sensed to be busy in the second stage channel sensing. The random back-off windows of different priority classes may be non-overlapped as shown in Table 3. Or they may be partially or fully overlapped.

TABLE 3

Random back-off time window for different transmission priority classes

| Transmission priority class (P) | $N_{min}$ (FFP) | $N_{max}$ (FFP) |
|---|---|---|
| 1 (highest priority) | 1 | 3 |
| 2 | 3 | 7 |
| . | . | . |
| . | . | . |
| . | . | . |
| Number of priority classes | 9 | 10 |

The second stage channel sensing window may be divided into multiple second-stage clear channel assessment (2-stage CCA) slots. Each 2-stage CCA may comprise a single Orthogonal Frequency Division Multiplexing (OFDM) symbol or multiple OFDM symbols or slots. In 2-stage CCA, a FBE may access the channel if the detected energy is less than or equal to the maximum energy detection threshold that may be set as described above.

Second stage channel sensing for the DL is described herein. For the DL, the duration of the whole second stage channel sensing may be predefined, e.g., specified per the standard. It may be predefined as ratio of the fixed frame parameters, e.g. FFP, COT, Tx win. and idle win. duration.

Figure 6:
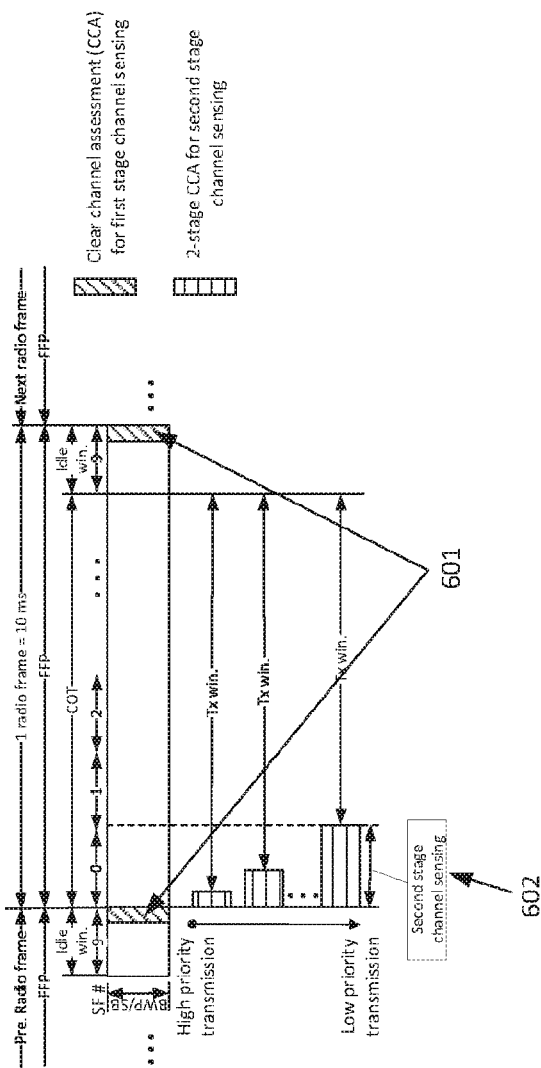
FIG. 6 shows continuous second stage channel sensing with the same start position, but different durations for different transmission priorities.

FIG. 6 illustrates an example of continuous second stage sensing 600. Assuming a gNB/TRP detected no transmission during CCA in the idle window first stage channel sensing 601, and it has a high priority transmission, then it may use short 2-stage CCA for the second stage channel sensing 602 and vice versa for low priority transmission which is associated with long 2-stage CCA. If the channel is sensed to be clear, the gNB/TRP may transmit immediately blocking any other nodes attempting to access the channel. In this case, the Tx window may start immediately after successful 2-stage CCA 602 as shown. In this example, the gNB/TRP is expected to continuously sense the channel during 2-stage CCA 602.

In FIG. 6, the longest 2-stage CCA 602, associated with a low priority transmission, is set to the duration of 1 sub-frame, which may be acceptable for small numerology. For higher numerologies, the longest 2-stage CCA 602 may be set to one slot or so. The duration of 2-stage CCA 602 for different transmission priority classes and numerology may be predefined, e.g. specified per the standard, as illustrated in Table 4.

TABLE 4

Duration of the 2-stage CCA for different numerologies

| Transmission priority class (P) | 2-stage CCA | | | |
|---|---|---|---|---|
| | 15 kHz | 30 kHz | . . . | Highest numerology |
| 1 (highest priority) | 2 (OFDM symbols) | 4 (OFDM symbols) | . . . | Half slot |
| 2 | 4 (OFDM symbols) | 8 (OFDM symbols) | . . . | 1 (slot) |
| . | . | . | . | . |
| . | . | . | . | . |
| . | . | . | . | . |
| Number of priority classes | 14 (OFDM symbols) | 2 (slots) | . . . | 1 sub-frame |

Figure 7:
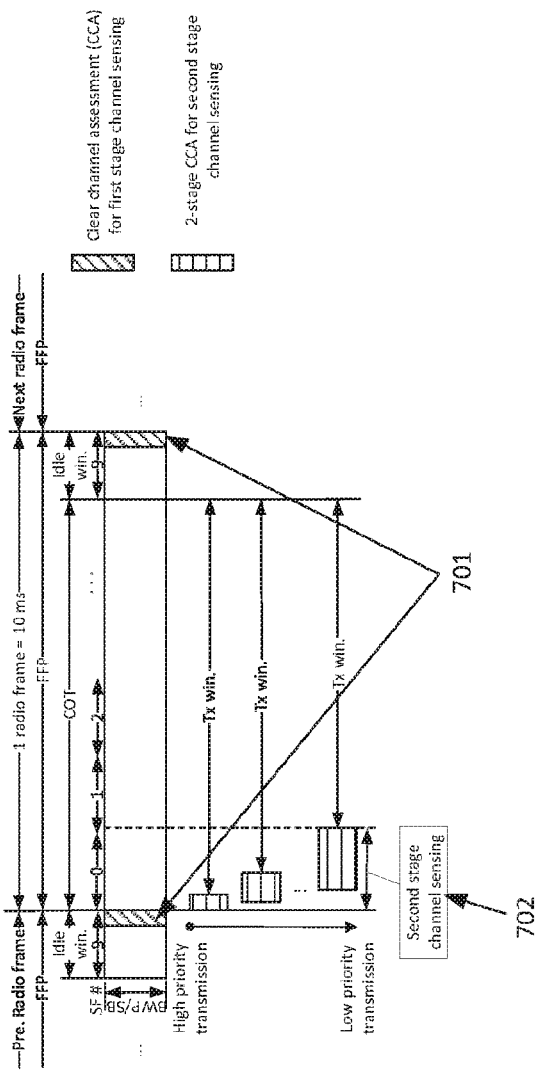
FIG. 7 shows continuous second stage channel sensing with the different start position and durations for different transmission priorities.

FIG. 7 shows continuous second stage channel sensing with the different start position for different transmission priority classes and durations for different transmission priorities 700. Assuming a gNB/TRP detected no transmission during CCA in the idle window first stage channel sensing 701, the node with high priority transmission may start and, most importantly, finish sensing before nodes with lower priority transmission finish their channel sensing. Hence, the node with high priority transmission may start transmission and blocking other nodes from accessing the channel. The 2-stage CCA for second stage channel sensing 702 for different transmission priorities may be partially-overlapped.

Figure 8:
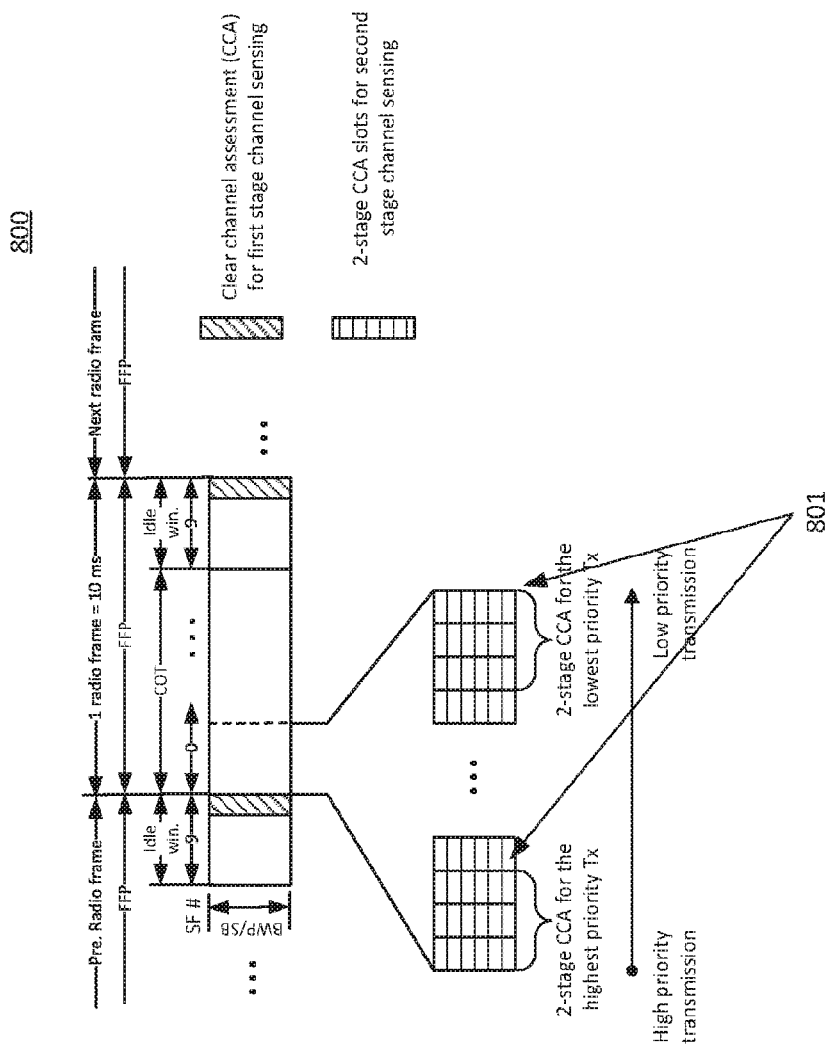
FIG. 8 shows 2-stage CCA slots for second stage channel sensing.

FIG. 8 shows an example of 2-stage CCA slots for second stage channel sensing 800. In this example, the second stage channel sensing window may be divided into many non-overlapped 2-stage CCA slots 801 with different durations or the same duration. A FBE may sense the channel during only one 2-stage CCA slot based on the priority of the intended transmission.

The mapping between the priority of the DL transmission and the 2-stage CCA slots for the second stage channel sensing 801 may be a one-to-one relationship where each DL transmission priority class is mapped to a specific 2-stage CCA slot for the second stage channel sensing 801. The higher the priority class is, the earlier the 2-stage CCA slot is 801. For example, for a very high priority DL transmission class, a gNB/TRP may use the first 2-stage CCA slot 801, or even transmit without doing second stage channel sensing for extremely high priority transmission.

Alternatively, the mapping between the priority of the transmission and 2-stage CCA slots of the second stage channel sensing 801 may be a one-to-many relationship. Each transmission priority class may be associated with multiple 2-stage CCA slots 801. In the example of FIG. 8, each priority class is mapped to three consecutive 2-stage CCA slots for the second stage channel sensing 801. There may be some overlap between the 2-stage CCA slots of different priority classes. Then when a gNB/TRP has a high priority transmission with a certain priority class, then the gNB/TRP may randomly select one of 2-stage CCA slots to assess the channel availability. If the channel is available, then the gNB/TRP may start the transmission immediately to block other nodes from accessing the channel.

The number of 2-stage CCA slots within this duration and how they map to different priority may be predefined, e.g., specified per the standard, or derived according to certain rules. For example, the number of 2-stage CCA slots for the second stage channel sensing may be given by $$M = \left\lceil \frac{\text{Duration of the second stage channel sensing}}{\text{minimum sensing time}} \right\rceil,$$

the minimum sensing time may be predefined. If M=the number of priority classes, then the gNB/TRP may interpret this as each priority class is mapped to a single 2-stage CCA slot. On the other hand, if M> the number of priority classes, then gNB/TRP may interpret this as each priority class is mapped $$N = \left\lceil \frac{M}{\text{number of priority classes}} \right\rceil$$

2-stage CCA slots.

The FBE may apply the same energy threshold in the second stage channel sensing (shown in step 504 of FIG. 5) as same as the energy threshold applied in the first stage channel sensing (shown in step 502 of FIG. 5) depending on the priority of transmission that is intended to be transmitted. If the gNB finds the channel busy during the second stage channel sensing, the gNB may wait to the next FFP, or apply back-off in units of FFP as described above, and repeat both the first and second stage channel sensing (shown in step 505 of FIG. 5).

Enhanced two stage channel sensing is described herein. When a gNB/TRP has passed the first stage channel sensing, according to the regulation, it can still access the channel during the COT after performing another successful CCA if the gap between the first stage channel sensing and new channel access attempt is greater than 16 us. However, if the remaining portion of COT is less than threshold δ, the gNB may not attempt to access the channel as the remaining portion of the COT is not big enough to carry a typical DL transmission. Moreover, it may reduce the power consumption at the UE by avoiding monitoring of DL transmission of remaining portion of COT when it is less than δ and the serving gNB has not already acquired the channel. The value of δ may be predefined, e.g., equal a ratio of FFP, COT, Tx window and the idle window.

Also, the value of δ may be indicated through high layer signaling, e.g. the Radio Resource Control (RRC) parameter FBE_delta, which may comprise units of OFDM symbols, slots, or sub-frames. Alternatively, FBE_delta may be in units of ms. Also, the gNB/TRP may indicate the applicable numerology of FBE_delta. For example, FBE_delta may be applicable for the same numerology of the PDSCH of the RRC IE carrying this parameter. If the numerology used for the DL/UL transmission differs than the numerology used for the PDSCH carrying the RRC IE, then the UE may scale FBE_delta.

Figure 9:
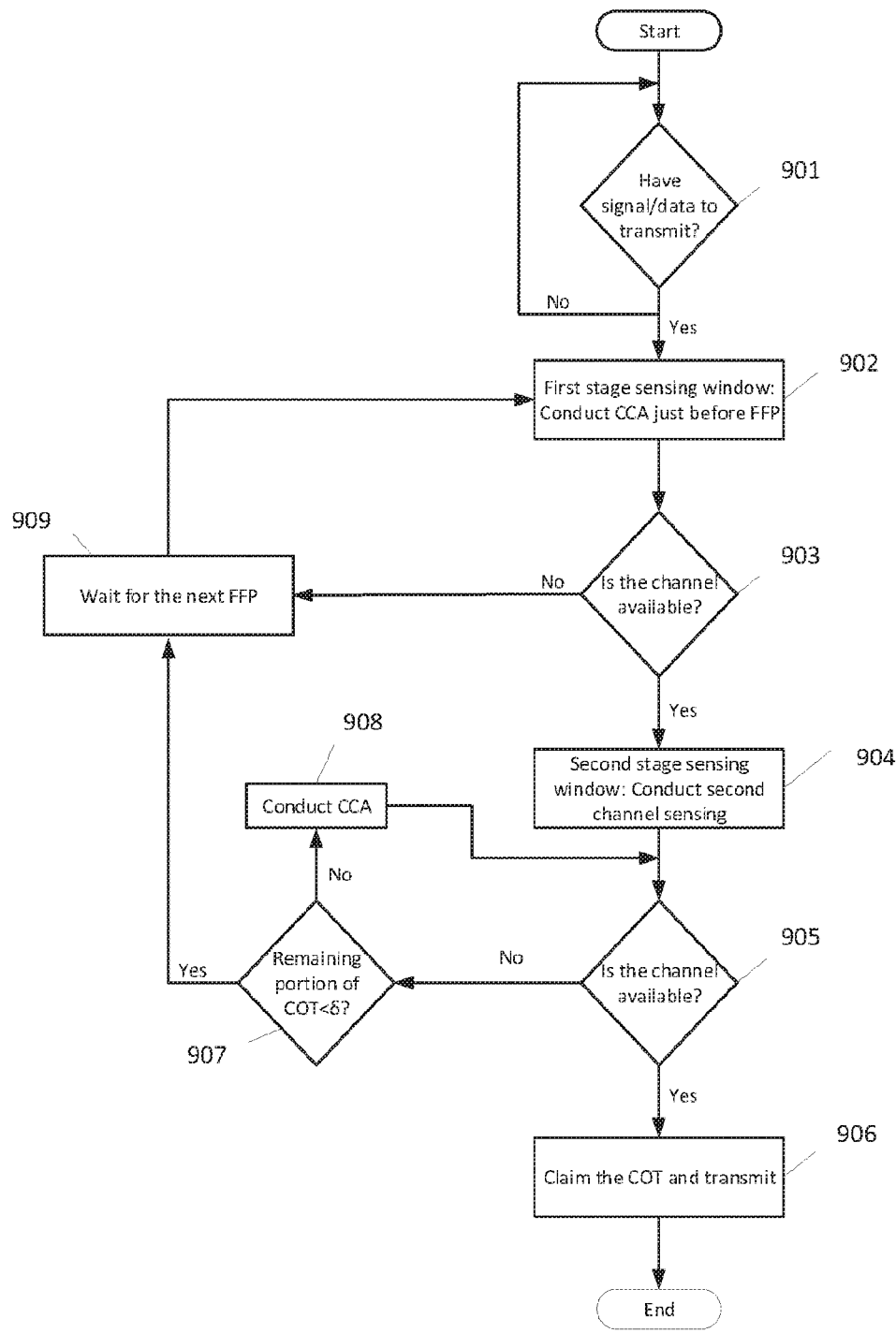
FIG. 9 shows enhanced two stages channel sensing.

FIG. 9 shows an example procedure for enhanced two stage channel sensing 900. The example of FIG. 9 depicts and enhancement in the channel access procedure if the FBE failed in accessing the channel during the second stage channel sensing. The FBE may check whether transmission needs to occur or not. If no transmission required, then no action should be taken by FBE's physical layer (no in step 901). On the other hand, if the FBE has transmission (yes in step 901), then the FBE does first stage channel sensing, which may occur just before the FFP intended to carry the transmission (step 902). If the channel is declared to be idle after the first stage channel sensing (yes in step 903), then the FBE may proceed to conduct the second stage channel sensing (step 904). If the channel is sensed to be idle (yes in step 905), then the FBE may occupy the channel for the remaining duration of the COT, i.e., Tx win, as illustrated in the example of FIG. 3, and transmit the intended transmission (step 906).

If the FBE fails in accessing the channel after the second stage channel sensing (no in step 905), the FBE may assess whether to wait until the next FFP or attempt to access the channel again (step 907) within the same COT. If the FBE assessment indicates more channel accesses attempts can be performed, e.g., the remaining portion of the COT is greater than δ (no in step 907), the FBE may conduct another CCA later in the COT and assess the channel again (step 905). If the remaining portion of the COT is smaller than δ (yes in step 907), the FBE may attempt to access the channel again in the next FFP (step 909).

The channel assessment in step 908 may be as same as CCA in the first channel sensing stage (step 902). Or it may be different as long as it meets the regulation requirements. For example, the CCA in step 908 may be shorter than the CCA in step 902. For example, instead of doing CAT2 LBT of 25 us, the FBE may sense the channel for 9 us. The energy threshold of CCA in step 908 may be as same as the energy threshold in step 902 depending on the priority class of the transmission. The energy threshold of CCA in step 908 also may change from sensing slot to another. As the FBE gets closer to the end of the COT, it may be more aggressive and apply higher energy thresholds to the attempts near the end of the COT than those applied earlier in the COT. If the remaining portion of COT is less than δ (yes in step 907), gNB/TRP may back-off to the next FFP or back-off by multiple FFPs as described above depending on the priority of the transmission.

Figure 10:
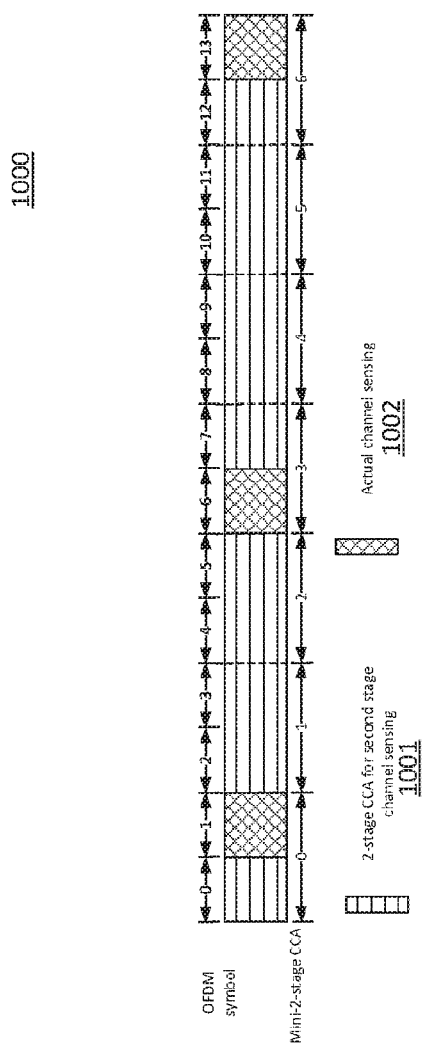
FIG. 10 shows dividing 2-stage CCA into multiple mini-2-stage CCA.

FIG. 10 shows dividing 2-stage CCA into multiple mini-2-stage CCA 1000. Instead of sensing the channel for the whole duration of 2-stage CCA, this duration may be divided into multiple mini-2-stage CCA durations 1001 that may be unequal or equal durations as shown in FIG. 10. A gNB/TRP may select one or more mini-2-stage CCAs either randomly or according to one or more rules to conduct channel sensing 1002. The gNB/TRP may sense for the whole duration of the mini-2-stage CCA or small portion(s) of it as shown in FIG. 10. Several alternatives are described herein to select in which mini-2-stage CCA should be conducted. For example, the first and last mini-2-stage CCA may at least be selected for channel assessment. In addition, M mini-2-stage CCA in-between may be randomly selected depending the duration of the 2-stage CCA. An FBE may randomly choose the first mini-2-stage CCA, then randomly select the next mini-2-stage CCA in the duration between the previous mini-2-stage CCA to the last mini-2-stage CCA. FBE may continue selecting mini-2-stage CCAs until M mini-2-stage CCA is selected or reach the last mini-2-stage CCA, which may be always selected.

Figure 11:
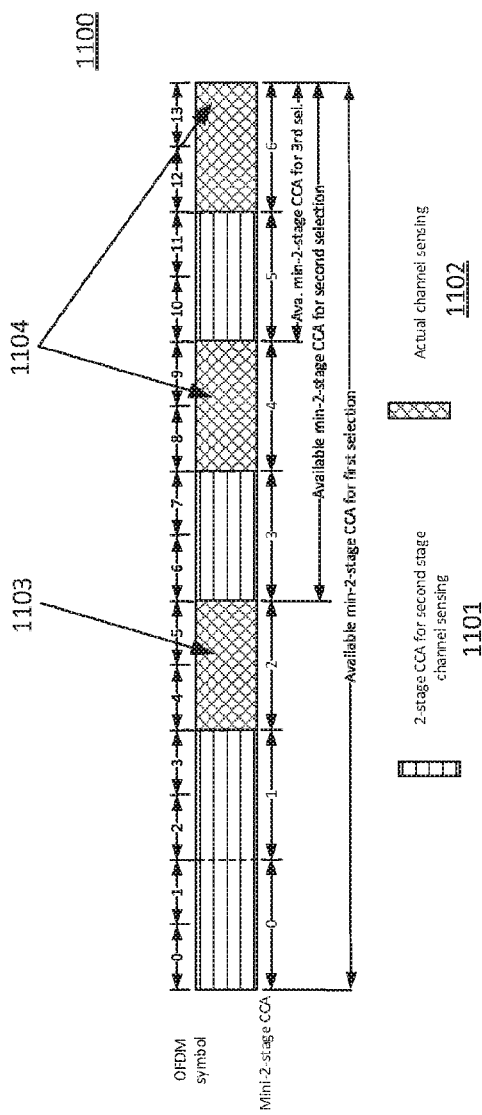
FIG. 11 shows random selection of mini-2-stage CCA.

FIG. 11 shows random selection of mini-2-stage CCA 1100. In the example of FIG. 11, the duration of 2-stage CCA may be divided into multiple mini-2-stage CCA durations 1101 that may be unequal or equal durations. A gNB/TRP may select one or more mini-2-stage CCAs either randomly or according to one or more rules to conduct channel sensing 1102. In the example of FIG. 11, M=3. In this case, the first mini-2-stage can be randomly selected from [0, 6] mini-2-stage CCA. Assuming mini-2-stage CCA 2 is selected 1103, then second mini-2-stage can be randomly selected from [3, 6] mini-2-stage CCA 1104. Assuming mini-2-stage CCA 4 is selected, the third mini-2-stage can be randomly selected from [5, 6] mini-2-stage CCA.

If the sensing across all mini-2-stage CCAs are clear, the channel is declared to be idle. If energy detection is used for channel sensing in each mini-2-stage CCA, then the maximum energy threshold may be defined as described above.

If the sensing across the majority mini-2-stage CCAs are clear, the channel is declared to be idle. If energy detection is used for channel sensing in each mini-2-stage CCA, then the maximum energy threshold may be defined as described above.

If the sensing across the majority mini-2-stage CCAs and the last mini-2-stage are clear, the channel is declared to be idle. If energy detection is used for channel sensing in each mini-2-stage CCA, then the maximum energy threshold may be defined as described above.

Second stage channel sensing for the UL is described herein. The channel access procedures for DL/TRPs described herein may be applied by the UE attempting to access the channel for UL transmission. For a UE initiating the COT, the parameters of the second stage channel sensing may be signaled to the UE. For UEs in the RRC connected state, RRC parameters may be used to convey information including but not limited to: information on the duration of the second stage, information on which slot the UE may use to sense the channel, information on how it is mapped to different priority classes of UL transmissions, and information on the energy threshold that the UE may use.

Such RRC parameters may be transmitted as a part of a UE-specific RRC IE that may be scheduled by downlink control information (DCI) with the CRC scrambled with the Cell Radio-Network Temporary Identifier (C-RNTI), for example, with DCI format 1_0 or 1_1. Moreover, these RRC parameters may be transmitted as a part of a common RRC IE that may be scheduled by a DCI with the CRC scrambled with a RNTI for a group of UEs.

For UEs in the RRC idle/inactive state, several configurations of the second the stage channel sensing may be pre-provisioned into the UE, may be broadcasted, or may be configured. The selected index may be provided in the SSB, in the RMSI, or in the other system information (OSI). For example, Table 5 provides the configurations, and its index may be indicated by a 4-bit field.

TABLE 5

Second stage channel sensing configurations

| Configuration index | Duration of the second stage sensing (ms) | Number of sensing slots |
|---|---|---|
| 1 | 1 | 4 |
| 2 | 2 | 5 |
| . | . | . |
| . | . | . |
| . | . | . |
| 16 | 5 | 3 |

The mapping between the priority class of the UL transmission and the channel sensing slot may follow the same rules applied for the mapping between the priority class of the DL transmission and the channel sensing slot.

A starvation issue may occur when a particular device fails to access the channel for certain transmission priority classes or all of them for a relatively long duration due to being blocked by other devices. This may happen for several reasons.

Figure 12:
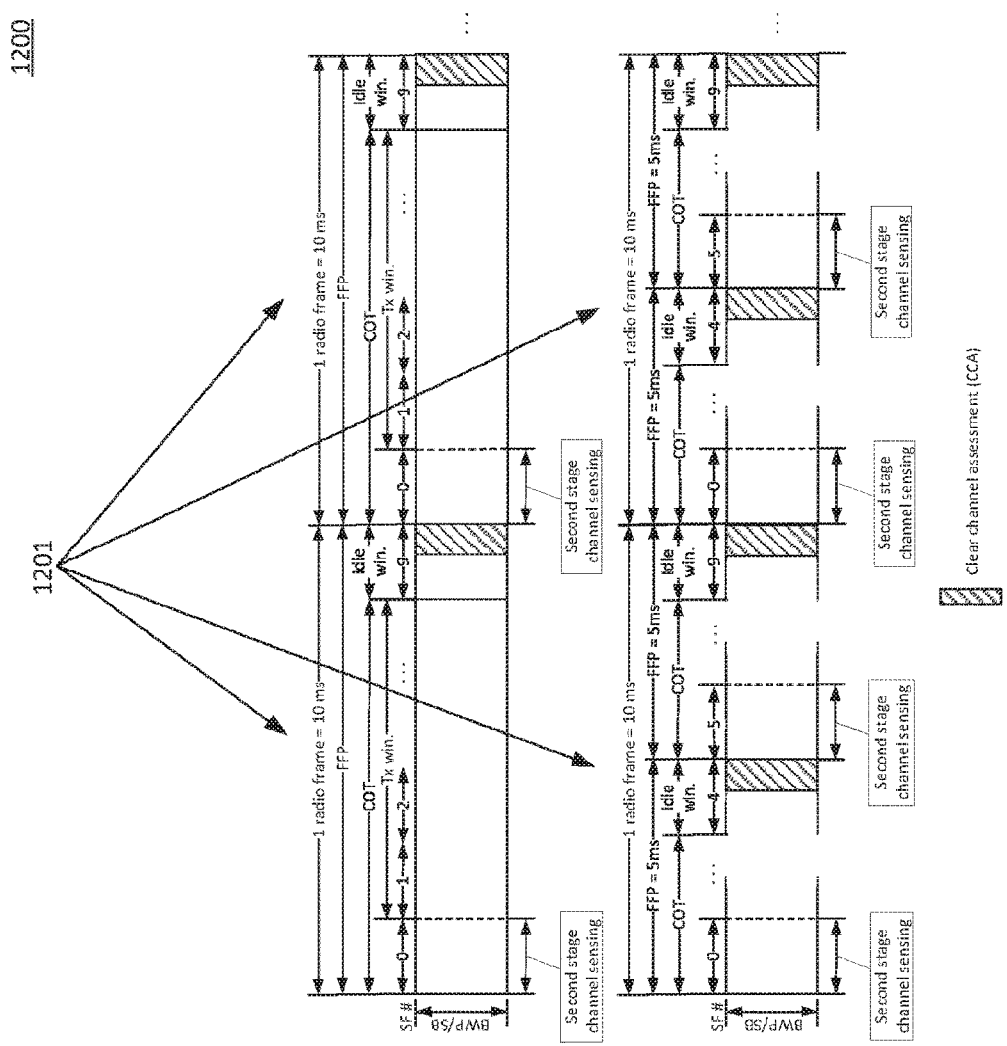
FIG. 12 shows different devices have different FFPs.

FIG. 12 shows different devices have different FFPs 1200. In the example of FIG. 12, the devices may use different FFPs, but their radio frame boundaries are aligned 1201.

Figure 13:
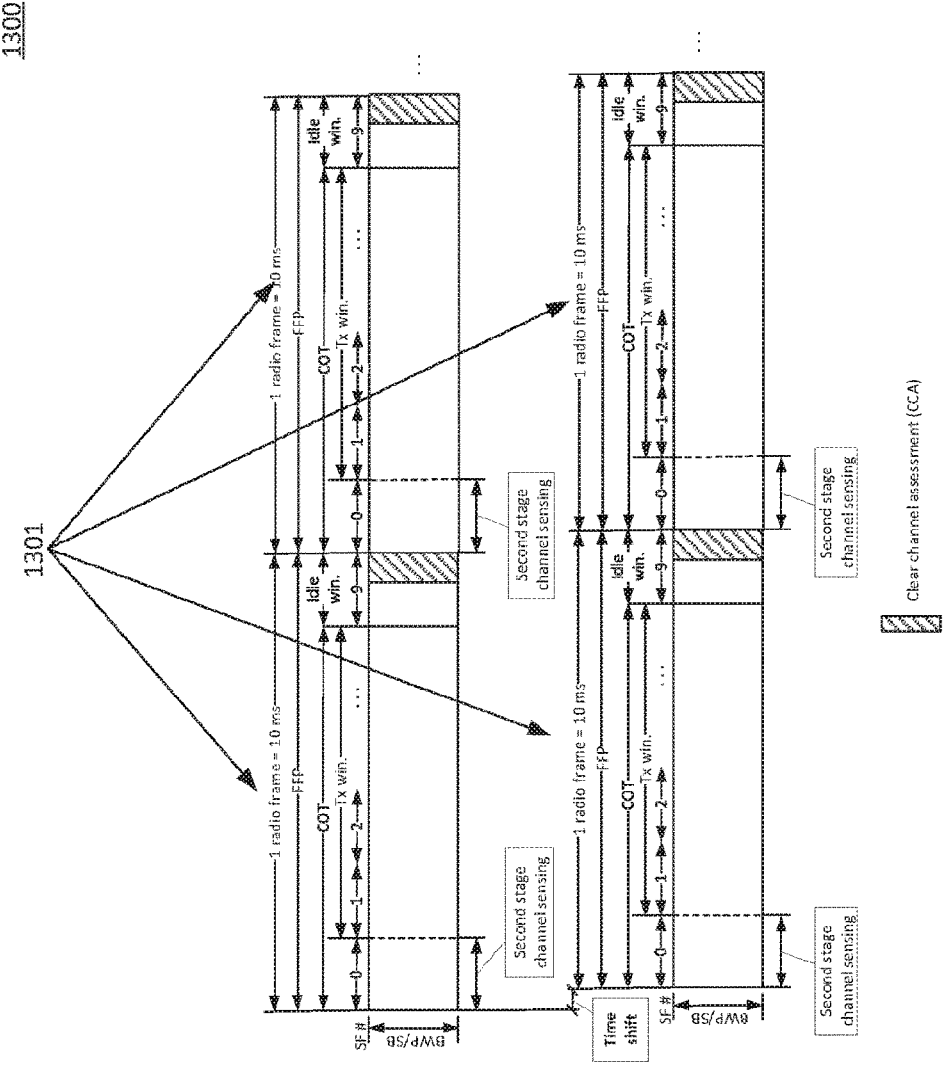
FIG. 13 shows the radio frame boundaries of different devices are not aligned.

FIG. 13 shows the radio frame boundaries of different devices are not aligned 1300. In the example of FIG. 13, the devices are not synchronized 1301, and their frame boundaries are shifted. Some devices may always have higher priority transmissions than the starving devices.

In the scenarios depicted in FIG. 12 and FIG. 13, there is a high chance that a set of devices occupy the channel before another set of devices and block them for an extended period of time. The following procedures address these challenges:

Any FBE that occupies the channel for extended period of time may abandon the channel for certain period of time even if it is sensed to be clear. The maximum consecutive FFP(s) that can be occupied may be denoted by $O_{max}$, and $A_{min}$ may be used to label the minimum number of FFP(s) that may be abandoned after $O_{max}$ FFP(s) are consecutively acquired by a FBE.

The values of $O_{max}$ and $A_{min}$ may depend on the priority class of the intended transmission, numerology, and so forth. For example, Table 6 shows some numeric vales for $O_{max}$ and $A_{min}$ where the high transmission priority class is allowed to occupy more consecutive FFPs than the low transmission priority class. Meanwhile, the high transmission priority class may abandon the channel for a less number of FFPz than the low transmission priority class.

TABLE 6

Maximum occupation time and minimum abandon time for different transmission priority class

| Transmission priority class (P) | $O_{max}$ | $A_{min}$ |
| --- | --- | --- |
| 1 (highest priority) | 4 (FFP) | 1 (FFP) |
| 2 | 3 (FFP) | 2 (FFP) |
| . | | |
| . | | |
| Number of priority classes | 1 (FFP) | 4 (FFP) |

For the case that different FFPs are used or that the FBEs are not synchronized, the values of $O_{max}$ and $A_{min}$ may be independent of the transmission priority class. Alternatively, their values may depend on the transmission priority class as illustrated in Table 6, for example.

For a UE-initiated COT, the values of $O_{max}$ and $A_{min}$ may be predefined or indicated through high layer signaling, e.g. the RRC parameter max_consecutive_FFP and min_released_FFP for $O_{max}$ and $A_{min}$, respectively. The length of each parameter may be equal to the number of priority classes and ordered from the highest priority to the lowest one, for example.

Such RRC parameters may be transmitted as a part of a UE-specific RRC IE that may be scheduled by a DCI with the CRC scrambled with the C-RNTI, for example, DCI format 1_0 or 1_1. Moreover, these RRC parameters may be transmitted as a part of a common RRC IE that may be scheduled by a DCI with the CRC scrambled with a RNTI for a group of UEs.

For UEs in the RRC idle/inactive state, the values of $O_{max}$ and $A_{min}$ may be pre-provisioned into the UE, broadcasted through the SSB, in the RMSI, and/or in the OSI.

In other situations, the gNB may intentionally configure a time shift (time offset) between its FFP and the FFP of the UE as shown in FIG. 13, for example, where the upper and lower FFP are deployed by the gNB and UE, respectively. The UE may assume that the periodicity of its FFP is equal to the periodicity of the gNB's FFP. However, the periodicity of UE's FFP and gNB's FFP may be different in general.

The time shift (time offset) value may be relative to the beginning of gNB's FFP. It also may be relative to a particular SFN or slot. The offset value may be in units of slot, OFDM symbols, absolute time units such as milisecond, etc.

For the indication of the time shift (time offset), the gNB may transmit as part of high layer signaling such as a RRC or MAC-CE. For example, it may be broadcasted in the RMSI-PDSCH or OSI. Moreover, it may be transmitted in a UE-specific RRC message or provided by the MAC-CE. If the UE received a broadcast time offset value, by RMSI for example, and then received another offset value through the UE-specific RRC, then the UE may apply the offset value indicated by the UE-specific RRC or MAC-CE. The time shift (time offset) may also be indicated in the PDCCH. Either broadcast/groupcast PDCCH such as RMSI-PDCCH or UE-specific PDCCH. A new field may be introduced to indicate one value out of a predefined set of values that may be specified, provided in the specs. Alternatively, these set of values may configured be high layer signaling such as RRC or MAC-CE or both.

The time shift (time offset) values may be implicitly configured to the UE by the configured/scheduled UL transmission. For example, the configured grant PUSCH may indicate the offset that the UE may apply. For example, the UE's FFP may start from the first PUSCH occasion after the beginning of the gNB's FFP. If the UE is configured with multiple configured grants, the UE may apply a similar rule for a particular grant (for example, the grant with the smallest index. A similar approach may be applied for PRACH transmission occasions. Also, the time shift (time offset) may be equal to one of the parameters that are configured for a configured grant such as "timeDomainOffset", "timeReferenceSFN", "offset," etc.

Moreover, multiple time shift (time offset) values may be configured and each value may correspond to a particular channel access priority class, based on the priority of the intended UL transmission, for example. Then the UE may select the proper time shift (time offset) based the priority of the intended UL transmission. Once a particular value is selected, the UE has to keep applying the same value for each channel access attempt for a certain duration such as 200 ms.

When a UE detects that the gNB acquired the channel according to the gNB's FFP, the UE may not initiate its own COT, but the UE may still share the gNB's initiated COT.

Since different UEs may be configured/apply different time shift (time offset) values, it may be beneficial that the UE, which starts its COT early to terminate the transmission and release the channel early (even before the end of its COT) to give a chance for other UEs to initiate their transmissions. For example, a UE may only use a particular portion of the COT which may be indicated by high layer signaling such as RRC or MAC-CE. Alternatively, the UE may only transmit in the first few UL occasions and then release the channel. For example, if there are multiple configured grant PUSCH/PRACH occasions that fall within a UE's initiated FFP, then the UE may only utilize the first few occasions. The number of occasions may be configured by high layer signaling such as RRC or MAC-CE or indicated by either GC-PDCCH or UE-specific PDCCH.

Transmissions in the idle window are described herein. If the regulation requirements allow transmissions to occur in the idle window, then the aforementioned channel access procedures based on energy detection threshold adaptation and/or two stage channel sensing may be applied. The key difference is that the second stage channel sensing may start earlier, e.g., in the idle window. Specifically, the second stage channel sensing may start at a particular portion of the idle window. For example, it may start at the last few OFDM symbols, slots, and so forth. Also, it may end in the idle window, or it may cross the boundary between the idle window and the next FFP. Once an FBE finishes the second stage channel sensing, it may commence transmission even if it may be in the idle window. Also, an FBE may directly conduct second stage channel sensing without doing first stage channel sensing.

LBE channel access procedures during the COT are described herein. As yet another possible solution, an FBE may conduct the channel access procedure similar to the ones conducted by an LBE as second stage channel sensing after passing the first stage channel sensing. For example, if a discovery reference signal (DRS) is intended to be transmitted, the second stage channel sensing may be CAT2 LBT if the DRS duty cycle is less than $1/20$ and its duration is 1 ms.

Otherwise CAT4 LBT may be conducted with the highest channel access priority. For unicast PDCCH and PDSCH, the second stage channel sensing may be CAT 4 LBT with a priority class that is selected according to the multiplexed data.

Similarly, if the intended UL transmission is a RACH, then the second stage channel sensing may be various LBT types depending on the purpose of the RACH and whether it is 4-step RACH or 2-step RACH. If the intended UL transmission is on the PUSCH, then the second stage channel sensing may be a CAT 4 LBT with a channel access priority class selected according to the data.

The priority transmission class is inherited in the channel access procedure for the LBE by deploying different contention window sizes for different transmission priority classes. Consequently, any transmission with high priority has higher chance to be transmitted than lower priority transmission.

Channel sharing and COT indication are described herein. It is beneficial that initiating device, e.g., either the gNB or UE, indicate that it successfully acquires the channel by transmitting an indicator, which it may be denoted by a CAI, such that other responding devices become aware of which nodes occupied the COT. Moreover, such an indicator may be useful for other NR-U nodes (e.g. gNBs, TRPs and UEs) belonging to either the same operator or a different one. Also, this indicator is not limited to associated NR-U nodes (e.g., the gNB/TRP may transmit a CAI to its UEs), the gNB/TRP may transmit the CAI to UEs not under its control either belonging to the same operator or a different one, the gNB/TRP may transmit the CAI to another gNB(s)/TRP(s) either belonging to the same operator or a different one, or the UE may transmit the CAI to the gNB(s)/TRP(s) associated with this UE). Even other devices from different RATs attempting to occupy the unlicensed channel may transmit the CAI to avoid transmitting while the COT is occupied by other nodes and causing interference. The indication may carry information including but not limited to one or more of the following information:

Parameters associated with frame periodicity (FFP), the length of the COT, the length of the idle window.

Channel access priority: The indication may carry priority class of the transmission.

The duration of the actual transmission period: The initiating FBE device may not occupy the whole COT. In fact, it may occupy a small portion of COT, which as described above may be labeled as Tx window, especially if the initiating FBE device is a UE. Therefore, such information may allow other nodes to exploit the remaining portion of the COT. If the CAI is transmitted to an associated node, then it knows when to expect receiving transmission for the initiating node.

Spatial information: It may carry information about which beam is occupied in this FFP if directional beam sensing is deployed.

Operation bandwidth: It may carry information about the operating bandwidth, e.g., BWP/sub-band.

Indication whether COT sharing is allowed or not. If it is allowed, CAI may also carry indication for the sharing duration.

Regardless the applied channel access procedure, e.g. single stage channel sensing, two stage channel sensing, or other channel access procedures, a CAI may be transmitted at earliest time.

The intended transmission may immediately follow the CAI with no time gap in-between, or with a time gap less than or equal to particular threshold (e.g., 16 us), or with a time a gap greater than particular threshold such as 16 us.

Figure 14:
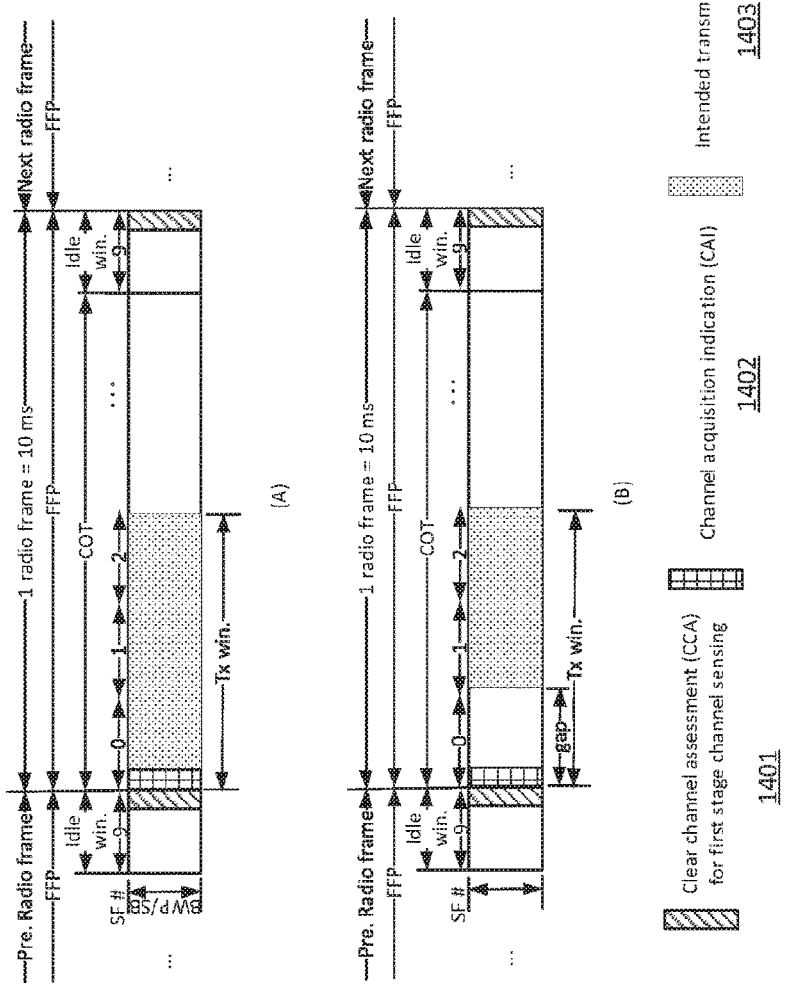
FIG. 14 shows CAI transmission for single stage channel sensing (A) the intended transmission follows immediately CAI (B) there is a gap in-between the intended transmission and CAI.

FIG. 14 shows an example CAI transmission when single stage channel access procedure is applied 1400. If the channel is declared to be idle during CCA 1401, a CAI 1402 may be transmitted at the beginning of the FFP followed by the intended transmission 1403 with no time gap in-between them as shown in scenario (A). In this case, the CAI 1402 may indicate a Tx window among other information.

In scenario (B), the CAI 1402 and the intended transmission 1403 may be separated in time. In this example, the CAI 1402 may indicate the Tx window and the time gap in-between the intend transmission 1403 and the CAI 1402. Below, details are provided on how such information may be conveyed for different CAI signals and/or channels.

Also, in single stage channel sensing, the first transmission of CAI may not be restricted at the beginning of FFP.

Figure 15:
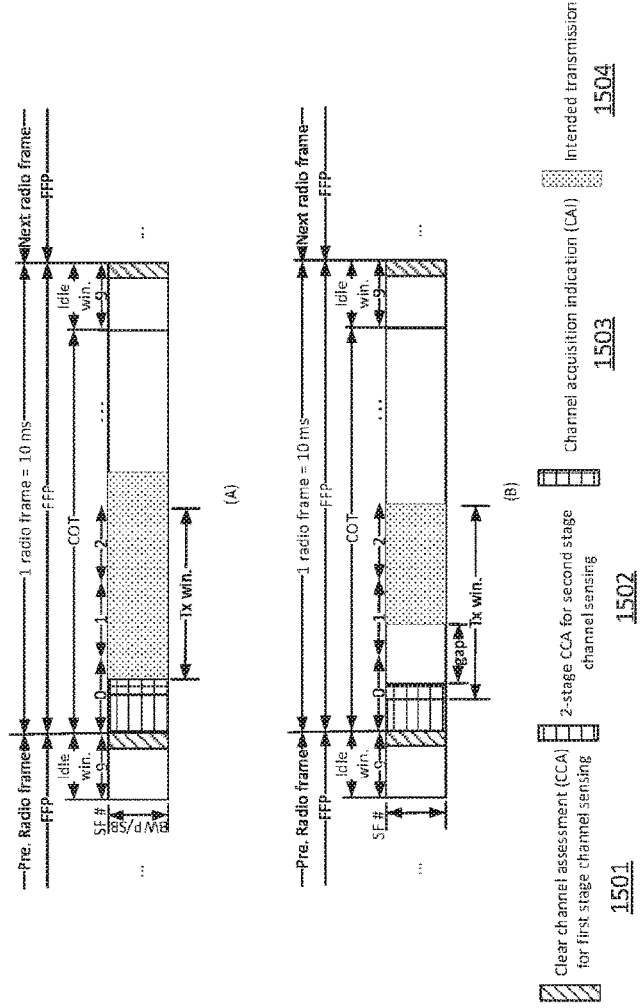
FIG. 15 CAI transmission for two stages channel sensing (A) the intended transmission follows immediately CAI (B) there is a gap in-between the intended transmission and CAI.

FIG. 15 illustrates another example of CAI transmission when two stages channel access procedure is applied 1500. If the channel is declared to be idle, the CAI 1503 may be transmitted at the beginning of the Tx window followed by the intended transmission 1504 with no time gap in-between them as in scenario (A). In this case, the CAI 1501 may indicate the Tx window among other information. In scenario (B), the CAI 1503 and the intended transmission 1504 may be separated in time. In this CAI 1503 may indicate the Tx window and the time gap in-between the intend transmission 1504 and the CAI 1503. Below, details are provided on how such information may be conveyed for different CAI signals and/or channels.

Moreover, either for single 1501 or two stages channel sensing 1502, the CAI 1503 may be repeatedly transmitted during the Tx window to increase the chance of its detectability/decodability, to indicate an updated information Tx window that can be shortened or extended in either time or/and frequency domains.

The FBE may be required to sense the channel again before the actual transmission depending on the duration of gap. Having a gap between the CAI 1503 and the actual transmission may at least have the following benefits:

If gNB reserves the channel for an UL transmission, a gap may be needed to allow the UEs to switch from the DL to the UL and prepare the UL transmission.

It reduces the processing overhead and power consumption as the CAI may provide some information about the time-frequency resources to carry the transmission. Hence, the receiving device, e.g. UE, may reduce its monitoring effort.

It allows for better utilization of the COT for different transmission priorities. For example, a device with a low priority transmission may leave a time gap between its CAI and actual transmission such that other FBE devices with a high priority transmission may exploit this gap and transmit.

Figure 16:
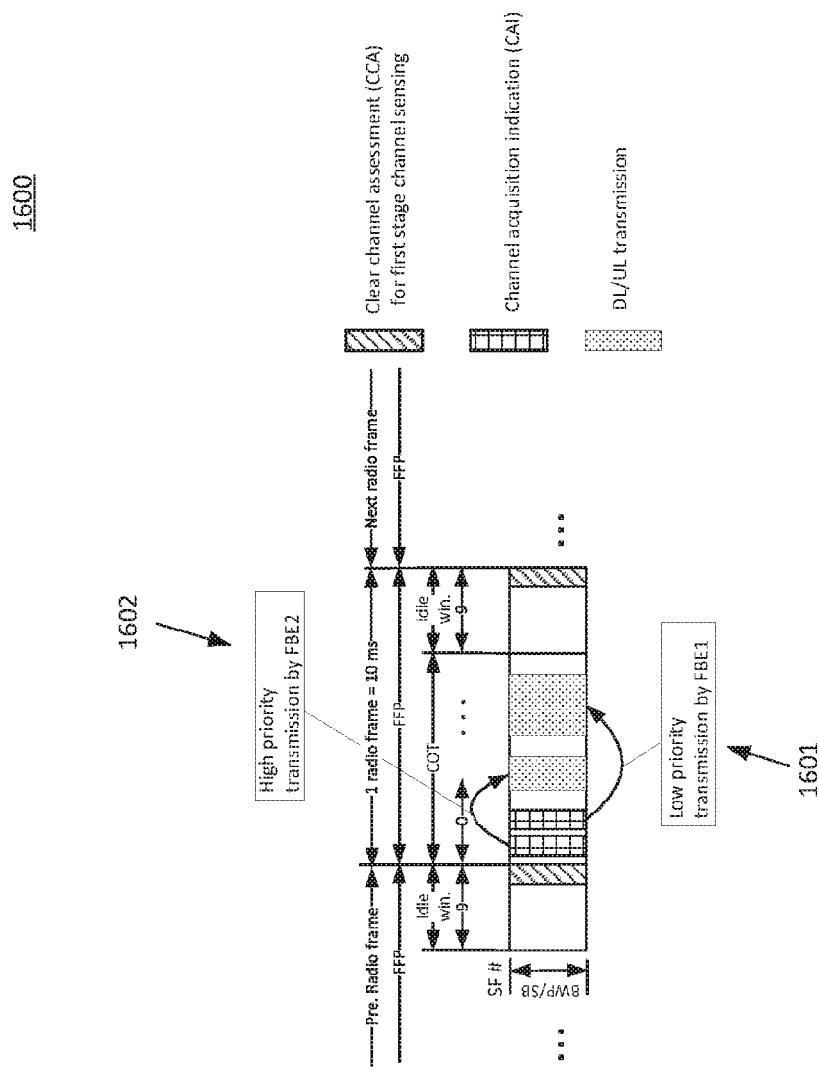
FIG. 16 shows a high priority transmission may occupy the gap in-between low priority transmission and its CM.

FIG. 16 shows a high priority transmission may occupy the gap in-between low priority transmission and its CAI 1600. In this example, FBE1 has a low priority transmission 1601, and FBE2 has a high priority transmission 1602. In this case, the transmission of FBE2 1602 may take place close to the end of the COT leaving a gap between its CAI and the actual transmission. Hence, FBE2 may perform its transmission in this gap. For example, FBE2 may comprise a gNB/TRP reserving the channel for high priority UL transmission, while FBE1 may be another gNB/TRO reserving the channel for low priority UL transmission. In this case, FBE2 may transmit its CAI before the other CAI from FBE1. This may give more time for its UE(s) to prepare UL transmission as shown in FIG. 16, for example.

This does not exclude the possibility that the CAI for a low priority transmission followed by the intended transmission may occur in the time gap between the high priority transmission and its CAI. Also, the CAI for high priority transmission followed by the intended transmission may occur in the time gap between the low priority transmission and its CAI.

CAI may be comprise signal(s), channel(s), or a combination of both. In addition to the information to be carried in the COT indication for LBE, information related to the priority class of the transmission may be included as well. For the DL, the CAI may be wideband DL-demodulation reference signal (DMRS), DMRS of PDCCH, CSI-RS, SSB, Primary synchronization signal (PSS), secondary synchronization signal (SSS), group-common PDCCH, and/or UE specific PDCCH. For the UL, the CAI may comprise the SRS, the UL-DMRS, the PRACH, the PUCCH, and/or PUSCH.

In addition, the CAI may carry information about the frame periodicity that the FBE intends to use, the duration of COT, and the idle window in each FFP. If the FBE intends to use a portion of the COT, referred to as the Tx window, then the CAI may convey information about the Tx window.

The term of equivalent priority class is introduced. Throughout this disclosure priority and equivalent priority may be used interchangeably. Then, different candidate signals/channels of the CAI that may carry information about the priority and information about FFP parameters are described.

It is expected that the COT may include multiple transmissions with different priority classes. Also, the COT may include both the DL and the UL transmissions (from a single UE or multiple UEs), and each may have its own priority class and last for different durations.

Therefore, it is beneficial to derive an equivalent priority class that may be used to define how an FBE may attempt to access the channel. Also, for COT sharing, it is important to enable the channel sharing with a transmission that belongs to the same or a higher channel access priority than the one used to initiate the COT. For example, if a FBE acquires the channel using the channel access procedure associated with the highest priority transmission, then it may share the channel with other FBEs for only the highest priority transmissions.

The equivalent priority class may be equal to the priority class of the transmission that has the smallest priority class in the COT.

Alternatively, the gNB/TRP may calculate an equivalent priority class based on one or more rules. The one or more rules may comprise, for example, a metric called the average priority class defined by $$\left\lceil \frac{\sum_{i=1}^{N} T_i}{N} \right\rceil,$$

where $T_i$ is the priority class of the $i^{th}$ intended transmission if the channel is available, and N is number of different priority classes that may be multiplexed if the COT is acquired.

The equivalent priority class may depend on other parameters of the intended transmissions in the COT rather than their channel access priority class. For example, if there is an intended transmission with the lowest channel access priority class in the COT, it may be unfair to assume that the equivalent priority class is equal to the lowest one. Especially if this transmission is intended to occupy a small duration of the COT compared with other transmissions with high channel access priority classes.

Therefore, it is proposed to derive the equivalent channel access priority class using weighted averaging. Specifically, the channel access priority class of each transmission may be weighted by a function of the duration of this transmission.

Other parameters may be included in the calculation of the equivalent priority class such the occupied bandwidth, the number of sub-bands spanned by this transmission, the number of PRBs, the nature of the transmission either it is periodic, semi-persistent, or aperiodic, and so forth.

The DL-RS may be used as an CAI. The DL-RS may comprise, but is not limited to, wideband/narrow-band DMRS in a control resource set (CORESET), DMRS of PDCCH/PDSCH, CSI-RS. Though solutions are described herein for wideband/narrow-band DMRS in a CORESET or DMRS of PDCCH/PDSCH, the described solutions can be applied for CSI-RS as well. Unless otherwise stated, the DMRS may be used to refer to wideband/narrow-band DMRS in a CORESET or DMRS of PDCCH/PDSCH.

The FBE may only use a limited set of FFP values such as, for example, 2 ms, 5 ms, 7 ms, or 10 ms. These values may be predefined e.g., specified per the standard. The selected value of FFP may be indicated by DMRS. Also, it may be assumed that FFP start from the first symbol of the radio frame.

To indicate the selected value, the DMRS sequences may be divided into several groups and each one or set of them may correspond to FFP values. Also, an indication of the selected FFP value may be conveyed in the DMRS initialization sequence.

Other information about the COT duration and the idle window may be associated with the FFP values. For example, a UE may assume that the COT and idle window occupy the maximum and minimum durations of the COT, respectively, e.g. 95% of FFP for the COT and 5% of the idle window.

Upon detecting DMRS, a UE may assume no time gap between CAI and the intended transmission. Hence, the Tx window is assumed to start immediately after CAI reception, and the UE is expected to monitor DL transmissions based on the provided configurations for the whole Tx window until the end of the COT.

Indicating priority of the intended transmission is described herein. Wideband DMRS and DMRS of PDCCH may be used to indicate that gNB acquired the channel. The DMRS sequences may be divided into several groups and each one or set of them may correspond to particular priority class of the DL transmission.

Figure 17:
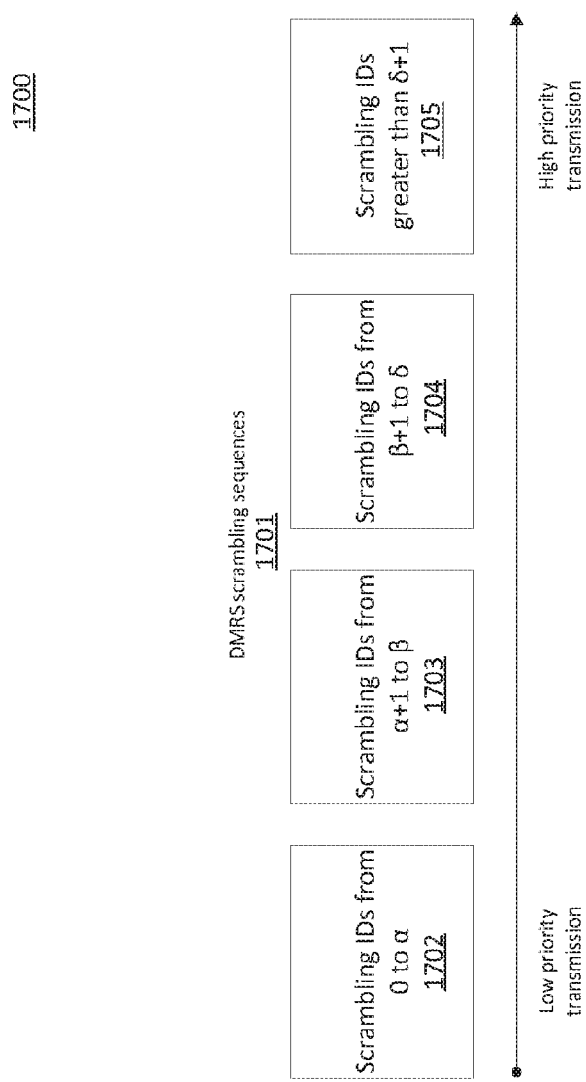
FIG. 17 shows dividing DMRS scrambling IDs into groups depending on the priority of DL transmission.

FIG. 17 shows dividing DMRS scrambling IDs into groups depending on the priority of DL transmission 1700. In this example, the DMRS scrambling sequence IDs 1701 are divided into four groups, where the first group 1702 is used for low priority transmissions and comprises scrambling sequence IDs from 0 to $\alpha$. The second group of scrambling sequence IDs 1703 correspond to the second priority class and comprises scrambling sequence IDs from $\alpha+1$ to $\beta$ 1703. The third group of scrambling sequence IDs 1704 correspond to the third priority class and comprises scrambling sequence IDs from $\beta+1$ to 6. The last group of scrambling sequences IDs 1705 comprises scrambling sequence IDs higher than $\delta+1$ and corresponds to the highest priority transmission.

The parameters defining the groups, e.g., $\alpha$, $\beta$ and $\delta$, may be predefined, and the mapping between each group and the channel access priority class may be predefined as well. Alternatively, the mapping may be derived by one or more rules. For example, assuming $\alpha \leq \beta \leq \delta$, then the group of scrambling IDs less than or equal $\alpha$ corresponds to lowest channel access priority class. Then the group of scrambling IDs between $\alpha+1$ and $\beta$ corresponds to the second channel access priority class, and so forth.

Alternatively, the number of groups and boundary of each group may be provided by a high-layer parameter, e.g., the RRC DMRS-priority parameter indicating the threshold values $SC\_ID_i$, i=1, . . . , where T is the number of channel access priority classes. Table 7 shows an example of such configurations.

If the high layer parameter indicates that $SC\_ID_{i-1} = SC\_ID_i$, then the channel access priority of the associated row where both $SC\_ID_{i-1}$ and $SC\_ID_i$ appear is disabled. This may be beneficial if the gNB has transmissions that fall within this channel access priority class. Consequently, the gNB may divide the DMRS sequences IDs on the needed channel access priority classes.

TABLE 7

Mapping channel access priority class to DMRS scrambling ID

| DMRS scrambling ID | Channel access priority |
|---|---|
| 0 < DMRS scrambling ID ≤ $SC\_ID_1$ | 1 |
| $SC\_ID_1$ < DMRS scrambling ID ≤ $SC\_ID_2$ | 2 |
| . | . |
| . | . |
| . | . |
| $SC\_ID_{T-1}$ < DMRS scrambling ID | T |

Alternatively, DMRS initialization may be dependent on the channel access priority class. For example, the pseudo-random sequence generator may be initialized with $$c_{init} = (2^{17}(N_{symb}^{slot} n_{s,f}^{\mu} + l + 1)(2N_{ID}^{nSCID} + 1) + 2N_{ID}^{nSCID} + n_{SCID} + \omega) \mod 2^{31}$$

where is the OFDM symbol number within the slot, $n_{s,f}^{\mu}$ is the slot number within a frame, $\omega$ depends the channel access priority class of the DL transmission, e.g., $\omega$ may equal the channel priority class and the other parameters that follow, e.g., TS 38.211.

The values of $\omega$ and its association with the channel accesses priority class may be predefined or it may be configured by high layer signaling, e.g., the RRC parameter scrambling_priority_ID indicating the value of $\omega_i$, i=1, . . . , T, as illustrated in Table 8.

TABLE 8 scrambling_priority_ID as function of channel access priority

| Channel access priority class | $\omega$ |
|---|---|
| 1 | $\omega_1$ |
| . | . |
| . | . |
| . | . |
| T | $\omega_T$ |

Similar approaches may be applied as other reference signals, such as CSI-RS, by either dividing the scrambling IDs into groups or reflecting the priority of the DL transmission in the initialization sequence of the used reference signal.

The PDCCH may be used as an CAI. Accordingly, using the PDCCH, either the GC-PDCCH or a UE-specific PDCCH, for example, may indicate the channel acquisition.

FFP parameters may be indicated, and an FBE may use, for example, a limited set of FFP values such as 2 ms, 5 ms, 7 ms, and 10 ms. These values may be predefined. The selected value of the FFP may be indicated by the PDCCH. A new field may be used comprising a bit width equal to $\log_2$ (the size of FFP values set), which may comprise 2 bits for example. Also, it may be assumed that the FFP start from the first symbol of the radio frame.

Using the PDCCH may be more effective than only using the DMRS as a CAI. It may carry more information about the COT and the idle window. It may indicate the length of the COT and the idle window. For example, several possible duration values of the COT in an FFP may be predefined or configured by high layer signaling. Then the PDCCH may indicate the index of the selected COT duration value. The UE may assume that the idle window duration is equal to the difference between FFP and the COT duration. The COT duration may have different units depending on the deployed numerology. The same concept may be applied to indicate the idle window instead of the COT duration. Therefore, a new bit field is proposed herein to either carry an indication of the COT duration or the idle window.

Either in the same PDCCH that provided the FFP and the COT/idle-window duration or in another PDCCH, the gNB may indicate the Tx window in the actual transmission may occur. This may be beneficial if GC-PDCCH indicates the FFP and the COT/idle-window duration to a group of UEs, and then a separate PDCCH, e.g. UE-specific PDCCH, may indicate the Tx window with the COT in which a particular UE(s) expect to receive/transmit.

The Tx window may be indicated by two parameters, for example, namely its start and duration/length. A predefined/configured start and duration may be used, and the PDCCH may indicate the selected configurations. The start of the Tx window may be in units of symbols or slots or sub-frames. The counting may be relative to the received PDCCH. In this case, if the start of the Tx window is set to zero, then there is no gap between the PDCCH used as a CAI and the Tx window. Also, the PDCCH may indicate both the start and the end of the Tx window rather than its beginning and length.

Alternatively, the PDCCH may only indicate the beginning of the Tx window and the UE may assume that the end of the Tx window coincides with the end of the COT.

Alternatively, the PDCCH may indicate the duration of the Tx window. Then the UE may assume that it starts immediately after the PDCCH (no gap between the CAI and the Tx window). Alternatively, the UE may assume that the end of the Tx window coincides with the end of the COT, and its beginning may be anywhere inside the COT depending on its duration (a possible gap between CAI and Tx window).

The Tx window may be shortened or extended by transmitting another PDCCH carrying the new information. This information may be updated upon receiving another PDCCH providing new information about the Tx window.

Indicating priority of the intended transmission is described herein. It is proposed herein to include a new field that indicates the transmission priority class. The field size may be equal to $\log_2$ (number of priority class), which may be predefined. The equivalent channel access priority class may be determined as described above, for example.

If the gNB shares the COT with its own serving UEs, then the gNB may also indicate the priority class of its UEs' UL transmissions. If multiple UEs are expected to share the gNB's COT and each one has its own priority, then the gNB may determine an equivalent priority class based on one or more rules. For example, the gNB may average the priority classes of its UEs. Also, an equivalent channel access priority class may be derived if the COT comprises DL and UL transmissions. Different weighting coefficients may be applied for different transmissions' priority classes. Deriving an equivalent channel access priority class may be used for other CAI methods as well.

Such a PDCCH may be decodable by other NR-U devices attempting to access the channel including other gNBs from the same operator or different operators. Also, it may be decodable by capable UEs served by the gNB that transmits this PDCCH or other gNBs. This PDCCH CRC may be scrambled with a predefined RNTI, e.g., as specified per the standard. Also, other parameters usable for decoding this PDCCH may be predefined such as, for example, the aggregation level, the PDCCH DMRS configurations, the frequency domain resources carrying this PDCCH, the CORESET configuration, and so forth.

Figure 18:
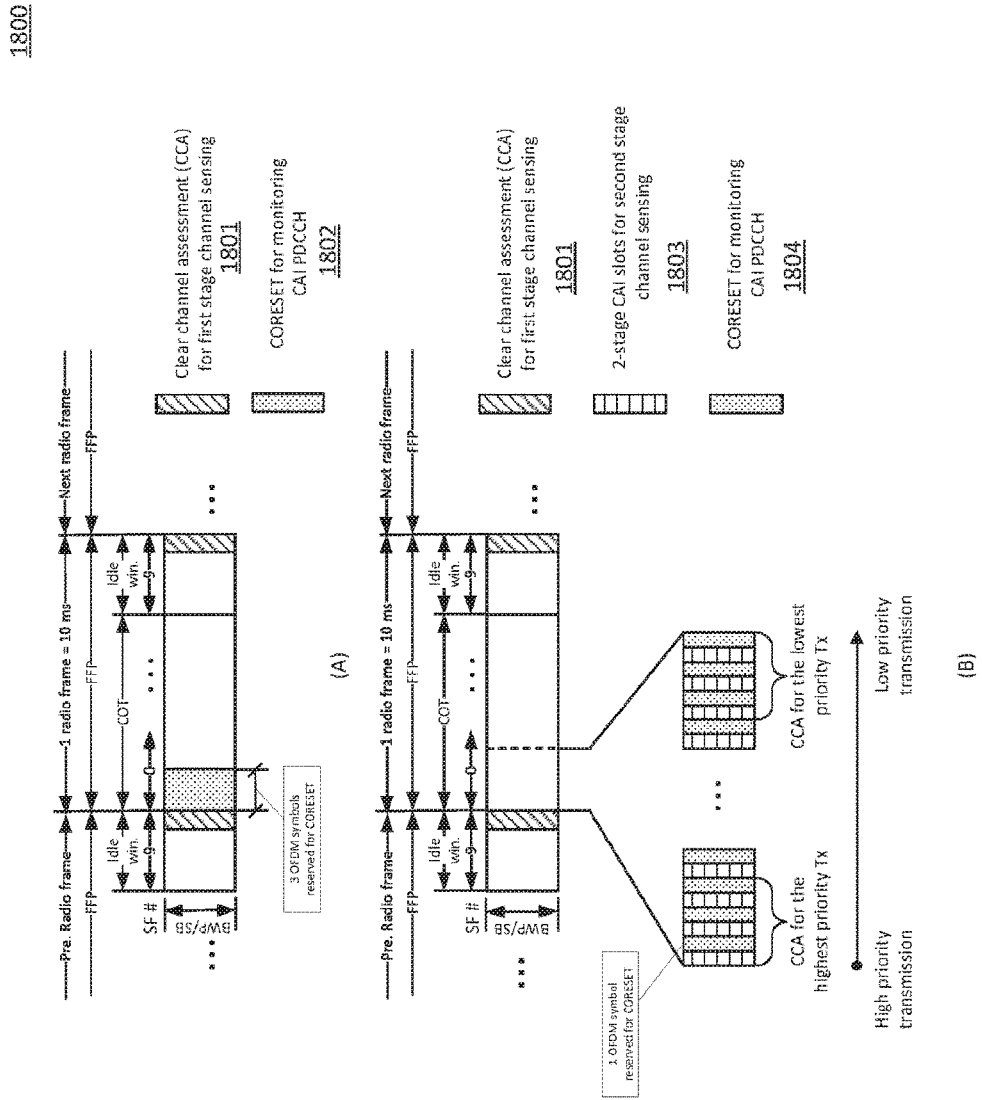
FIG. 18 shows transmitting PDCCH as CAI when performing: (A) Single stage channel sensing with 3 OFDM symbols CORESET for CAI PDCCH (B) Two stages channel sensing with 1 OFDM symbol CORESET for CAI PDCCH after each 2-stage CAI slot.

FIG. 18 shows transmitting PDCCH as CAI 1800. Scenario (A) of FIG. 18 depicts single stage channel sensing 1801, i.e., conducting CCA immediately before FFP, wherein a few symbols at the beginning of the COT may be reserved for the PDCCH transmission as the CAI. Here, the CORESET of CAI PDCCH 1802 may be configured to span those OFDM symbols. In this example, the CORESET is configured to occupy the first 3 OFDM symbols at the beginning of the FFP.

Scenario (B) of FIG. 18 depicts using two stages channel sensing 1803, then the CORESET of CAI PDCCH 1804 may be transmitted immediately after successfully performing the second stage CCA 1803. After each 2-stage CAI, 1 OFDM symbol CORESET may be configured.

In addition to carrying the priority class, CM PDCCH may carry a coarse granularity of the time-frequency resources planned to be occupied by a gNB and/or its UE. The CAI PDCCH may not only be monitored by UEs served by the gNB transmitting CAI PDCCH, but it also may be monitored by other UEs not under gNB's control, other gNBs/TRPs. The coarse granularity may be useful to reduce the complexity of the indication and reduce the power consumption at the nodes monitoring this CAI PDCCH. Though the CAI PDCCH may provide a coarse granularity of the time-frequency intended to be occupied, it may also provide a fine granularity of the occupied resources. This is beneficial to let the other NR-U nodes know which resources are occupied and they may fit their transmission around in the COT. The indicated resources may be contiguous or non-contiguous in time/frequency domain. As mentioned earlier, this PDCCH may be decodable by other gNB and/or the more capable UEs, but not all the UEs. Therefore, PDCCH for CAI may not replace GC-PDCCH or UE-specific PDCCH providing more details about the configurations or the grant.

Figure 19:
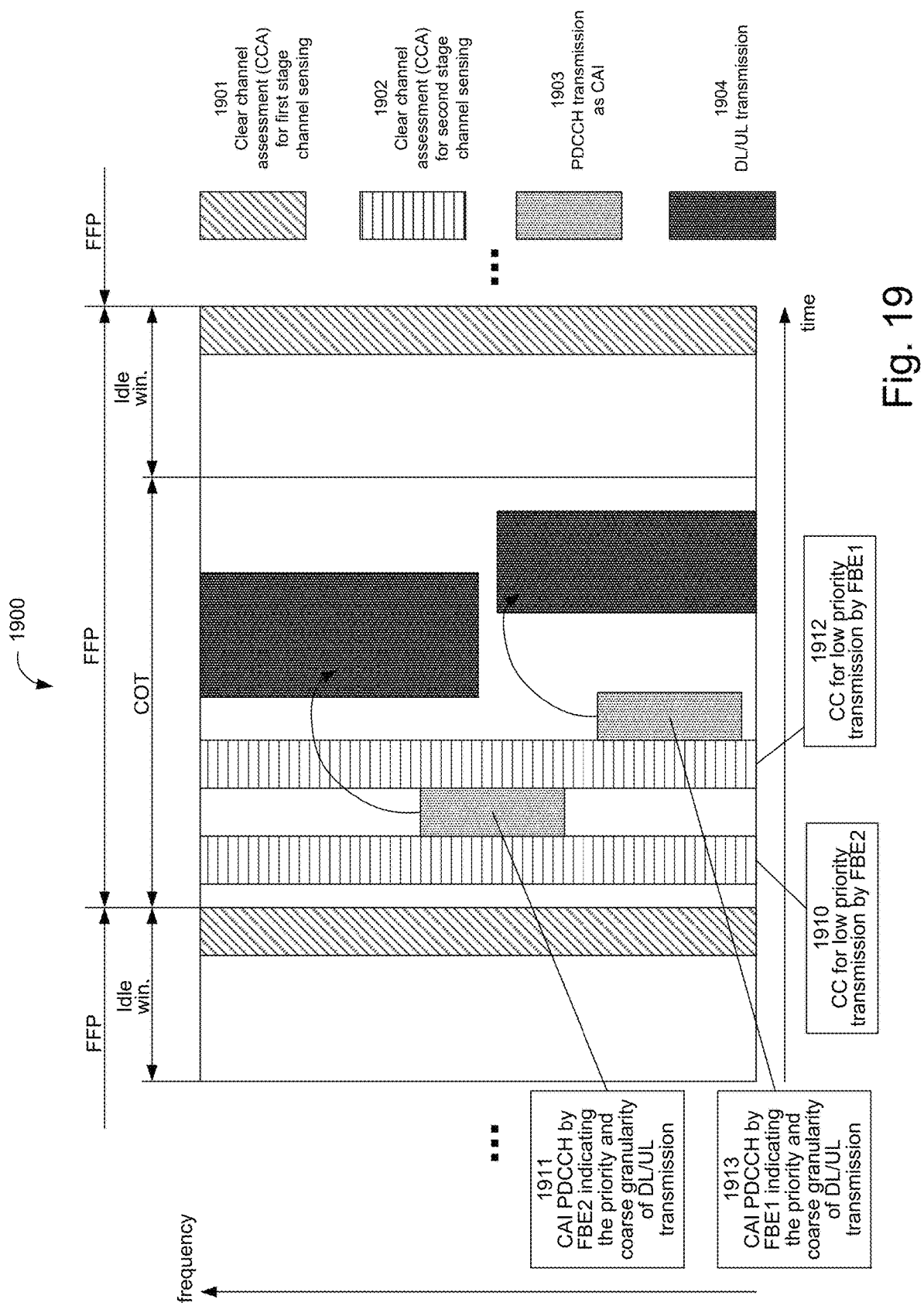
FIG. 19 shows that a CAI PDCCH provides coarse indication of the time-frequency resources to be occupied in the COT.

FIG. 19 shows an example in which a CAI PDCCH provides a coarse indication of the time-frequency resources to be occupied in the COT 1900. In this example, two FBE performing two stage channel sensing 1902. FBE2 has a high priority transmission 1910 therefore it performs the second stage channel sensing earlier than FBE1 and transmits CAI PDCCH providing a coarse granularity of the time-frequency resources that may be occupied for transmission 1911. On the other hand, FBE1 has low priority transmission 1912 and chooses a later CCA slot to perform the second stage sensing and then may transmit CAI PDCCH providing a coarse granularity of the time-frequency resources that may be occupied for transmission 1913. Meanwhile waiting for its CCA slot, it may attempt decoding CAI PDCCH from other FBE with higher priority transmission. Based on these indications, FBE1 knows the available resources that may be occupied for its transmission.

Figure 20:
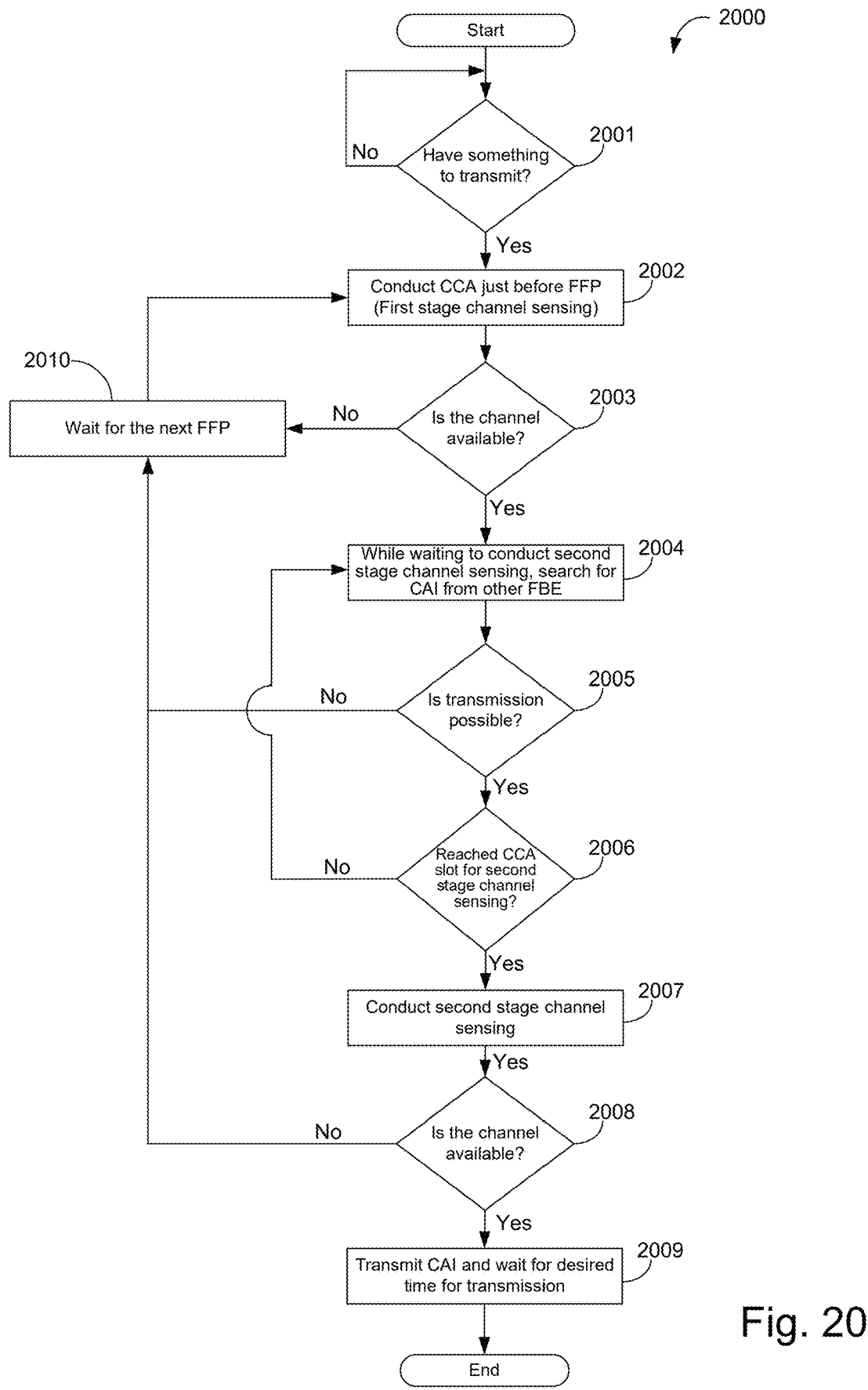
FIG. 20 shows a flowchart illustrating channel access procedure based on two stage channel sensing with CAI deployment.

FIG. 20 shows a flowchart illustrating channel access procedure based on two stage channel sensing with CAI deployment 2000. In the example of FIG. 20, an FBE, e.g., gNB or UE, may check whether transmission needs to occur or not. If no transmission required, then no action should be taken by FBE's physical layer (no in step 2001). On the other hand, if the FBE has transmission (yes in step 2001), then the FBE does first stage channel sensing, which may occur just before the FFP intended to carry the transmission (step 2002). If the channel is sensed to be busy (no in step 2003 or no in step 2005), the FBE waits until the next FFP (step 2010) and may attempt to access the channel applying the first stage channel sensing again (step 2002).

If the channel is declared to be idle after the first stage channel sensing (yes in step 2003), the FBE waits for its CCA slot of the second stage channel sensing (step 2004). While it is waiting, it attempts to decode/detect CAI PDCCH/RS, respectively, transmitted by other FBE which attempted to access the channel earlier. Based on the outcome of this step, an FBE may decide whether to continue sensing the channel or not. For example, if a FBE realizes that other nodes has a higher priority transmissions and/or no enough time-frequency resources are left in the COT to carry the transmission, the FBE may wait to the next FFP and does not continue sensing the channel (no in step 2005). On the other hand, if it is possible to transmit (yes in step 2005), the FBE may check if it is the time to perform the second stage channel sensing or not (step 2006). If not yet (no in step 2006), FBE continues its attempts to decode/detect CAI from other FBE.

Once it is time to conduct the second stage channel sensing (yes in step 2006), FBE senses the channel (step 2007). If the channel detected to be unavailable (no in step 2008), an FBE may wait for the next FFP. Alternatively, if the channel is available (yes in step 2008), then FBE may transmit CAI PDCCH/RS indicating the priority of the transmission in this COT and/or coarse granularity of the time-frequency resources to be occupied during the COT (step 2009).

Figure 21:
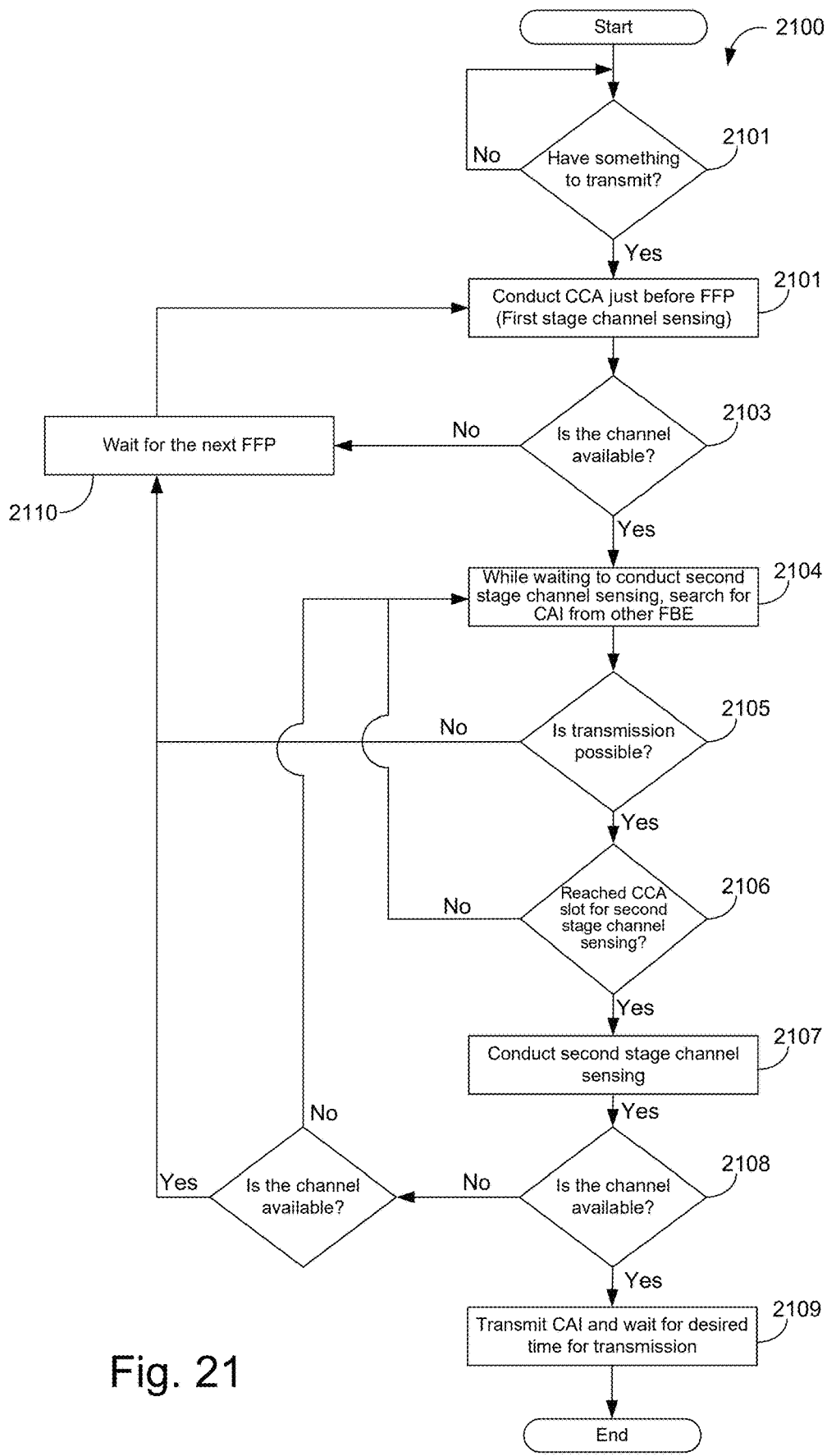
FIG. 21 shows a flowchart illustrating channel access procedure based on two stage channel sensing with CAI deployment and possibility to reattempt accessing the channel.

FIG. 21 shows a flowchart illustrating channel access procedure based on two stage channel sensing with CAI deployment and possibility to reattempt accessing the channel 2100. In the example of FIG. 21, an FBE, e.g., gNB or UE, may check whether transmission needs to occur or not. If no transmission required, then no action should be taken by FBE's physical layer (no in step 2101). On the other hand, if the FBE has transmission (yes in step 2101), then the FBE does first stage channel sensing, which may occur just before the FFP intended to carry the transmission (step 2102). If the channel is sensed to be busy (no in step 2103 or no in step 2105), the FBE waits until the next FFP (step 2110) and may attempt to access the channel applying the first stage channel sensing again (step 2102).

If the channel is declared to be idle after the first stage channel sensing (yes in step 2103), the FBE waits for its CCA slot of the second stage channel sensing (step 2104). While it is waiting, it attempts to decode/detect CAI PDCCH/RS, respectively, transmitted by other FBE which attempted to access the channel earlier. Based on the outcome of this step, an FBE may decide whether to continue sensing the channel or not. For example, if a FBE realizes that other nodes has a higher priority transmissions and/or no enough time-frequency resources are left in the COT to carry the transmission, the FBE may wait to the next FFP and does not continue sensing the channel (no in step 2105). On the other hand, if it is possible to transmit (yes in step 2105), the FBE may check if it is the time to perform the second stage channel sensing or not (step 2106). If not yet (no in step 2106), FBE continues its attempts to decode/detect CAI from other FBE.

Once it is time to conduct the second stage channel sensing (yes in step 2106), FBE senses the channel (step 2107). If the channel detected to be unavailable (no in step 2108), the FBE may attempt to access the channel again if the remaining portion of the COT is greater than δ as (no in step 2111). The value of δ may be configured as described in enhanced two stage channel sensing earlier. Alternatively, if the channel is available (yes in step 2108), then FBE may transmit CAI PDCCH/RS indicating the priority of the transmission in this COT and/or coarse granularity of the time-frequency resources to be occupied during the COT (step 2109).

The SSB, PSS, SSS, RMSI and/or OSI may be used as an CAI. Indicating FFP parameters is described herein. The FBE may only use a limited set of FFP values such as 2 ms, 5 ms, 7 ms, and 10 ms, for example. These values may be predefined e.g., specified per the standard. The selected value of FFP may be indicated by SSB. Also, it may be assumed that FFP start from the first symbol of the radio frame.

The indication of the selected FFP value may be accomplished by using the DMRS of PBCH, DMRS of RMSI's PDCCH/PDSCH. Consequently, the proposed methods for indicating the selected FFP via DMRS described above may be applied for those special DMRS. Specifically, DMRS sequences may be divided into several groups and each one or set of them may correspond to particular FFP. Also, the selected FFP value may be conveyed in the DMRS initialization sequence as well. The other information about the COT duration, Tx window, idle window may be predefined, e.g., specified per the standard, and depends on the indicated FFP.

Alternatively, the RMSI PDCCH may carry an indication of the selected FFP value. Consequently, the proposed methods for indicating the selected FFP via PDCCH may be applied for RMSI PDCCH. A new field is proposed herein with a bit width equal to $\log_2$ (the size of FFP values set), 2 bits for example. Additional information about the COT, Tx window, idle window may also be indicated in RMSI PDCCH as described herein regarding using the PDCCH as CAI. Also, the indication may be carried in RMSI PDSCH or OSI. Also, the offset value may be indicated by the RMSI PDSCH or OSI.

The MIB and/or the PBCH payload (not in the MIB) may carry few bits to indicate the selected FFP values. Also, the indication may be split among different signals/channels. For example, few bits may be carried in the MIB and/or PBCH payload while the bits may be indicated by DMRS of PBCH, for example. Also, to indicate Tx window within the COT may be accomplished by using DMRS of PBCH, or DMRS of RMSI PDCCH/PDSCH, or PDCCH of RMSI as described above.

Indicating priority of the intended transmission is described herein. As another possibility for CAI, it may comprise SSB, PSS and/or SSS to indicate the channel acquisition and also indicate the priority of the intended transmission during the COT. Additional PSS and/or SSS-like sequences, other than those used for cell identifications, may be introduced to reflect the priority class of the transmission during the COT. The additionally introduced sequences may not use the same generation methods as PSS/SSS used for cell identification. However, they may serve the same purpose in terms of providing synchronization and carry the priority class of the transmission in the acquired COT.

In NR, PSS and SSS used for cell identification depends on the physical cell ID. Specifically, the parameters m and $(m_0, m_1)$ are used to generate PSS and SSS, respectively, and they are function of $N_{ID}^{(1)} \in \{0, 1, \ldots, 335\}$ and $N_{ID}^{(2)} \in \{0, 1, 2\}$. Therefore, it is proposed that $N_{ID}^{(1)}$ may be divided into two sub groups. The first sub-group carry the physical cell ID, e.g., $N_{ID,Sub-group1}^{(1)} \in \{0, 1, \ldots, 200\}$ for example, while the second sub-group may be used to indicate the channel access priority class, e.g., $N_{ID,Sub-group2}^{(1)} \in \{201, \ldots, 355\}$.

A UE should be able to distinguish whether PSS/SSS are used to indicate physical cell ID or indicating the channel access priority class by determine whether $N_{ID,Sub-group1}^{(1)}$ or $N_{ID,Sub-group2}^{(1)}$ is used to generate PSS/SSS sequences.

Similar approaches to those developed to enable DL-RS as DMRS to carry the priority class of the transmission may be applied for those additionally introduced PSS/SSS-like sequences. Specifically, PSS/SSS-like sequences IDs may be divided into several groups and each group or set of them may correspond to particular priority class of the transmission. The boundaries of each group, i.e., e.g., α, β and δ, may be indicated using one of the approaches proposed to developed to indicate the groups' boundaries for DMRS, i.e., either to be predefined or through high layer signaling.

Figure 22:
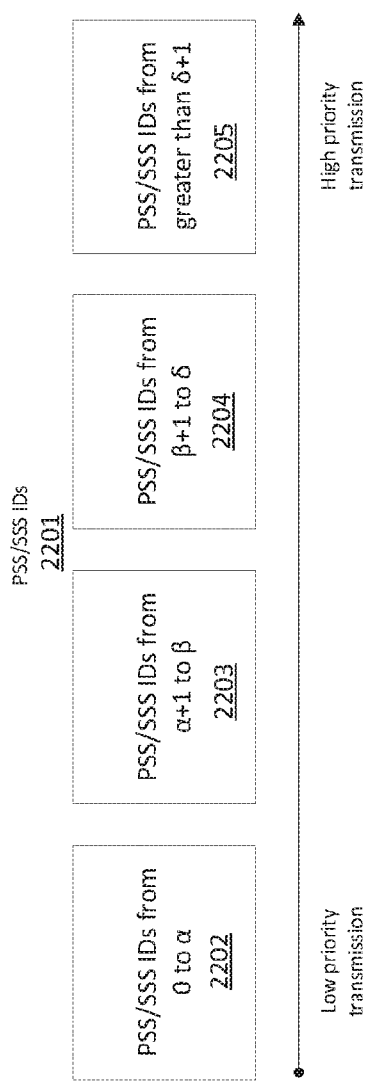
FIG. 22 shows dividing PSS/SSS IDs into groups depending on the priority of DL transmission.

FIG. 22 shows dividing PSS/SSS IDs into groups depending on the priority of DL transmission 2200. In this example, PSS/SSS IDs 2201 are divided into groups depending on the priority of DL transmission, where the first group 2202 is used for low priority transmissions and comprises PSS/SSS IDs from 0 to α. The second group of PSS/SSS IDs 2203 correspond to the second priority class and comprises PSS/SSS IDs from α+1 to β. The third group of PSS/SSS IDs 2204 correspond to the third priority class and comprises PSS/SSS IDs from β+1 to δ. The last group of PSS/SSS IDs 2205 comprises PSS/SSS IDs higher than δ+1 and corresponds to the highest priority transmission.

Also, another possible solution to indicate the channel access priority class is to use another set of SSB other than ones used for synchronization and cell identifications. For example, additional SSBs may be transmitted outside synchronization raster. In this case, the PSS/SSS of SSB(s) transmitted synchronization raster may be used for synchronization and cell identifications. On the other hand, PSS/SSS of SSB(s) transmitted outside synchronization raster in a preconfigured/configured manner may be used to indicate the channel access priority class. For this purpose, PSS/SSS IDs may be divided into multiple groups mapped to different channel access priority class as described above.

Alternatively, the priority class may be indicated through DMRS of the PBCH by making the initialization sequence depends on the priority class of the intended transmission in the COT, not only the cell ID, SSB index and half-frame number. For example, the initialization sequence may be $$c_{init} = 2^{11}(\bar{i}_{SSB}+1)([N_{ID}^{cell}/4]+1) + 2^6(\bar{i}_{SSB}+1) + \omega + (N_{ID}^{cell} \bmod 4)$$

where ω depends the channel access priority class of the DL transmission, e.g., ω may just equal the channel priority class and the other parameters may follow TS 38.211.

The values of ω and its association with the channel access priority classes may be predefined or given by high layer signaling similar to the approach based on Table 8 mentioned above.

Also, ω may be indicated by the CRC scrambling of PBCH, or the CRC scrambling of RMSI PDSCH. When an FBE node attempts to decode the PBCH or RMSI PDSCH, it may try different scrambling sequences where each one is associated with a particular channel access priority class.

Procedures for an FBE operation mode indication other than the CAI are described herein. The FFP's parameters may be not change dynamically for each occasion that the gNB acquires the channel. In fact, some of the FFP's parameters may be fixed for an extended period of time, e.g. 200 ms. In this case, such parameters may be indicated during the early phases of establishing the connection between the UE and its serving gNB.

During the initial access, it may be beneficial for a UE to be aware that it operates in FBE mode. This may scientifically facilitate the whole initial access procedure and increase the likelihood of accomplish the whole initial access procedure during a single FFP acquired by a gNB.

Figure 23:
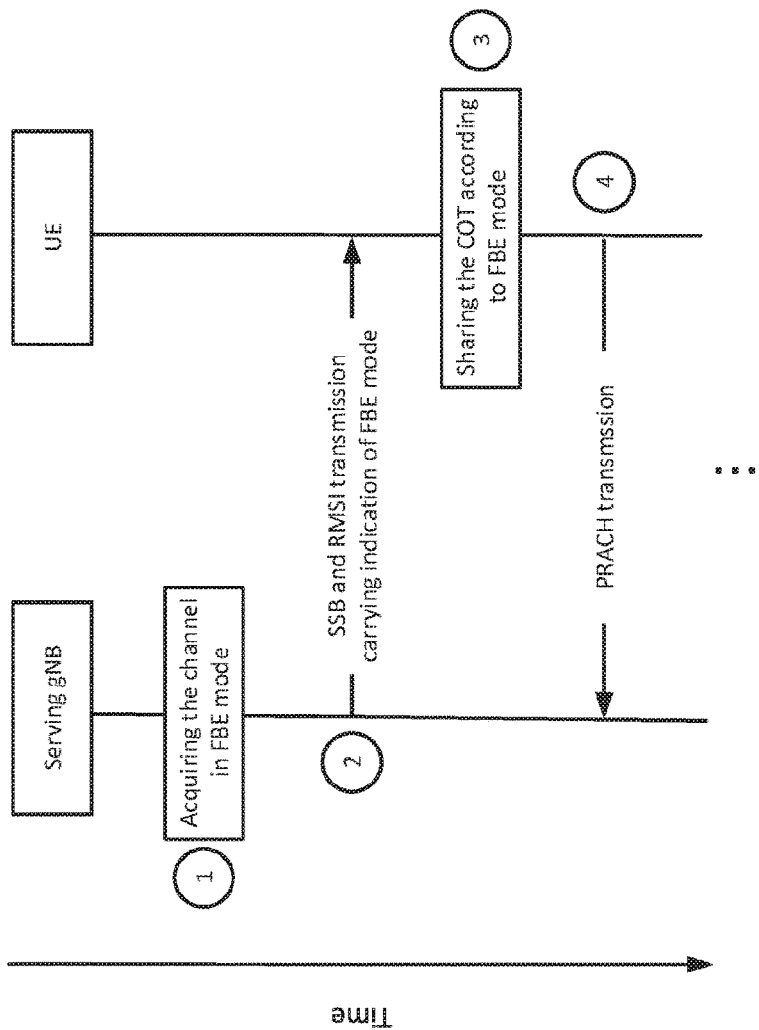
FIG. 23 shows a procedure indicating the FBE operation mode in SSB.

FIG. 23 shows a procedure indicating the FBE operation mode in SSB 2300. In this example, a gNB may acquire the channel and operate FBE mode (step 1). If the channel is available, the gNB may transmit the SSB and/or RMSI to indicate which mode is used to acquire the channel and other parameters to allow the UE to share the COT acquired by the gNB (step 2). The other parameters may comprise parameters such as the selected fixed frame period, the COT, the idle window, the Tx window, time shift (time offset) value between UE's FFP and gNB's FFP, and so forth. Specifically, the SSB and/or RMSI may carry the parameters of the gNB's FFP and the parameters of the UE's FFP, which some of them can be common for both the gNB's FFP and the UE's FFP and others may be dedicated for particular FFP. For example, the FFP duration and its periodicity may be applied for both the UE's FFP and the gNB's FFP. On the other hand, the time shift (time offset) may only be applied for the UE's FFP with respect to the gNB's FFP. Based on the provided information, a UE may share the initiated COT of the gNB's FFP or UE initiates its own COT using on FBE mode based on the provided information in the SSB and/or RMSI (step 3). If the channel is available, a UE may transmit PRACH (step 4).

In this approach UEs using RACH occasion associated with SSB/RMSI may receive an early indication of the FBE operation mode and its associated parameters. This may significantly simplify all the initial access steps. However, a gNB may not be able to provide different FBE's parameters for different UEs using the same SSB/RMSI for initial access.

Figure 24:
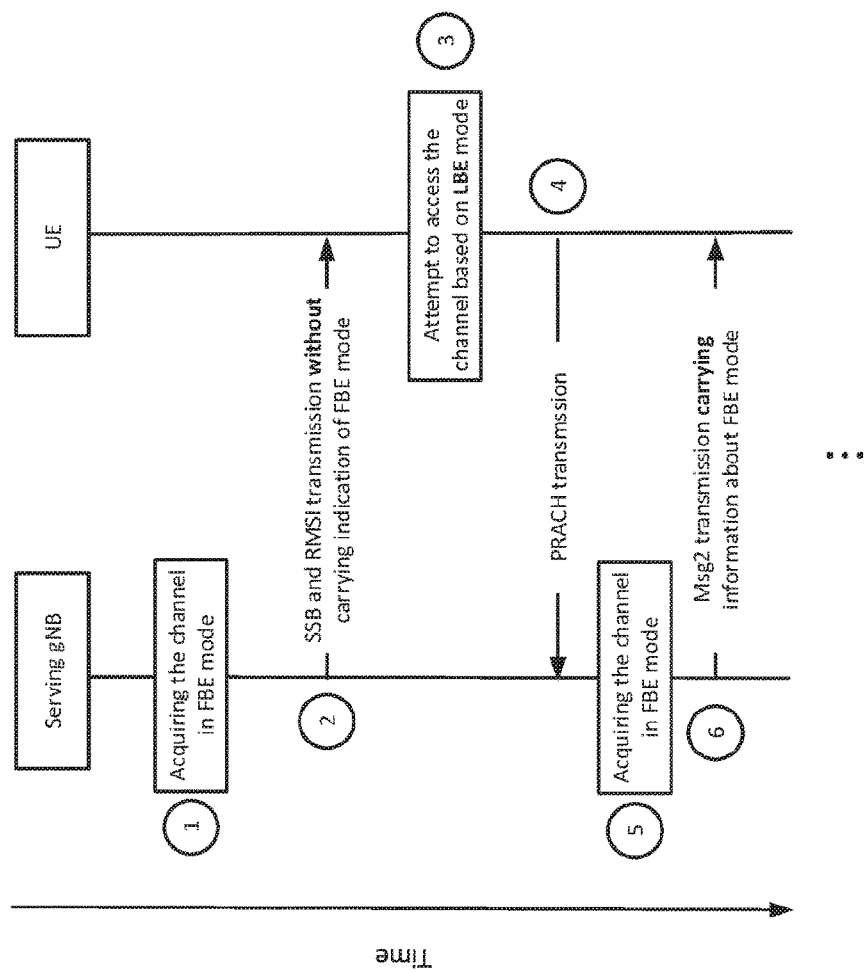
FIG. 24 shows a procedure indicating the FBE operation mode in Msg2.

FIG. 24 shows a procedure indicating the FBE operation mode in Msg2 2400. In this example, the gNB may operate in FBE mode without transmitting any indication or information about the FFP's parameters in the SSB and/or RMSI. Specifically, the gNB apply sensing the channel based on the FBE operation mode (step 1). Then gNB may transmit the SSB and/or RMSI without carrying any additional information about the FBE mode, e.g., Rel. 15-like SSB and/or RMSI. In this case, a UE attempting to do initial access may be unaware that the gNB has selected FBE mode. Consequently, a UE attempt to access the channel based a default operating mode, e.g. LBE (step 3). If the channel is available, a UE may transmit the PRACH (step 4). If the PRACH is received successfully at the gNB, it may continue operating in the FBE mode and sense the channel according (step 5). If the channel is available, the gNB may transmit an indication of the FBE operation mode and its associated parameters in Msg2 (step 6).

If two-steps RACH is used, then the indication of the FBE operation mode and its associated parameters may be signaled as part of Msg B after successfully receiving Msg A form a UE.

The main advantage if this approach is that gNB may provide UE-specific configuration of the FBE parameters to accommodate different UEs' requirements and capabilities. This comes with the price that LBE has to be applied for PRACH transmission.

Figure 25:
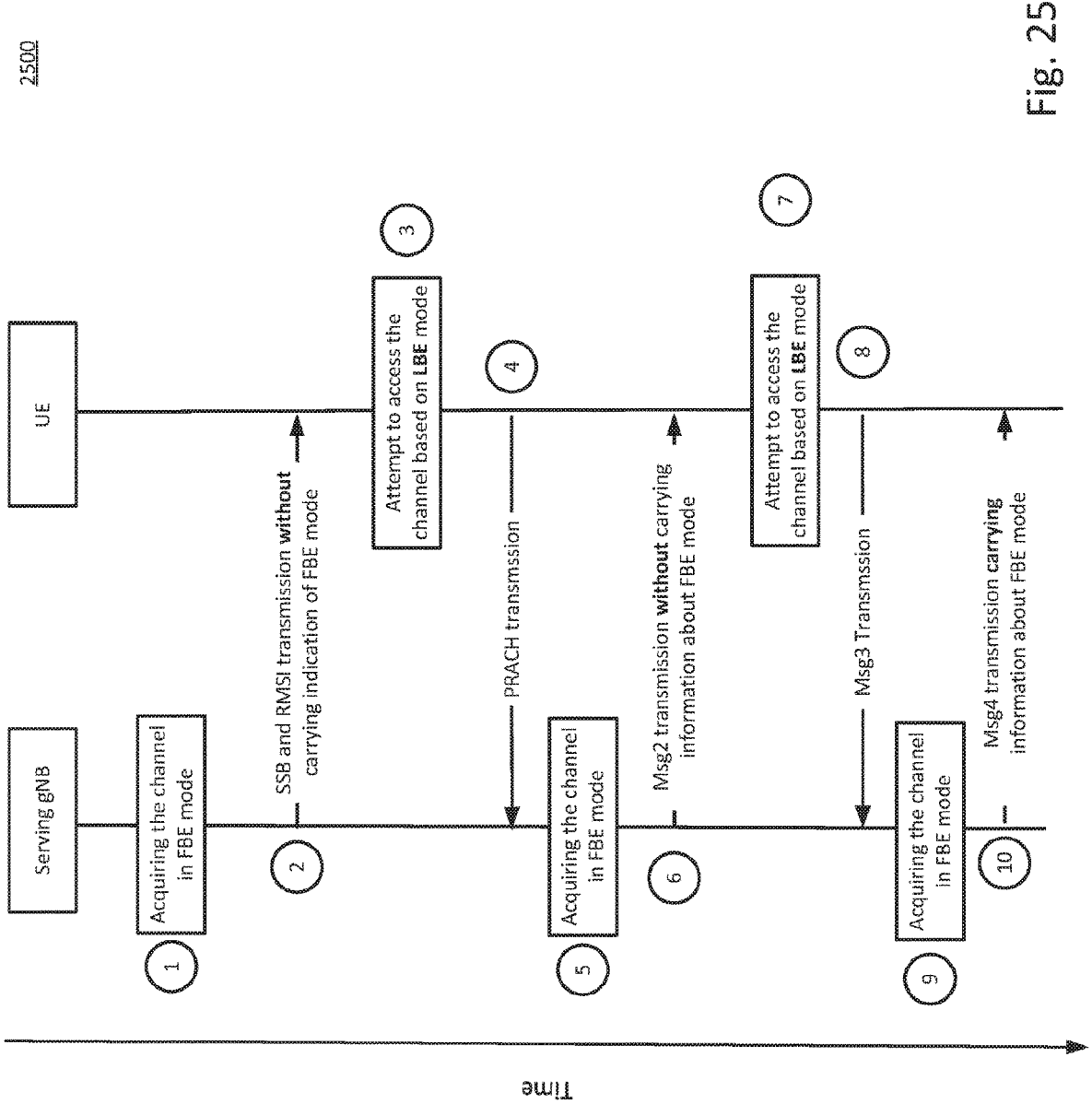
FIG. 25 shows a procedure indicating the FBE operation mode in Msg4.

FIG. 25 shows a procedure indicating the FBE operation mode and its associated parameters in Msg4 2500. In this example, the gNB may operate in FBE mode, and the UE may operate on the LBE during the whole stages of initial access. The gNB may apply channel access procedures based on the FBE operation mode (steps 1, 5, 9) for SSB/RMSI, Msg2, and Msg4 transmission (steps 2, 6, 10), respectively. On the other hand, the UE may operate on the LBE mode to access the channel (steps 3, 7) for the PRACH and the Msg3 transmission (steps 4, 8), respectively. In this scenario, indicating the FBE operation mode and its associated parameters may be indicated as part of Msg4.

The SSB may indicate that the FBE mode may be used by the gNB to acquire the channel, not LBE mode. Such an indication may be a 1-bit field in the PBCH to carry such an indication, for example, if it is set to 1, then the FBE mode may be used by the gNB to acquire the channel and vice versa for if it is set to 0. This 1-bit field may be transmitted in the MIB or the PBCH payload (not in the MIB).

Also, the scrambling sequence of the PBCH may be used to indicate the selected operation mode, FBE or LBE. For example, for any cell, there may be additional PBCH scrambling sequences that may be used to carry such indication.

Alternatively, this 1-bit field may be transmitted in the RMSI PDCCH. Also, the RMSI PDCCH scrambling sequence may be used as an indication of the selected operation mode, either LBE or FBE. For example, it is proposed herein to introduce a new System information-Network Temporary Identifier (SI-RNTI), e.g. SI-RNTI-A, different than the regular SI-RNTI. If SI-RNTI-A is used, a UE may assume the FBE mode is used. Or, this 1-bit field may be transmitted in the RMSI PDSCH.

The scrambling sequence of RMSI PDCCH may be different than the RMSI PDSCH. For example, the scrambling sequence of RMSI PDCCH may be SI-RNTI, but the scrambling sequence of RMSI PDSCH may reflect the operation mode.

Also, the DMRS of PBCH, DMRS of RMSI PDCCH, and/or DMRS of RMSI PDSCH may be used to carry such an indication. For example, it is proposed herein to have two distinct sets of DMRS used for any of the mentioned purposes. The first set of DMRS may be used to indicate that LBE operation mode is used. The second set of DMRS may be used to that FBE operation mode is used. Also, such an indication may be carried in the DMRS initialization sequences.

If the FBE-LBE indication to be transmitted in Msg2, then the DCI, e.g. DCI_format_1_0, scheduling the RAR may carry 1 bit field to indicate whether the FBE/LBE operation mode is selected.

It is proposed herein to introduce an RNTI that may be used to indicate that FBE operation mode is selected, e.g.

Random access-Network Temporary Identifier-A (RA-RNTI-A), which may be derived based on some rules similar to RA-RNTI.

The indication of selected operation mode may be in a medium access control (MAC) PDU that carries the RAR. One of the reserved bits in the RAR may be used as an indication, for example, or introduce a new bit in the RAR.

Moreover, the scrambling sequence of the RAR may be used to indicate the selected operation mode. For example, if the RA-RNTI-A is used for scrambling RAR, then FBE operation mode is selected. The RNTI used for RAR and DCI scheduling in the RAR may be the same or different. For example, DCI scheduling RAR may be scrambled with RA-RNTI while RAR is scrambled with RA_RNTI-A.

Also, the DMRS of DCI scheduling RAR and/or DMRS of RAR may be used to carry such indication. For example, it is proposed herein to have two distinct sets of DMRS used for any of the mentioned purposes. The first set of DMRS may be used to indicate that LBE operation mode is used. The second set of DMRS may be used to indicate that FBE operation mode is used. Also, such an indication may be carried in the DMRS initialization sequences.

If the FBE-LBE indication is to be transmitted in Msg4, the indication of the selected operation may be part of contention resolution. Specifically, the DCI scheduling PDSCH of Msg4 may a 1-bit field to indicate the selected operation mode. Alternatively, this indication bit may be transmitted in the PDSCH carrying the Msg4 MAC-CE. Similar approaches of the scrambling sequence to indicate the selected operation may be applied, e.g. TC-RNTI-A. Alternatively, the usage of the DMRS of PDCCH and/or PDSCH of Msg4 may be used as described above.

The other parameters associated with FBE operation mode such as the FFP, COT, idle widow and/or Tx window may be predefined to reduce the signaling overhead. Once, a UE enters in RRC-connected mode, the gNB may reconfigure those parameters.

Alternatively, procedures similar to the aforementioned ones may be used to indicate the configurations of FBE operation mode.

During paging, when a UE receives a paging, it may carry an indication of which operation modes should be used, LBE or FBE. Also, if FBE is used, it may carry information associated with the FBE operation mode such as FFP, COT, idle window, Tx window, and so forth.

The 1-bit field may be carried in the paging DCI. For example, if the 1-bit field is set to 1, then the FBE mode may be used by gNB to acquire the channel and vice versa if it is set to 0. The 1-bit field may be carried in a paging message, i.e., the paging PDSCH.

Alternatively, the DMRS of the paging PDCCH or the DMRS of the paging PDSCH may be used to carry such an indication. For example, it is proposed herein to have two distinct sets of DMRS used for any of the above purposes. The first set of DMRS may be used to indicate that LBE operation mode is used. The second set of DMRS may be used to indicate that FBE operation mode is used.

As another possible solution, scrambling the RNTI of the paging PDCCH or PDSCH may be used to indicate which operation mode is selected by the gNB. For example, it is proposed herein to have another RNTI for the paging PDCCH, e.g. Paging-Network Temporary Identifier-A (P-RNTI-A), which different than regular P-RNTI used for regular paging.

The other parameters associated with FBE operation mode such as the FFP, COT, idle widow, and/or Tx window may be predefined to reduce the signaling overhead. Once, a UE enters in RRC-connected mode, the gNB may reconfigure those parameters.

Alternatively, procedures similar to the aforementioned ones may be used to indicate the configurations of FBE operation mode.

Moreover, other signals/channels to reduce power consumptions for UEs in RRC idle/inactive state, such as the wake-up signal (WUS) for example, may be used to indicate the operation mode that may be used once the UE wakes-up. For example, if the WUS is a PDCCH, then an additional 1-bit field may be introduced to indicate the operation mode. For example, if the 1-bit field is set to 1, then the FBE mode is used by the gNB to acquire the channel and vice versa if it is set to 0. Also, the DMRS of the WUS PDCCH may be used to carry such an indication. For example, it is proposed herein to have two distinct sets of DMRS used for any of the above purposes. The first set of the DMRS may be used to indicate that the LBE operation mode is used. The second set of the DMRS may be used to indicate that FBE operation mode is used.

Also, the scrambling RNTI of WUS PDCCH may be used to indicate which operation mode is selected by the gNB. For example, it is proposed herein to have one RNTI may be used for WUS PDCCH when LBE operation mode is selected, while another RNTI may be used when FBE mode is selected.

For UE(s) RRC connected mode, the gNB may indicate the selected operation mode either FBE or LBE through high layer signaling, such FBE_vs_LBE RRC parameter for example. Such an RRC parameter may be part of RRC IE that is scheduled by a UE-specific PDCCH, such as DCI-format 1_0 and/or 1_1, or it may be scheduled by a group-common PDCCH, such as DCI-format 2_0. Introducing additional bits or using any reserved bits in different DCI formats may accomplish this purpose.

The other FBE's parameters such as FFP, COT, idle window, and/or Tx window, time shift (time offset) may be configured by common high layer signaling such as RMSI or UE-specific high layer signaling. Some of the following parameters may be common for both the gNB's FFP and the UE's FFP. On the other hand, another set of parameters may be different. For example, the following RRC parameter(s) may be used to indicate different information:

FFP_duration: may be used to indicate the duration of the deployed fixed frame period. Here the FFP_duration is equivalent to the periodicity of FFP, which is equal to its duration. For example, if only a single FFP_duration is indicated, then UE may assume that both the gNB's FFP and the UE's FFP have the same duration/periodicity. On the other hand, separate RRC parameters may be used to indicate the FFP duration/periodicity of the gNB's FFP and UE's FFP such as FFP_duration_gNB and FFP_duration_UE, respectively. Alternatively, the UE may assume that the FFP period indicated by the broadcast high layer signaling (RMSI) is the gNB's FFP, and it is equal to the UE's FFP unless a dedicated RRC indicates the FFP duration of the UE's FFP.

FFP_start/FFP_end: may be used to indicate the start/end of one FFP, and it may be in the granularity of slot and/or sub-frame. With the knowledge of FFP and its start/end, UE(s) may be aware of how FFP is mapped to NR radio frame.

Alternatively, high layer signaling may indicate the start and the end of any FFP, e.g. FFP_start_and_end, without the indication of the duration.

COT_duration: may be used to indicate the duration of the COT within each FFP, which may meet the regulation requirements, e.g., less than or equal 95% of the FFP duration. It may be in granularity of OFDM symbols/slots, and it may start immediately after the beginning each FFP.

Idle_window: may be used to indicate the duration of the idle window which may meet the regulation requirements, e.g., less than or equal 5% of the FFP duration. It may be in the granularity of OFDM symbols/slots and it may start immediately after the end of the COT.

Tx_window: may be used to indicate the which time window within COT is intended to be used for the transmission. Tx window may start anywhere within the COT, and it may end before the end of the COT.

Time_shift (time_offset): may indicate the time shift (time offset) between the gNB's FFP and the UE's FFP. The offset may be relative to the beginning of the gNB's FFP or relative to a particular SFN or slot. If the time shift (time offset) is not configured, then the UE may assume that the offset is equal to zero and that its FFP is aligned with the gNB's FFP.

Alternatively, high layer signaling may be used to provide UE(s) with different configuration(s), where each one may include FFP duration, start/end of the FFP, COT duration, idle window, and/or Tx window. These configurations may vary based on the used numerology, and high layer signaling may provide different configurations for different numerology. For example, Table 9 shows an example of 8 different FBE configurations' subcarrier spacing of 15 kHz.

TABLE 9

High layer signaling provide multiple configurations for FBE operation mode for 15 kHz subcarrier spacing

| Configuration ID | FFP duration | Start/end of FFP | COT duration | Idle window | Tx window |
|---|---|---|---|---|---|
| 0 | 10 ms | Slot 0 | 9 slots | 1 slot | 9 slots |
| . | . | . | . | . | . |
| . | . | . | . | . | . |
| . | . | . | . | . | . |
| 7 | 2 ms | Slot 0 | 25 OFDM symbols | 3 OFDM symbols | 25 OFDM symbols |

These high layer configurations may be done through RRC either scheduled by a UE-specific PDCCH, such as DCI-format 1_0 and/or 1_1, or it may be scheduled by a group-common PDCCH. An RNTI is proposed herein, e.g. FBE RNTI, that may be used to scramble the DCI of this group-common PDCCH.

The MAC-CE and/or DCI may be used to indicate the selected configurations of FBE. For example, the MAC-CE/DCI may directly indicate the selected configuration. Alternatively, the MAC-CE may be used to down select a smaller than what is configured by the RRC, and then the DCI may be used to indicate the selected configuration from the down selected configurations set.

This approach may be used for different CAI signals/channels. Specifically, the developed approaches to indicate the selected FFP may be used to indicate the selected FBE configurations.

Figure 26:
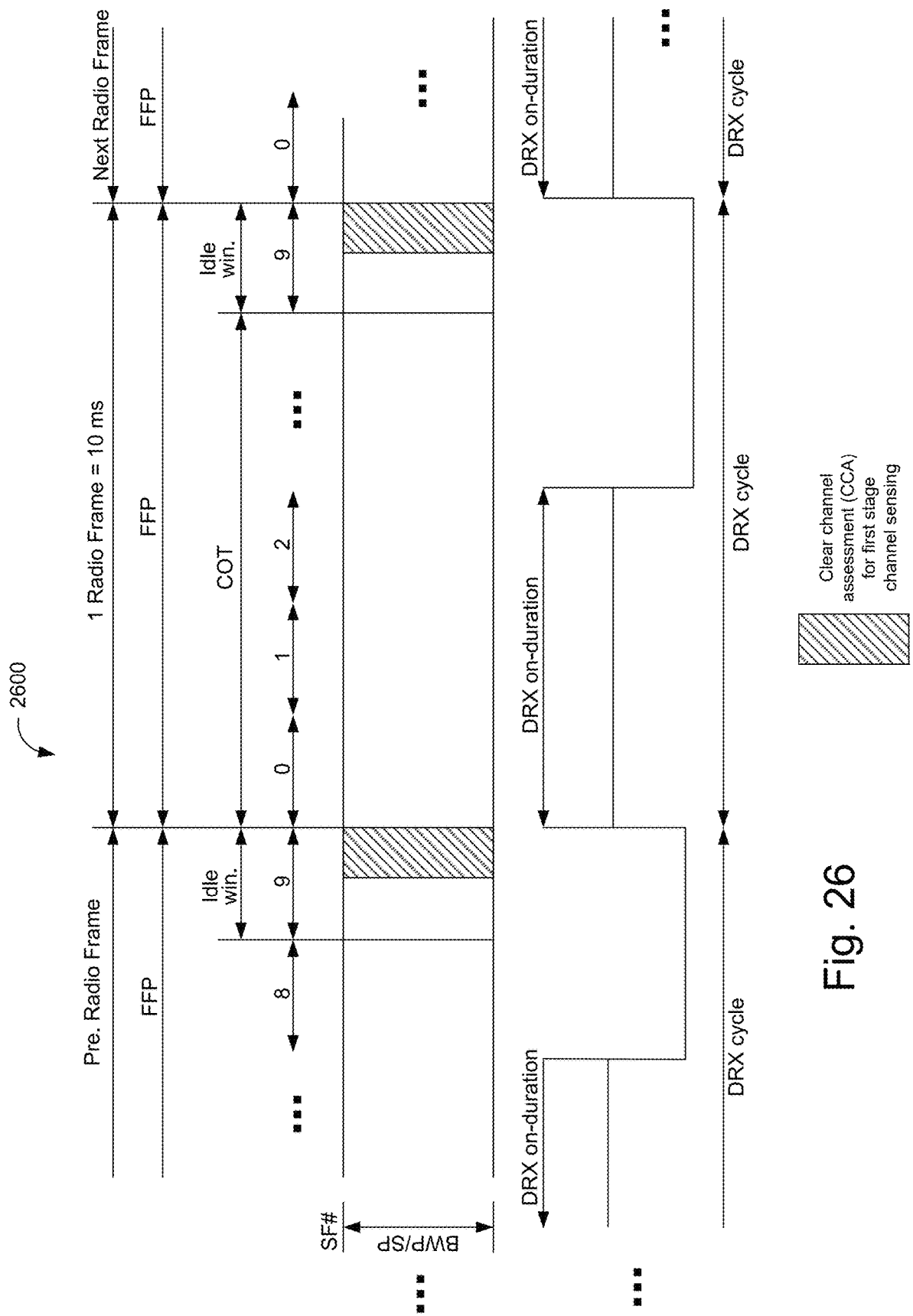
FIG. 26 shows a DRX cycle is equal to FFP and the on-duration is aligned to the beginning of the FFP.

DL transmission burst monitoring and DRX is described herein. It should be understood, unless otherwise stated, that DRX may be either long DRX or short DRX as used herein. A UE may be expected to monitor DL signals/channels transmission including, but not limited to PDCCH. The UE may assume no PDCCH is transmitted outside the Tx window/COT, which may be indicated by any of the proposed CAI procedure, or by FFP's parameters indication that may be separated from the CAI. Upon the absence of the CAI, the UE may assume no monitoring activities are required until the next FFP and UE may go to sleep for the remaining duration of FFP. If regulation requirements allow the transmission of CAI to be transmitted in the idle window, then UE may only monitor those occasions. If no transmissions are allowed in the idle window, as per regulation requirements, the DRX on-duration may be assumed to start at the beginning of FFP. FIG. 26 shows an example in which the DRX cycle is equal to the FFP and on-duration is aligned with the beginning of the FFP 2600.

The parameters of DRX in the FBE, such as, for example, the on-duration and inactivity DRX timer, may be configured to be integer/fraction multiple of FFP parameter(s). For example, the DRX cycle may be n times FFP, the on-duration may be m times COT, the inactivity DRX timer may be k times the idle window. Alternatively, the DRX parameters may be an integer/fraction of a single FFP parameter such the FFP itself, the COT duration, or the idle window.

The scaling parameters, e.g., n, m, and k, may be signaled to the UE through high layer signaling, e.g., RRC parameters. It is proposed herein to have different sets of scaling parameters dedicated to long and short DRX cycles that may be signaled through high layer signaling as well. For example, $n_{long}$, $m_{long}$, and $k_{long}$ may be used for the long DRX cycle while $n_{short}$, $m_{short}$, and $k_{short}$ may be used for the short DRX cycle. These RRC parameters may be transmitted in an RRC IE that is scheduled with a UE specific DCI or a GC-PDCCH.

Upon receiving an indication of FFP parameter(s), a UE may assume that a new DRX cycle may be deployed based on the indicated FFP parameters. The UE may apply the new DRX cycle, which may start after some time gap from receiving this indication. For example, the UE may apply the new DRX cycle after the end of the DRX cycle. Alternatively, the UE may apply the new DRX cycle after the end of FFP that carried this indication.

Figure 27:
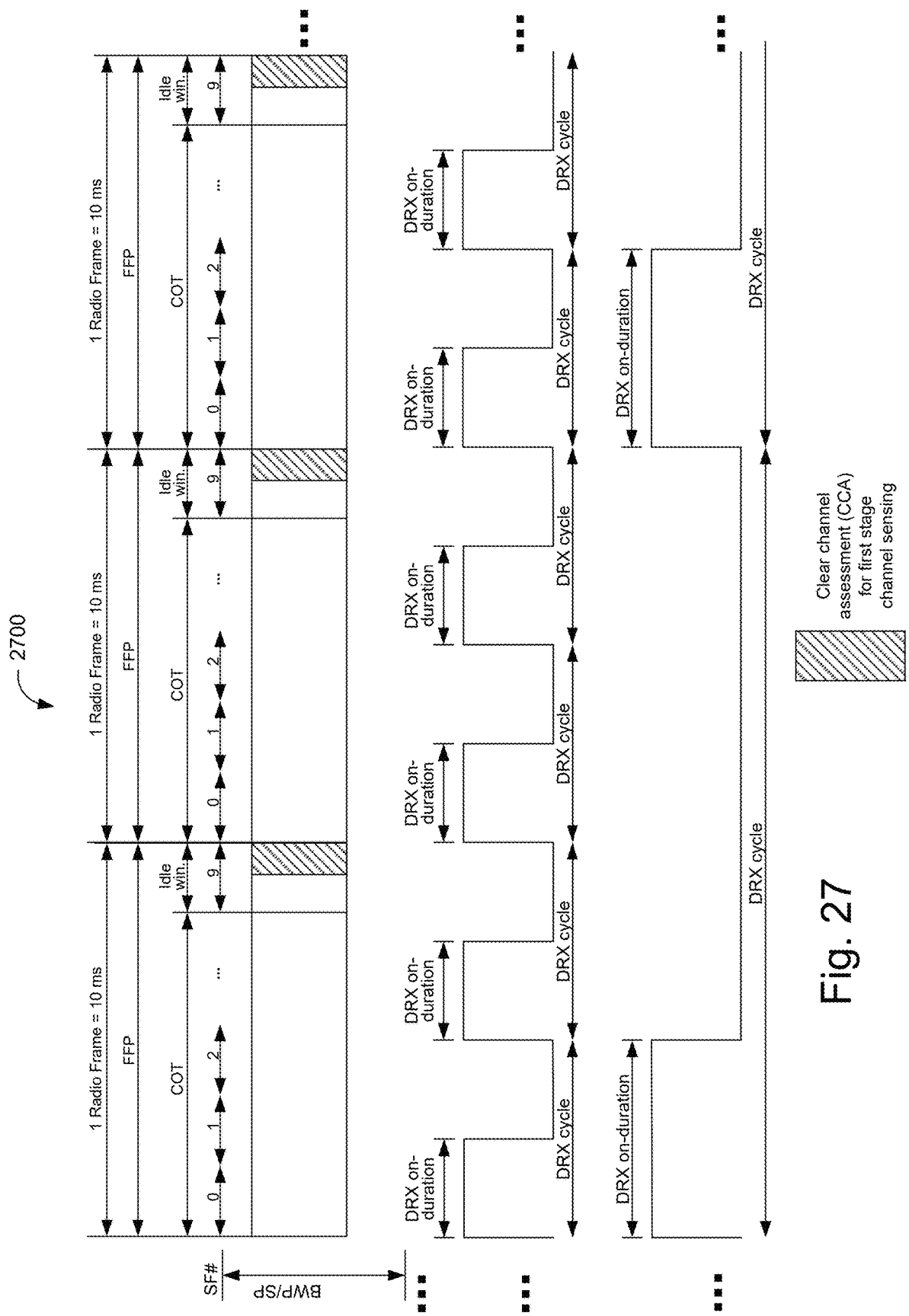
FIG. 27 shows a DRX cycle is integer/fractional multiple of FFP.

Some or all DRX cycle(s) may be assumed to be aligned with the FFP. FIG. 27 shows an example in which one DRX cycle is equal ½ FFP and another DRX cycle is equal 2 FFP 2700. In the former case, half of the DRX cycles are aligned with the FFP, i.e., they have the same start, while the other half of DRX cycles occur in the middle of FFP. In the latter case, every DRX cycle is aligned with particular FFP.

Similar behavior may be attained by adjusting the monitoring occasions of the CAI. A UE may be configured to monitor the CAI in every k FFP. If the CAI is not detected, a UE may sleep during those k FFPs. If the CAI is detected, a UE may stay awake during those k FFPs and no CAI monitoring is required during those k FFPs. Alternatively, if the CAI is detected, a UE may stay awake in the FFPs out of those k FFPs if the CAI is detected in them (i.e., the UE is required to monitor CAI in each FFP out of those k FFPs). The parameter k may be signaled by high layer signaling, e.g., RRC configurations, that are scheduled by UE specific DCI or a GC-PDCCH.

Figure 28:
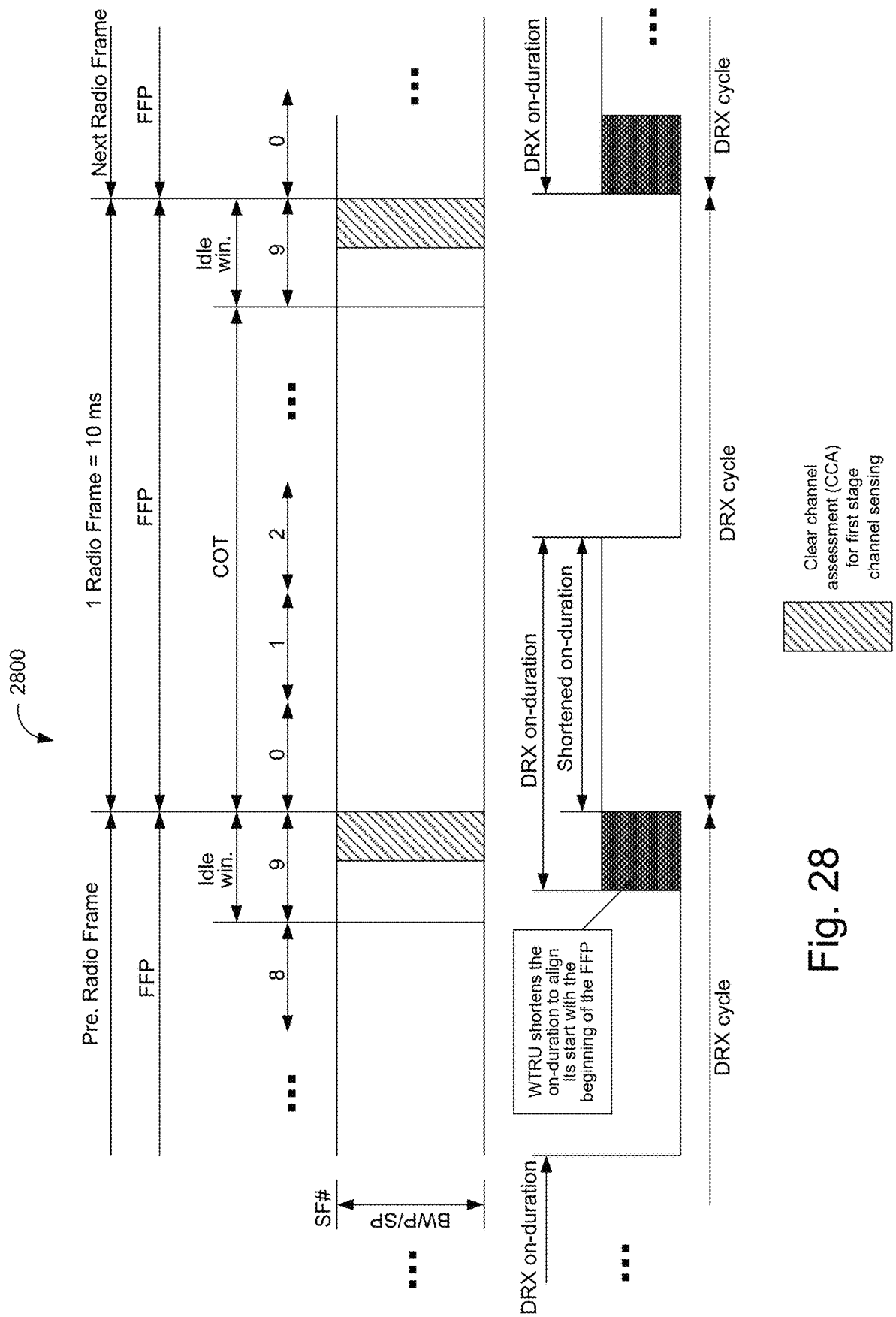
FIG. 28 shows a DRX cycle is equal to FFP and the on-duration is not aligned to the beginning of the FFP.

Alternatively, if the on-duration is configured to start before the beginning of the FFP, then the UE may shorten the on-duration such that it starts with the beginning of the FFP. This may happen if the DRX cycle parameter(s) are not associated with FFP parameter(s) and each one is configured independently. FIG. 28 illustrates an example in which on-duration is configured to start before FFP 2800. A UE may assume that the on-duration is shortened to start at the beginning of FFP.

Figure 29:
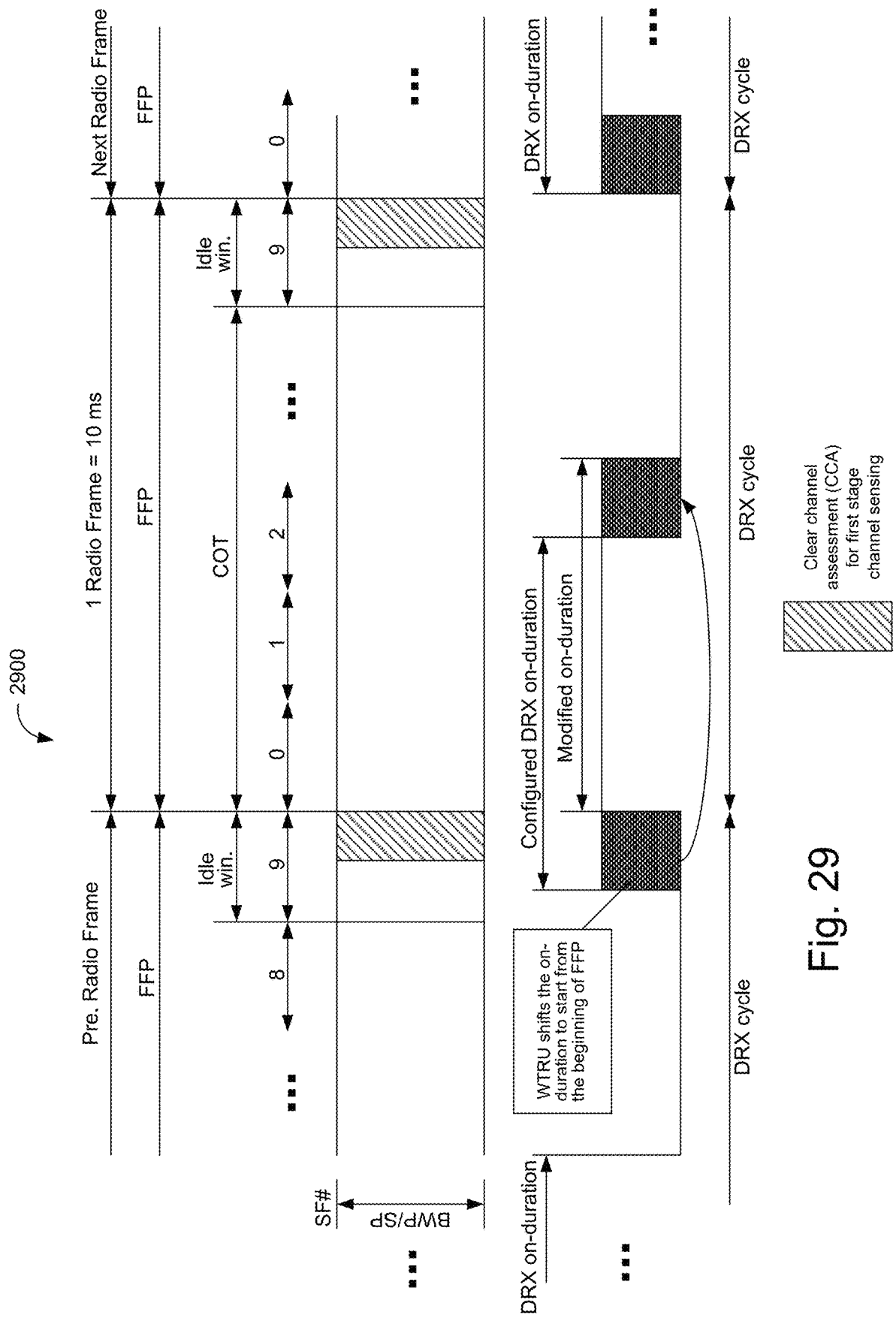
FIG. 29 shows a shift the on-duration to start with the FFP.

Alternatively, a UE may shift its on-duration such that it starts with the beginning of the FFP. FIG. 29 shows an example of a portion of the on-duration overlapping with the idle window 2900. In this case, the UE may assume that the on-duration is shifted to start from the beginning of the FFP.

Figure 30:
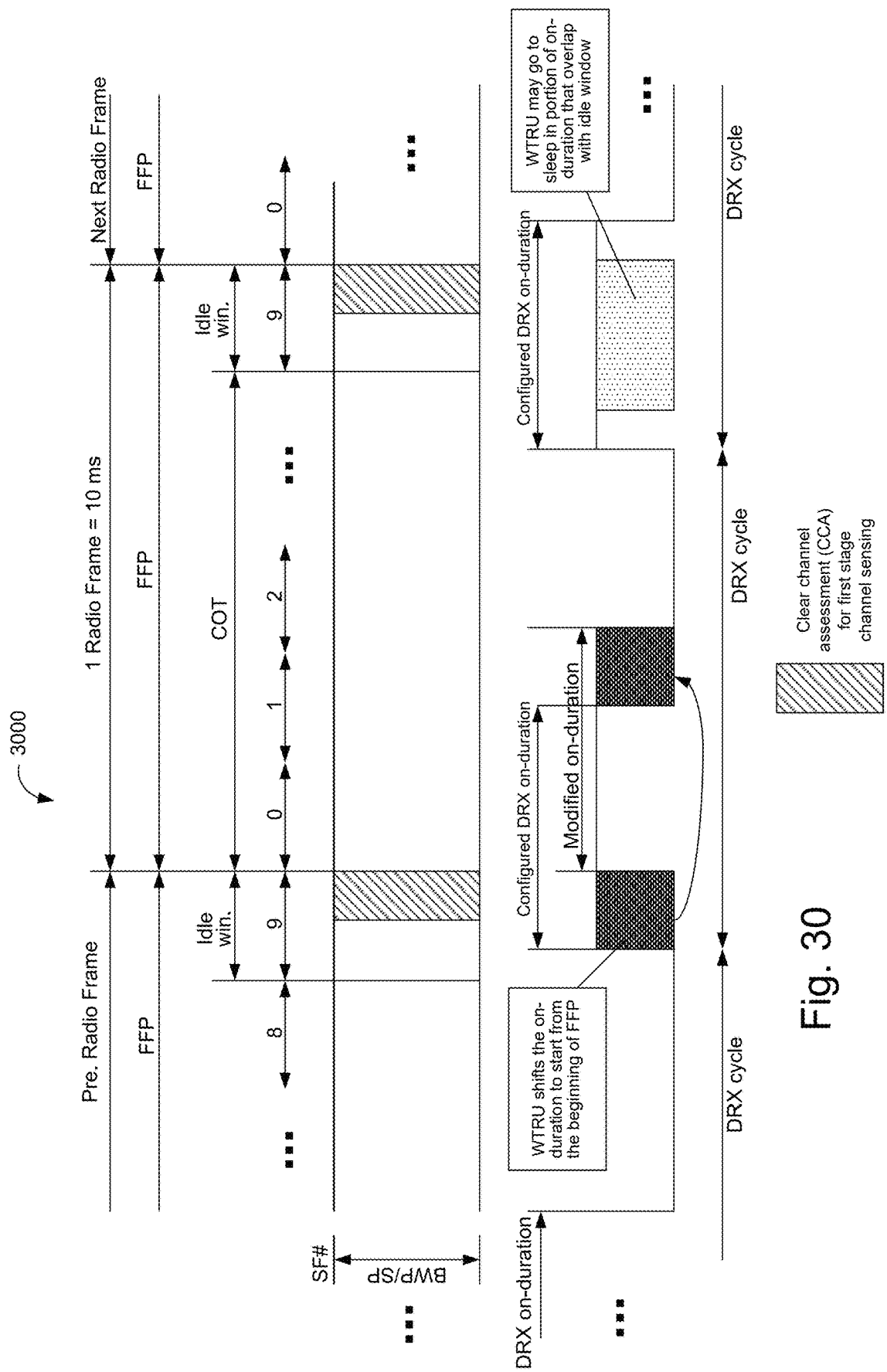
FIG. 30 shows that a UE may sleep during a portion of on-duration that overlap with the idle window.

In some situations, the idle window may be fully contained within the DRX on-duration and may overlap the DRX on-duration. In this case, UE may go to sleep during this overlap or totally abandon this on-duration. FIG. 30 shows an example of a DRX cycle that differs with the FFP 3000. Consequently, one on-duration is partially overlapped with the idle window while the idle window is fully contained within the next on-duration. In this case, a UE may shift the first on-duration to start at the beginning of the FFP. While for the next on-duration, a UE may go to sleep in the portion that is overlapped with idle window. Also, if the idle window is partially or fully overlapped with the end of an on-duration, then a UE may go to sleep earlier than the end of the on-duration.

As another possible solution, if the idle window is partially or fully overlapped with the on-duration, the UE may skip the whole DRX cycle until the next one. If k consecutive DRX cycles are skipped, the UE may not skip the k+1 DRX cycle and stay awake in its on-duration even if the idle window overlaps with it.

If the DRX inactivity timer overlaps with the idle window, then a UE may stop the DRX inactivity timer and go to sleep. The UE may continue sleeping until the next on-duration. Alternatively, the UE may wake-up again after the end of the idle window and resume the DRX inactivity timer.

UL CAI based on RACH is described herein. In several occasions a UE may need to initiate an UL transmission, e.g., the RACH, the UL on the configured grant, cross COT scheduling, and so forth. In such scenarios, it may be beneficial for a UE to indicate the priority of the intended UL transmission such that other NR-U nodes avoid colliding with this UE's transmission.

One possibility for indicating the priority of the UL transmission is to use the RACH. For example, one possibility is to use RACH preambles to indicate the priority of the intended UL transmission, not a full RACH procedure. It is proposed herein that contention based preambles, contention-free based preambles and/or RACH Occasions (ROs), i.e., time-frequency resources for preambles transmission may be used to indicate priority class of the UL transmission.

A UE may be provided by T of possible UL priority classes and each one may be associated with one or more ROs and a number of contention-based preambles by a high layer parameter, for example, RRC parameter PriornyClass_perRO_and_PreamblesPerPriornyClass. This parameter may provide two types of information: how many priority classes may be mapped to one RO, and how many preambles can be mapped to this priority class. For contention free preambles, high layer parameters may indicate the preamble index and for which priority class it may be used.

For a UE in the idle/inactive RRC state, the association parameters may be predefined, e.g., specified per the standard, or indicated in RMSI.

Figure 31:
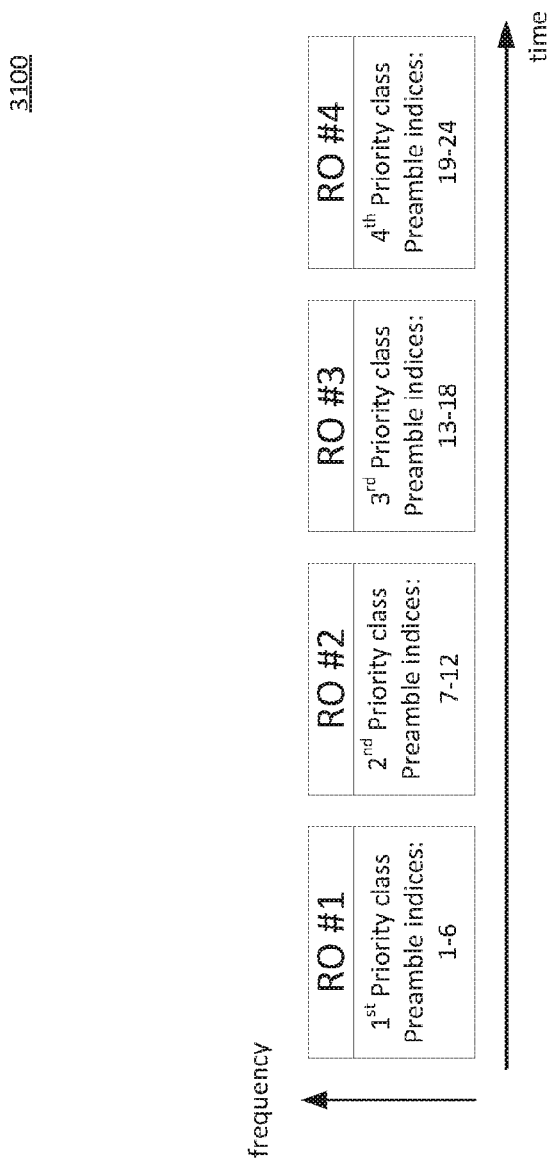
FIG. 31 shows mapping channel access priority classes to RO and different contention-based preambles.

FIG. 31 shows an example of four channel access priority classes, T=4, that are one-to-one mapped to four RO and each priority class is associated with 6 preambles in order 3100. Hence, if a UE having an UL transmission belongs to the second priority class, then the UE has to use the second RO and randomly choose from preamble indices from 7-12. In this case, PriorityClass_perRO_and_PreamblesPerPriornyClass should indicate that number of priority classes per RO=1 and the number of preambles per priority class may be 6.

Figure 32:
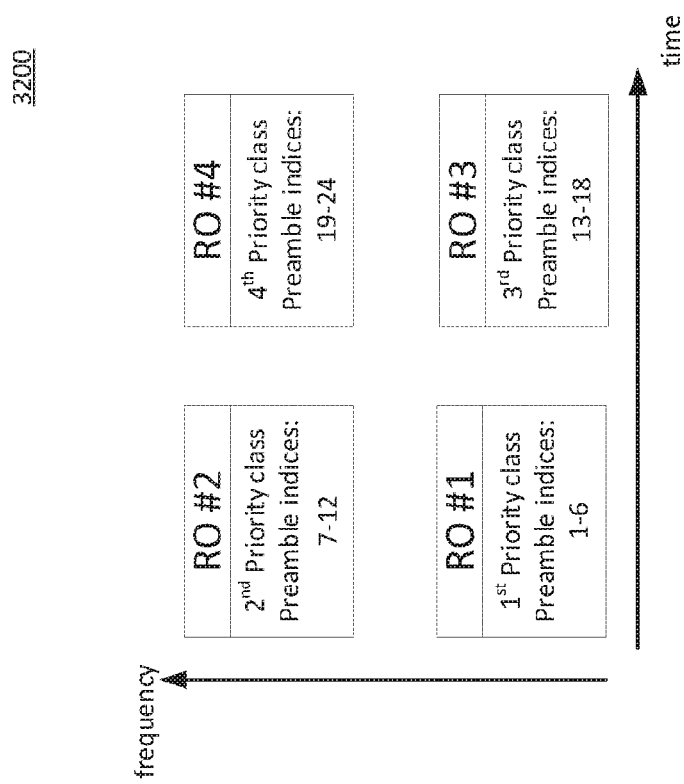
FIG. 32 shows mapping channel access priority classes to FDMed ROs and different contention-based preambles.

FIG. 32 shows a similar example, but the ROs are FDMed which may be beneficial to reduce the latency of high transmission priority classes 3200. In this example, the first and second channel access priority classes are mapped to FDMed ROs. In this case, PriornyClass_perRO_and_PreamblesPerPriornyClass should indicate that number of priority classes per RO=2 and number of preambles per priority class is 6.

Figure 33:
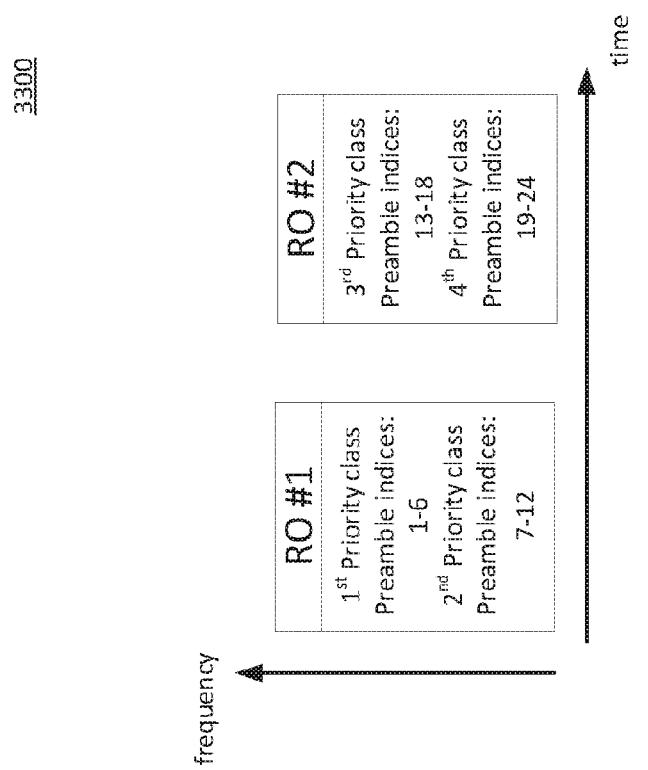
FIG. 33 shows mapping multiple channel access priority classes to the same RO and different contention-based preambles.

FIG. 33 shows an example that each RO is associated with two channel access priority classes and each channel access priority class is associated with 6 contention-based preambles 3300. In this case, PriornyClass_perRO_and_PreamblesPerPriorityClass should indicate that number of priority classes per RO=2 and number of preambles per priority class is 6.

Figure 34:
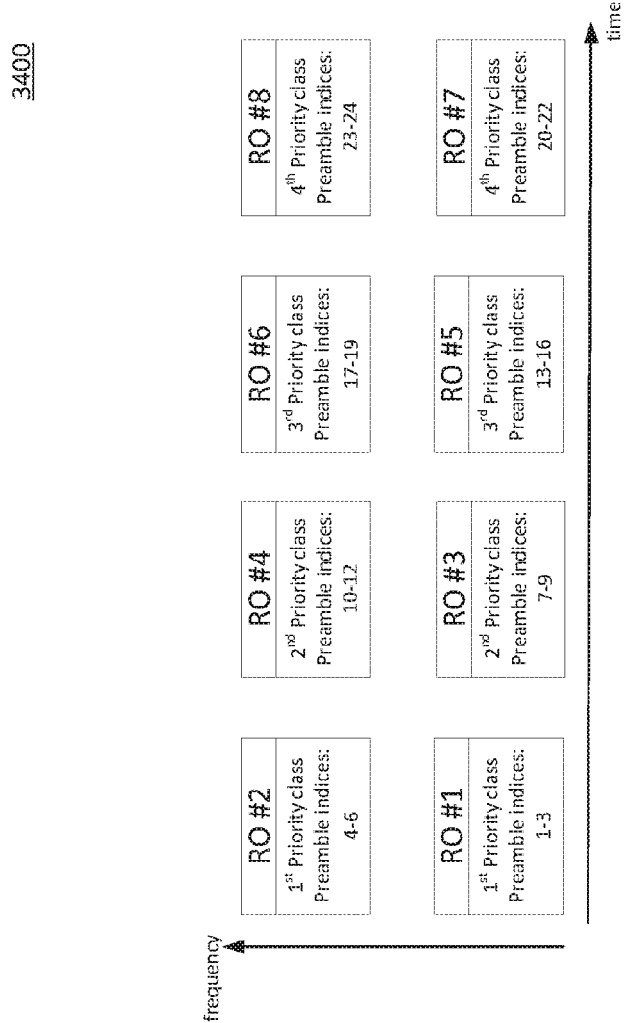
FIG. 34 shows mapping the channel access priority class to multiple FDMed RO and different contention-based preambles.

FIG. 34 shows an example of mapping the channel access priority class to multiple FDMed ROs with different preambles in each RO 3400. In this case, PriorityClass_perRO_and_PreamblesPerPriorityClass should indicate that number of priority classes per RO=0.5 and number of preambles per priority class is 3.

Mapping the channel access priority classes to RO and contention-based preambles may done in the following order.

First, in increasing order of preamble indices within single RO.

Second, in increasing order of the frequency indices for FDMed RO.

Third, in increasing order of time resources indices for TDMed RO within a PRACH slot.

Fourth, in increasing order of indices for PRACH slots.

The preambles used to indicate the channel access priority class may be shared with usage for those preambles such as the initial access, handover, beam failure recover, and so on. It is also proposed herein to have reserved preamble IDs that are only used for channel access. Those IDs may be predefined or indicated by high layer signaling.

In case that many UEs are attempting to access the channel with the same channel access priority class, then the gNB may allocate more preambles for the RO associated with this channel access priority class to reduce the chance that those collide together, i.e., non-uniform preamble allocation across different ROs.

UL CAIS based on other UL signals/channels is described herein. Other UL signals/channels may be used to indicate the priority of the UL transmission in UE initiated COT such UCI and SRS. They also may indicate whether the gNB can share the UE initiated COT and/or the portion that can be shared, for example, when the UE stops the intended UL transmission such that the gNB can occupy the remaining portion of the UE's COT. Once a UE initiates the COT, it may indicate the priority of intended UL transmission in UCI. This UCI may be transmitted in PUCCH. Or it may be transmitted piggybacked on scheduled or configured PUSCH. Also, UCI may carry an indication, e.g. one bit, to point whether the gNB can share the UE initiated COT or not. If COT sharing is disabled by the UE, then the UE may not monitor gNB transmissions after it finishes the intended UL transmission. The UE may resume monitoring the gNB according to the gNB's FFP. Moreover, the UE may indicate the duration in which COT sharing can occur. In this case, the UE may monitor the gNB's transmission within this duration. For example, this duration may start after the last intended UL transmission until the end of UE's initiated COT, or earlier. Such an indication may similar to SLIV, i.e., it indicates the first symbol from the gNB can start sharing the UE initiated COT and the duration that can be shared by gNB PUCCH occasions may be configured at the beginning of some FFP(s) which may be used when UE initiate the COT to carry the priority of the intended transmission. Also, some grant free UL PUSCH occasions may be configured at the beginning of some FFP(s) which can be used immediately if the UE acquire the channel successfully. In this case, UE may include UCI to indicate the channel access priority class applied by the UE to acquire the channel, or other aforementioned information.

Alternatively, the DMRS of PUSCH may indicate the channel access priority class applied by the UE to acquire the channel. Procedures similar to the one described above for the DL DMRS to indicate the channel access priority class may be applied to UL DMRS.

Also, a UE may transmit the SRS once the channel is successfully occupied by the UE. The transmitted SRS may be used by gNB to estimate the UL channel and also to indicate the channel access priority class applied by the UE to acquire the channel. Similar procedures described for the DMRS to carry the priority indication may be applied for SRS as well.

Sharing for UE-initiated COT is described herein. When a UE initiates a COT and transmits a CAI, it may not be received by other NR-U nodes because they may not be monitoring the time-frequency resources carrying CAI or may not be even aware of the configuration that is used by the UE for CAI transmission. Consequently, a two-step procedure is proposed herein for a CAI indication that relies on the serving gNB forwarding such information to other NR-U nodes. In other words, the COT initiated by a particular UE may be used by the gNB to transmit in the DL to other UEs and possibly allow them to respond back to the gNB.

Figure 35:
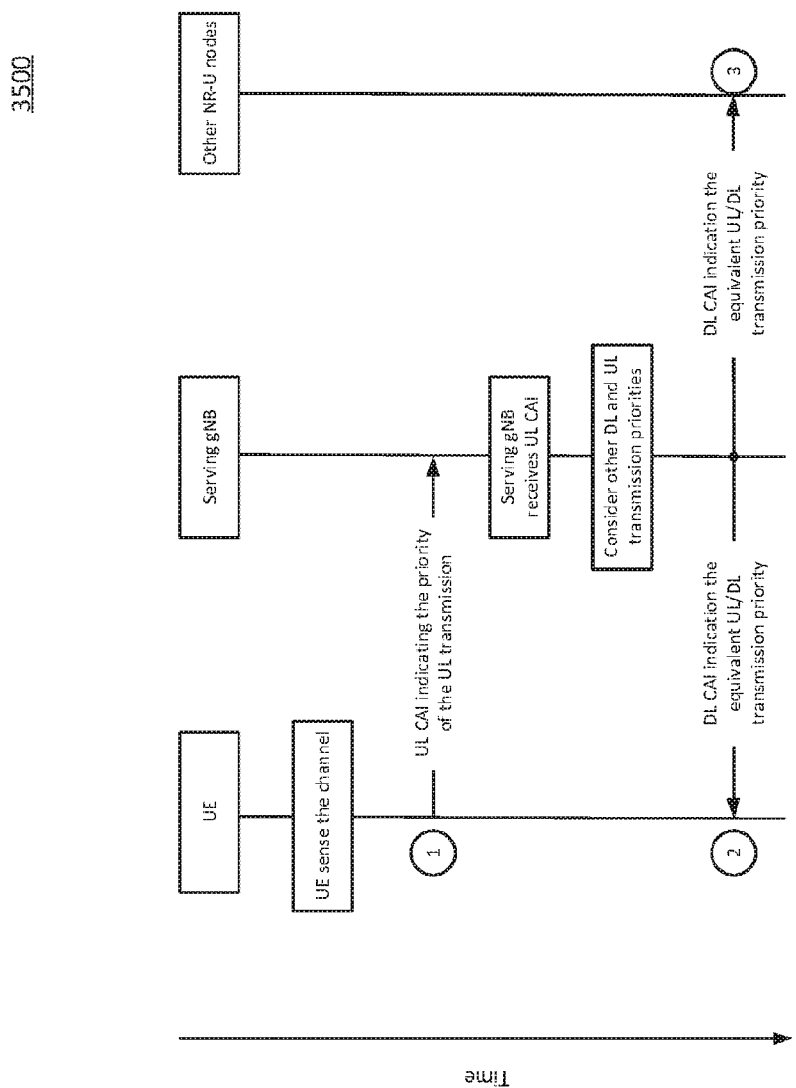
FIG. 35 Schematically illustrates an example signal flow of two-steps CAI indication.

FIG. 35 schematically illustrates an example signal flow of two-steps CAI 3500. In this example, a UE senses the channels. If a UE finds it clear, then it transmits UL CAI indication to its serving gNB as shown in (1) using the aforementioned approach or a different one.

Once the serving gNB receives the UL CAI, it may combine the provided information with any other indications from other UEs and/or the information related to DL transmission, such that it constructs an equivalent channel access priority class, identifies the time-frequency resources needed during this COT. Then in (2) and (3), gNB may transmit CAI using any of the aforementioned approaches or a different one to indicate the equivalent priority channel access and the reserved time-frequency resources.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entitites. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 36A:
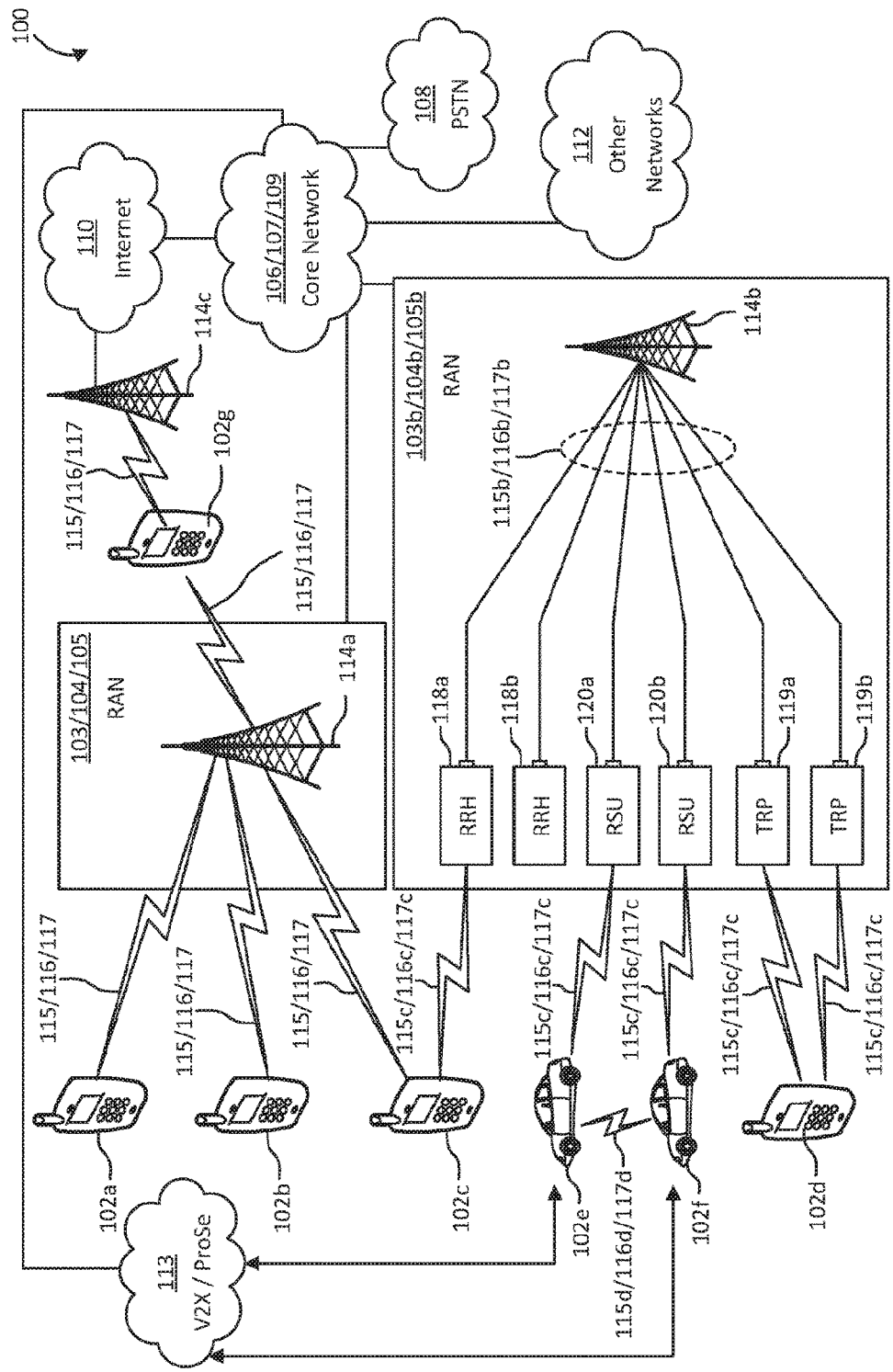
FIG. 36A illustrates one embodiment of an example communications system in which the methods and apparatuses described and claimed herein may be embodied.

FIG. 36A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 36A-36E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b, in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 36A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 36A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 36A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 36A may be configured to communicate with the base station 114a, which may employ a cellular-based radio technology, and with the base station 114c, which may employ an IEEE 802 radio technology.

Figure 36B:
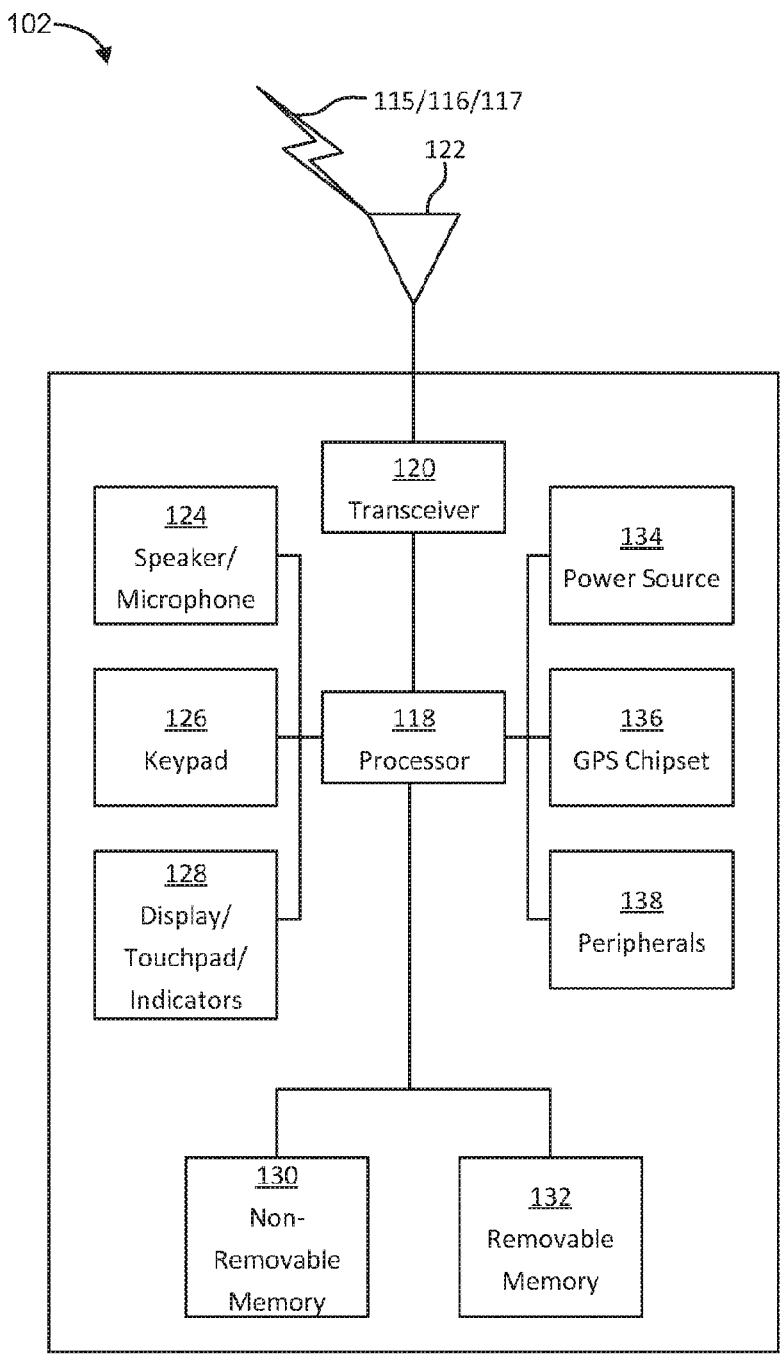
FIG. 36B is a block diagram of an example apparatus or device configured for wireless communications in accordance with the embodiments illustrated herein, such as for example, a wireless transmit/receive unit (WTRU)

FIG. 36B is a block diagram of an example apparatus or device configured for wireless communications in accordance with the embodiments illustrated herein, such as for example, a WTRU 102. As shown in FIG. 36B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 36B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 36B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 36B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 36C:
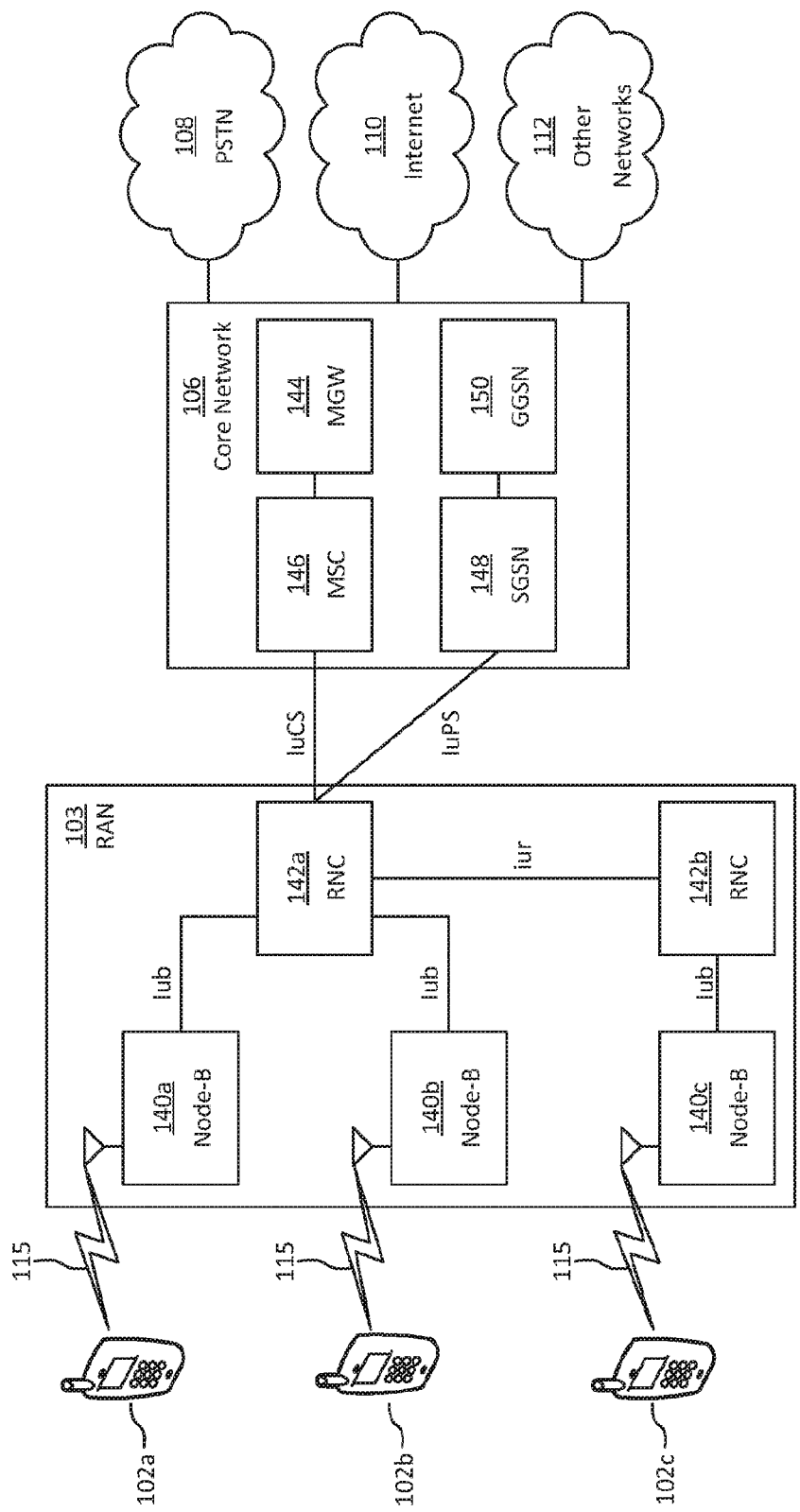
FIG. 36C is a system diagram of a RAN and a core network according to an embodiment.

FIG. 36C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 36C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 36C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 36C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 36D:
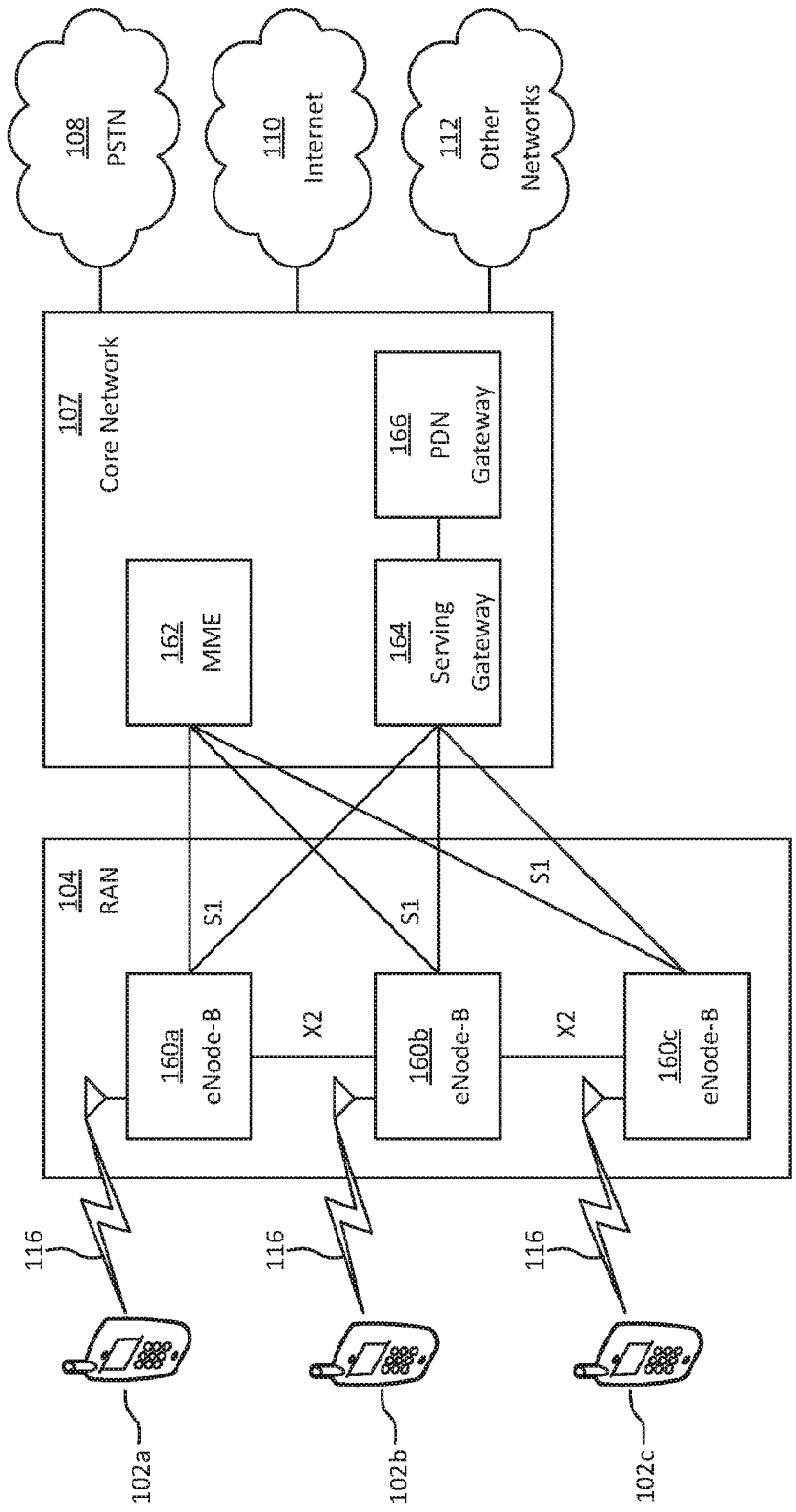
FIG. 36D is a system diagram of a RAN and a core network according to an embodiment.

FIG. 36D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 36D, the eNode-Bs 160a, 160b, 160c may communicate with one another over an X2 interface.

The core network 107 shown in FIG. 36D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 36E:
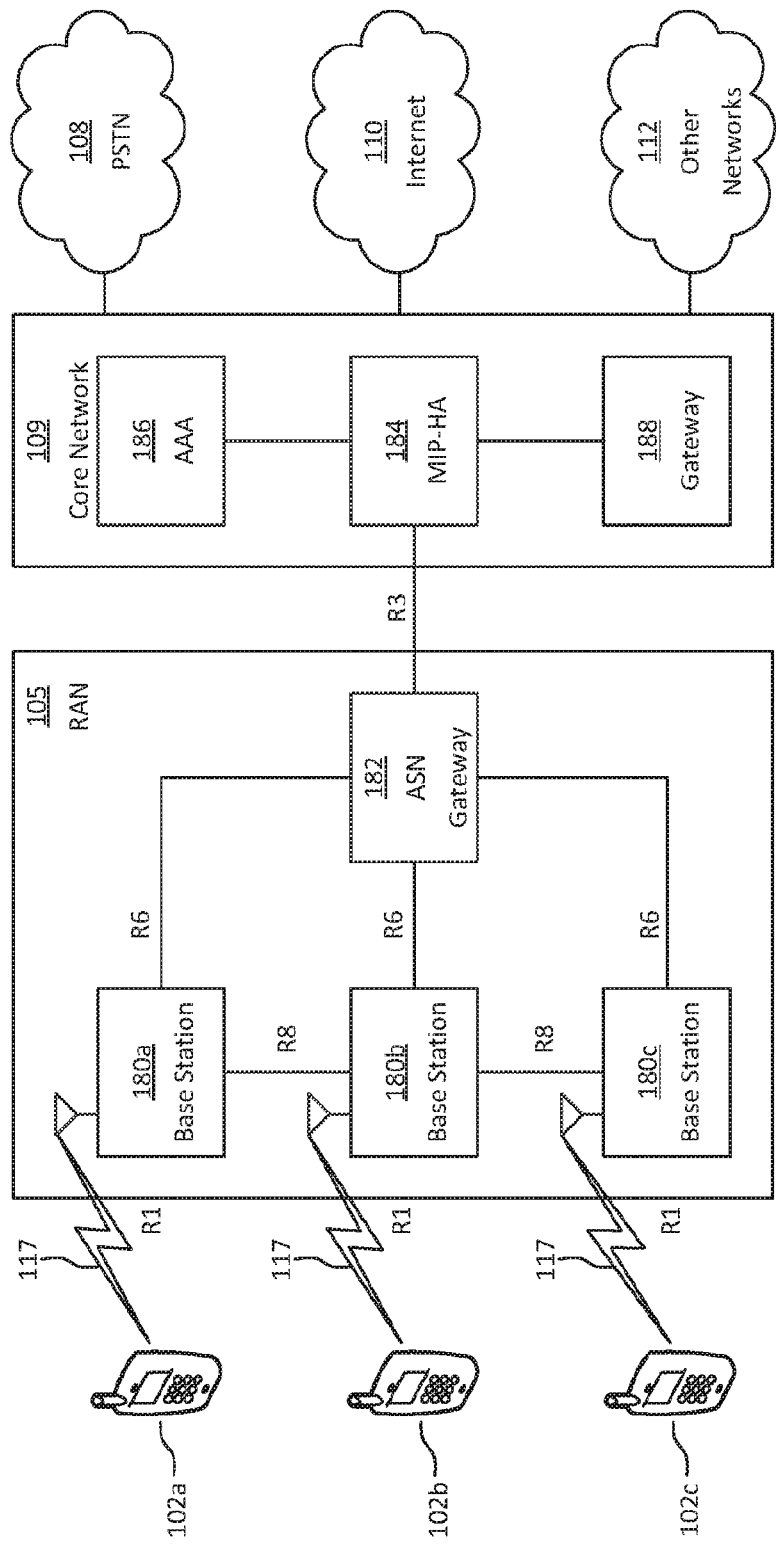
FIG. 36E is a system diagram of a RAN and the core network according to an embodiment.

FIG. 36E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 36E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 36E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 36E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 36A, 36C, 36D, and 36E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 36A, 36B, 36C, 36D, and 36E are provided by way of example only, and it is understood that the subject matter disclosed and claimed herein may be embodied or implemented in any similar communication system, whether presently defined or defined in the future.

Figure 36F:
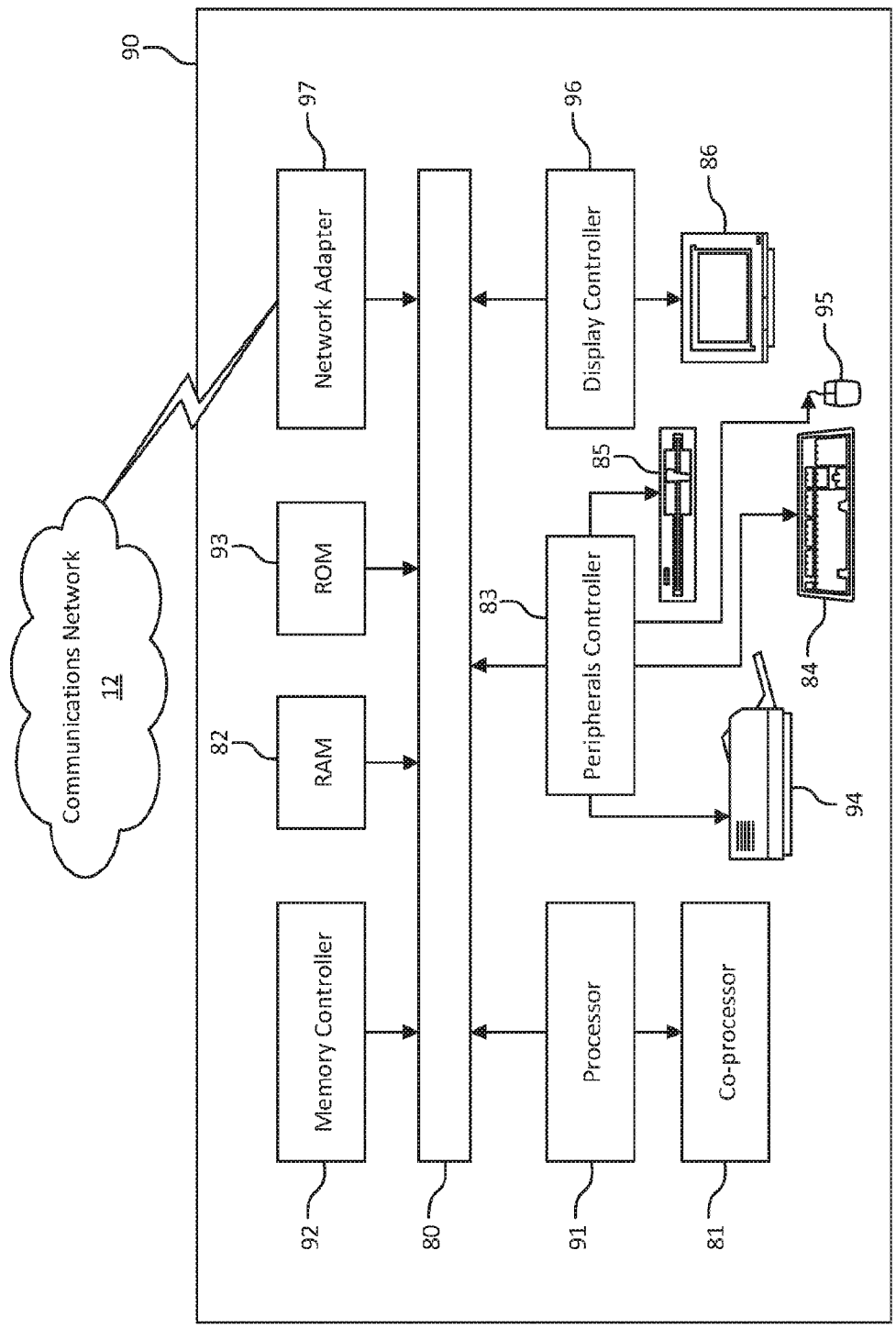
FIG. 36F is a block diagram of an exemplary computing system in which one or more apparatuses of the communications networks illustrated in FIGS. 36A, 36C, 36D and 36E may be embodied.

FIG. 36F is a block diagram of an exemplary computing system 90 in which one or more apparatuses of the communications networks illustrated in FIGS. 36A, 36C, 36D and 36E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 36A, 36B, 36C, 36D, and 36E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 36G:
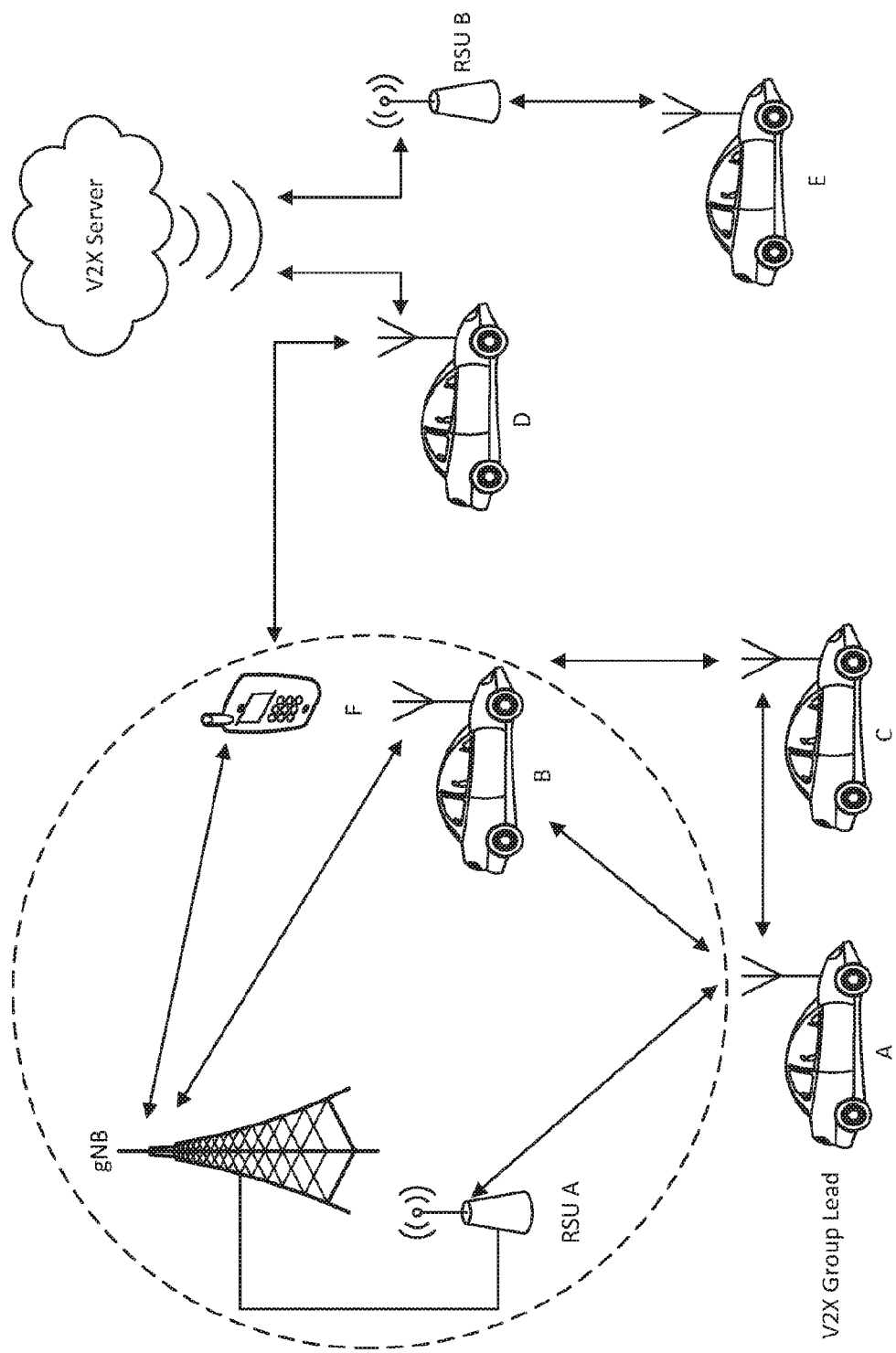
FIG. 36G illustrates one embodiment of an example communications system in which the methods and apparatuses described and claimed herein may be embodied.

FIG. 36G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed is:

1. A wireless transmit/receive unit (WTRU), the WTRU comprising a processor and a memory, the WTRU further including computer-executable instructions stored in the memory of the WTRU which, when executed by the processor of the WTRU, cause the WTRU to:
    receive configuration information, wherein the configuration information indicates that the WTRU operates as frame-based equipment (FBE);
    determine a priority associated with an intended transmission;
    determine, based on the priority, an energy detection threshold;
    perform, during a portion of a first fixed frame period (FFP), a first clear channel assessment (CCA), wherein the first FFP comprises a first channel occupancy time (COT);
    indicate a clear channel during the portion of the first FFP based on a use of the energy detection threshold;
    transmit data associated with the intended transmission;
    perform a second CCA during a portion of a second FFP, wherein the second FFP comprises a second COT, wherein the duration of performing the second CCA is shorter than the duration of performing the first CCA, and wherein the WTRU operates as a load based equipment (LBE) during the second COT of the second FFP; and
    when a channel is occupied for a predetermined consecutive number of FFPs, release the channel and do not occupy the channel again for the predetermined consecutive number of FFPs.

2. The WTRU of claim 1, wherein the computer-executable instructions, when executed by the processor of the WTRU, further cause the WTRU to:
    based on the clear channel, and when the first or second COT is initiated by the WTRU, transmit a channel acquisition indicator (CAI).

3. The WTRU of claim 2, wherein the CAI indicates at least one of:
    one or more parameters associated with a frame periodicity, the priority, a duration associated with the transmitted data, spatial information, operation bandwidth, a time offset between an FFP of a base station and the first FFP of the WTRU, or an indication of first or second COT sharing.

4. The WTRU of claim 2, wherein the CAI is transmitted via:
    a Physical Random Access Channel (PRACH), wherein the data associated with the intended transmission is transmitted after the PRACH,
    piggybacked uplink control information (UCI) on a Physical Uplink Shared Channel (PUSCH), or
    a Physical Uplink Control Channel (PUCCH).

5. The WTRU of claim 1, wherein the computer-executable instructions, when executed by the processor of the WTRU, further cause the WTRU to:
    based on the clear channel, and when the first or second COT is initiated by a base station, receive a channel acquisition indicator (CAI).

6. The WTRU of claim 5, wherein the CAI indicates at least one of:
    one or more parameters associated with a frame periodicity, the priority, a duration associated with the transmitted data, spatial information, operation bandwidth, a time offset between an FFP of a base station and the first FFP of the WTRU, or an indication of first or second COT sharing.

7. The WTRU of claim 5, wherein the CAI is received via radio resource control (RRC) signaling broadcast to multiple WTRUs, or dedicated RRC signaling for the WTRU.

8. The WTRU of claim 1, wherein the determining, based on the priority, the energy detection threshold comprises:
    determining, based on an energy offset associated with the priority, an energy threshold.

9. The WTRU of claim 1, wherein a portion of the first or second COT varies in size based on the priority.

10. The WTRU of claim 1, wherein the computer-executable instructions, when executed by the processor of the WTRU, further cause the WTRU to:
    apply a time offset between an FFP of a base station and the first FFP of the WTRU, relative to a beginning of the FFP of the base station.

11. A method for use in a wireless transmit/receive unit (WTRU), the method comprising:
    receiving configuration information, wherein the configuration information indicates that the WTRU operates as frame-based equipment (FBE);
    determining a priority associated with an intended transmission;
    determining, based on the priority, an energy detection threshold;
    performing, during a portion of a first fixed frame period (FFP), a first clear channel assessment (CCA), wherein the first FFP comprises a first channel occupancy time (COT);
    indicating a clear channel during the portion of the first FFP based on a use of the energy detection threshold;
    transmitting data associated with the intended transmission;
    performing a second CCA during a portion of a second FFP, wherein the second FFP comprises a second COT, wherein the duration of performing the second CCA is shorter than the duration of performing the first CCA, and wherein the WTRU operates as a load based equipment (LBE) during the second COT of the second FFP; and
    when a channel is occupied for a predetermined consecutive number of FFPs, releasing the channel and do not occupy the channel again for the predetermined consecutive number of FFPs.

12. The method of claim 11, further comprising:
    based on the clear channel, and when the first or second COT is initiated by the WTRU, transmitting a channel acquisition indicator (CAI).

13. The method of claim 12, wherein the CAI indicates at least one of:
   one or more parameters associated with a frame periodicity, the priority, a duration associated with the transmitted data, spatial information, operation bandwidth, a time offset between an FFP of a base station and the first FFP of the WTRU, or an indication of first or second COT sharing.

14. The method of claim 12, wherein the CAI is transmitted via:
   a Physical Random Access Channel (PRACH), wherein the data associated with the intended transmission is after the PRACH,
   piggybacked uplink control information (UCI) on a Physical Uplink Shared Channel (PUSCH), or
   a Physical Uplink Control Channel (PUCCH).

15. The method of claim 11, further comprising:
   based on the clear channel, and when the first or second COT is initiated by a base station, receiving a channel acquisition indicator (CAI).

16. The method of claim 15, wherein the CAI indicates at least one of:
   one or more parameters associated with a frame periodicity, the priority, a duration associated with the transmitted data, spatial information, operation bandwidth, a time offset between an FFP of a base station and the first FFP of the WTRU, or an indication of first or second COT sharing.

17. The method of claim 15, wherein the CAI is received via:
   radio resource control (RRC) signaling broadcast to multiple WTRUs, or
   dedicated RRC signaling for the WTRU.

* * * * *